(12) United States Patent
Casellas et al.

(10) Patent No.: US 10,919,250 B2
(45) Date of Patent: Feb. 16, 2021

(54) APPARATUS FOR PRODUCING A BLANK, ALSO A METHOD FOR THIS PURPOSE AND A BLANK

(71) Applicant: GKN Sinter Metals Engineering GmbH, Radevormwald (DE)

(72) Inventors: Antonio Casellas, Siegburg (DE); Klaus Dollmeier, Westhausen (DE); Eberhard Ernst, Eichenzell (DE); Anastasia Özkan, Witten (DE); Thomas Schupp, Scheuerfeld (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 906 days.

(21) Appl. No.: 15/308,896

(22) PCT Filed: May 4, 2015

(86) PCT No.: PCT/EP2015/059731
§ 371 (c)(1),
(2) Date: Nov. 4, 2016

(87) PCT Pub. No.: WO2015/169756
PCT Pub. Date: Nov. 12, 2015

(65) Prior Publication Data
US 2017/0072654 A1 Mar. 16, 2017

(30) Foreign Application Priority Data
May 5, 2014 (DE) .................. 10 2014 006 374.7

(51) Int. Cl.
*B30B 15/30* (2006.01)
*B22F 3/03* (2006.01)
(Continued)

(52) U.S. Cl.
CPC .............. *B30B 15/306* (2013.01); *B22F 3/03* (2013.01); *B22F 7/02* (2013.01); *B30B 15/302* (2013.01);
(Continued)

(58) Field of Classification Search
CPC .......... C01B 3/0078; B22F 3/03; B22F 3/004; B22F 2003/033; B22F 7/02; B30F 15/302;
(Continued)

(56) References Cited

U.S. PATENT DOCUMENTS 2,552,090 A 5/1951 Eusner
6,403,025 B2 6/2002 Goransson
(Continued)

FOREIGN PATENT DOCUMENTS

DE 1 230 523 B 12/1966
DE 10 2005 030 312 A1 12/2006
(Continued)

OTHER PUBLICATIONS

PCT International Search Report for corresponding International Application No. PCT/EP2015/059731; dated Dec. 15, 2015, 3 pages.
(Continued)

*Primary Examiner* — Joseph S Del Sole
*Assistant Examiner* — Lawrence D. Hohenbrink, Jr.
(74) *Attorney, Agent, or Firm* — Quarles & Brady LLP

(57) ABSTRACT

The present invention relates to an apparatus, preferably a press, comprising a cavity which is to be filled and at least a first material feed, for a first material, and a second material feed, for a second material, wherein the first and the second material feeds are arranged separately from one another, having a feeding apparatus for feeding the first and the second materials into the cavity which is to be filled, (Continued)

wherein the feeding apparatus has a mouth-opening cross section with at least a first region of the mouth-opening cross section for the first material, and with a second, separate region of the mouth-opening cross section for the second material, for filling the cavity preferably in parallel, and at separate locations. A method and also a blank are proposed in addition.

34 Claims, 30 Drawing Sheets

(51) Int. Cl.
    *B22F 7/02*         (2006.01)
    *B28B 13/02*       (2006.01)
    *C01B 3/00*        (2006.01)
    *B22F 3/00*        (2021.01)

(52) U.S. Cl.
    CPC ......... *B22F 3/004* (2013.01); *B22F 2003/033* (2013.01); *B28B 13/022* (2013.01); *B28B 13/028* (2013.01); *B30B 15/304* (2013.01); *C01B 3/0078* (2013.01)

(58) Field of Classification Search
    CPC .... B30F 15/304; B30F 15/306; B28B 13/022; B28B 13/028
    USPC ........................................................ 425/259
    See application file for complete search history.

(56) References Cited

U.S. PATENT DOCUMENTS

| | | | |
|---|---|---|---|
| 7,156,631 | B2 | 1/2007 | Ozeki |
| 7,927,091 | B2 | 4/2011 | Revol |
| 2003/0051614 | A1 | 3/2003 | Knoth et al. |
| 2008/0109102 | A1 | 5/2008 | Sutcliffe |
| 2008/0308961 | A1* | 12/2008 | Kotzur ................. B30B 11/085 264/113 |
| 2010/0270706 | A1 | 10/2010 | Vest et al. |
| 2010/0320223 | A1* | 12/2010 | Revirand ............... B22F 3/004 141/1 |
| 2012/0207867 | A1 | 8/2012 | Mercado et al. |

FOREIGN PATENT DOCUMENTS

| | | |
|---|---|---|
| DE | 60 2004 005 070 T2 | 11/2007 |
| DE | 10 2009 005 859 B3 | 4/2010 |
| DE | 10 2010 015 016 A1 | 11/2010 |
| EP | 0109948 A2 | 5/1984 |
| EP | 0 783 840 A2 | 7/1997 |
| EP | 0 870 596 A1 | 10/1998 |
| EP | 1 348 527 A2 | 10/2003 |
| EP | 1 407 877 A1 | 4/2004 |
| EP | 2 221 131 A1 | 8/2010 |
| FR | 2 916 427 A1 | 11/2008 |
| FR | 2 951 989 A1 | 5/2011 |
| JP | S4999910 A | 9/1974 |
| JP | S60162702 A | 8/1985 |
| JP | H05221601 A | 8/1993 |
| JP | H11104895 A | 4/1999 |
| JP | 2005074494 A | 3/2005 |
| WO | 2013/036982 A2 | 3/2013 |

OTHER PUBLICATIONS

Jinbao Gao, Carbon Matrix Confined Sodium Alanate for Reversible Hydrogen Storage, University of Utrecht thesis, Nov. 19, 2012, 128 pages, The Netherlands.

Billur Sakintuna, et al., "Metal hydride materials for solid hydrogren storage: A review", ScienceDirect—International Journal of Hydrogen Energy, 32, dated 2007, p. 1121-1140.

Japan Patent Office, Notice of Reasons for Rejection, Application No. 2016-566644, dated Feb. 19, 2019, 11 pages.

Intellectual Property India. Examination Report for application 201918042849. Dated Oct. 5, 2020.

* cited by examiner

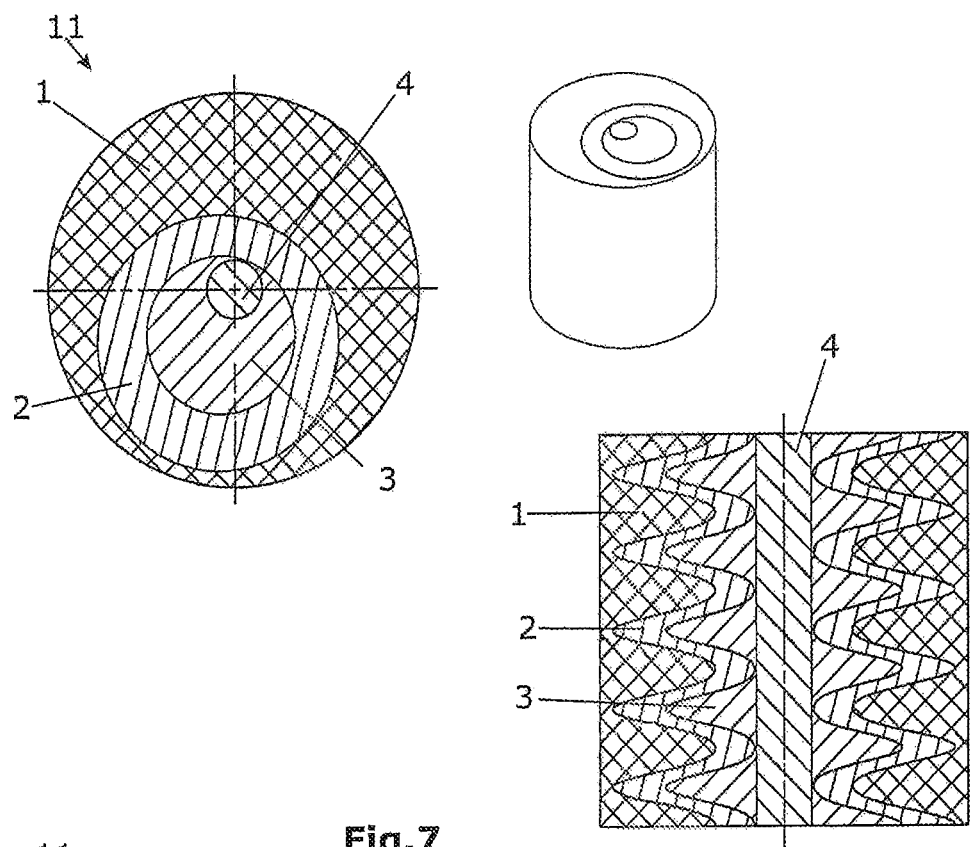
Fig.7
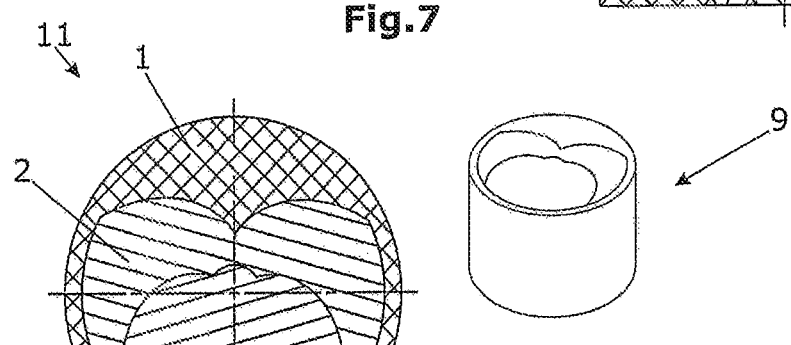
Fig.8
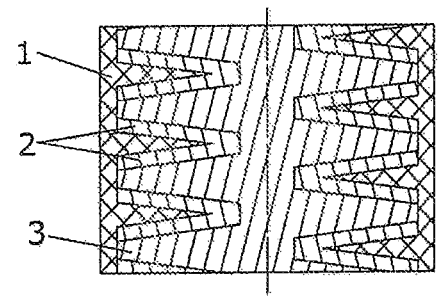

APPARATUS FOR PRODUCING A BLANK, ALSO A METHOD FOR THIS PURPOSE AND A BLANK

This application represents the U.S. national stage entry of PCT International Application No. PCT/EP2015/059731 filed May 4, 2015, which claims the priority of German patent application 10 2014 006 374.7 of May 5, 2014, the disclosures of which are hereby incorporated by reference into the subject matter of the present patent application for all purposes.

The present invention relates to a device comprising a cavity which can be filled with a free-flowing material for the production of a blank. The invention further relates to a feed device for use in the device, to a method of producing a blank and to a blank, preferably in the form of a composite material.

It is a known operation, especially in the case of production of sinterable green bodies, to fill cavities with the material to be sintered by means of a feed device, often also called filling shoe. For this purpose, the filling shoe (also called feeder or filler) is moved in a longitudinal motion over the cavity to be filled, fills it, and then optionally returns to its starting position. The cavity here is filled with maximum uniformity with the material which is supplied from the filling shoe.

EP-A-1 348 527, EP-A-2 221 131, EP-A-1 407 877 and JP-A-60162702 disclose methods and devices for production of components using shaping molds, in which powders of at least two different compositions are introduced into a shaping mold or into a cavity of a shaping mold. Further methods of this kind are known, for example, in DE-B-10 2009 005 859, DE-A-10 2010 015 016, DE-T-60 2004 005 070 and WO-A-2013/036982.

It is thus an object of the invention to enable the production of a blank in a more varied manner with regard to the use of two or more materials.

This object is achieved by a press device having the features of claim 1, by a press device having the features of claim 13, by a method having the features of claim 16, by a method having the features of claim 23, by a use as claimed in claim 25, by a blank having the features of claim 26, and by a feed device having the features of claim 33. Advantageous features, configurations and developments will be apparent from the description which follows, the figures and also the claims, without restriction of individual features from a configuration thereto. Instead, one or more features from one configuration can be combined with one or more features of another configuration to give further configurations. More particularly, the respective independent claims can also each be combined with one another. Nor should the wording of the independent claims be regarded as a restriction of the subject matter to be claimed. One or more features of the claim wording can therefore be exchanged or else omitted, but may additionally also be added on. It is also possible to use features cited with reference to a specific working example in generalized form as well, or likewise to use them in other working examples, especially applications.

A press device is proposed, preferably a powder press, comprising a cavity to be filled, at least one first material feed of a first material and a second material feed of a second material, the first and second material supplies being arranged separately from one another, comprising a feed device for feeding of the at least two materials into the cavity, wherein the feed device has an opening cross section with at least one first region of the opening cross section for the first material and with a separately arranged second region of the opening cross section for the second material for preferably parallel filling, preferably at separate locations, of the cavity.

In one configuration of the invention, the cavity is part, for example, of a press. However, it is also possible that the cavity forms part of the device, but is present separately from, for example, a press. For example, filling of the cavity may take place at a different location than any subsequent compression of the material present in the cavity.

Additionally proposed is a press device comprising a device for filling of a mold of the press device with at least two different materials, comprising
 a cavity to be filled with the at least two materials and
 a filling unit for discharging the at least two materials for the purpose of introducing these materials into different regions of the cavity,
 wherein the filling unit has at least two separate chambers or at least two chamber regions of a common chamber for simultaneous feeding of the at least two materials, directly adjoining one another or in separate locations, for introduction thereof into the cavity as at least partly distinguishable layers, and
 having a relative rotary motion between the filling unit and the cavity, preferably about a common axis (also referred to hereinafter as machine axis), preferably about a common center axis, during a filling operation. Preferably, the filling unit and the cavity are arranged so as to be rotatable relative to one another, and the filling unit may be within the cavity, at the edge of the cavity or above the cavity.

The cavity is preferably cylindrical. However, it may also have an elongated extent in top view. A relative movement between the cavity and the filling unit is therefore, for example, not restricted to a rotation. Instead, a translational relative movement, simultaneously or else successively, may also be envisaged for the rotational movement between the filling unit and the cavity during the filling operation. It is preferably possible that superimposition of different movements is enabled, for example of a rotational movement with a translational movement. Curved movements can also be effected. For this purpose, the device has one or more drives which are actuated by means of an open-loop or closed-loop control system. Preferably, the filling unit executes at least one rotational movement.

By means of the device, it is possible to process different materials for entirely different purposes to give a blank having these different materials in different regions of its volume. Different materials in the context of the use in the case of the invention are materials which differ in terms of their characteristics, their chemical elements, their grain size and/or other material-describing and/or physical and/or chemical parameters. More particularly, the simultaneous arrangement of materials in the cavity permits the specific use of different geometries with respect to the blank, a wide variety of different requirements with regard, for example, to porosity, strength, expandability, grain size distribution, alignment of grain sizes and many others in particular regions of the blank. Preferably, the geometry of the cavity is chosen according to the end use of the blank. For example, a cylinder shape may be suitable for some applications, but more of an angular shape for other applications. A first, preferred field of use of the device relates to the production of sintering blanks, also called green bodies. The materials usable for this purpose and also for other fields of use may especially include pourable materials of all kinds, for example metallic powders and granules, ceramic powders, but also polymers. Further auxiliaries such as binders, pressing aids such as oils and waxes or lubricants may likewise be processed by means of this device. As well as a free-flowing or flowable material, it is also possible to utilize other structures such as woven or nonwoven fabrics, fibers, wires and the like and introduce them into the cavity.

The green bodies can then be used to produce entirely different products, for example components of engines and gearboxes such as gears, bearings, bearing cups, filters, magnets, tools, also cutting ceramics and other items for a wide variety of different fields of use, such as automobile construction, domestic, DIY and office appliances, inter alia.

In addition, it is also possible to use the device to produce a blank for quite different technical fields, and it is accordingly also possible to resort to other materials. For example, with utilization of the feed device, it is possible to produce a blank for the chemical industry. Another possibility is use in the food and drink industry.

Preference is given to the production of compacts. Compacts are compacted materials. These have better bonding by virtue of the mutual compression. In one configuration, this may already result in an adequate final strength, for example by application of a high pressure, especially as effected in the case of isostatic pressing. However, it is also possible to use stabilizing binder material to convert the compacted compact to a final shape.

One advantage of the device proposed in accordance with the invention is that it can be used to very accurately adjust the grain distribution. By means of the feed device, it is possible to exactly control the respective material inflow, with fixing of the particular material, for example, by means of a binder and/or else by means of an intermediate compression.

In one configuration of the invention, the inflow, i.e. the rate (amount per unit time) of material flowing through the feed device, is adjustable. Preferably, the cross section of the inlet may be variable at least over a range. It is also possible to affect the mass flow rate in the case of some materials with a higher or lower pressure. Yet another embodiment envisages provision of suction, meaning that outflow of the respective material is supported by applying a reduced pressure.

In addition, it has been found to be advantageous when removal of air is provided in the cavity to be filled. The removal of air allows air to be guided out (for example sucked out) of the cavity, especially at the time when the filling of the cavity with the first and second materials is commenced. For instance, tests have shown that the cycle time of the filling of a wide variety of different cavities can be reduced when the air present in the cavity is evacuated. Preferably, the removal of air is enabled by means of a reduced pressure. For this purpose, one or more reduced pressure nozzles may be arranged at least adjacent to the cavity. In one configuration of the invention, at least one nozzle is arranged at the feed device, especially immediately adjacent to the opening cross section. In a further configuration of the invention, one or more nozzles are arranged within the opening cross section.

A further configuration of the device according to the invention allows a relative movement between the feed device and the cavity. This relative movement can be executed either by the feed device or by the cavity only. However, it is also possible that both the cavity and the feed device are movable, preferably by a respective drive. However, there is likewise the possibility of coupled movement, for example by means of a gearbox. Movement may be translational, but it may also comprise a rotational movement or else a pivoting movement, and also a superimposition of two or more different movements. This enables creation of a wide variety of different 3-D geometries of blanks through corresponding movement, for example, of the feed device or of the opening cross section of a cavity filled with different material in each of different regions. Preferably, the respective material streams of the first and second material are not interrupted. In this way, it is possible in each case to establish layers with a wide variety of different shapes, according to the technical requirement.

It is also possible, through introduction of material to be removed later, to introduce channels of a wide variety of different lengths and widths into the blank. For example, it is also possible to form a hollow body, preferably any desired 3-D hollow body. One configuration envisages, for example, a blank with a hollow spiral.

In addition, it has been found that the material flow can be kept particularly constant when at least a portion of the device is vibrated and, by means of vibration, the material flow is promoted. The vibrations prevent agglomeration particularly of small powder particles which could otherwise block flow and instead accumulate in one of the inlets. For example, the vibrator may be arranged directly on a material inlet or else on the feed device.

It has also been found that it is advantageous to align the material before, during and/or after the filling of the cavity. For this purpose, for example, a contact element with a contact face, preferably in the form of a comb, of a smooth or else contoured bar or of a roller is provided, which can be moved by means of a moving device such that it comes into contact with the material introduced into the cavity, with a moving device moving the contact element within the material. Preferably, the bar may also have a sawtooth structure which works the surface by stroking across it.

In a further configuration of the invention, in turn, the compacted compact is subjected to further processing steps after production as a blank. For example, it can be subjected to various further processing steps, in the form, for example, of a green body, for example to solid phase sintering, liquid sintering or else reactive sintering.

In a development, the feed device proposed enables specific manufacture of workpieces. For instance, in the case of gears or coupling bodies, in a single working operation, for example externally, a different material can be arranged in the cavity than on the inside. In this way, it is possible to establish the particular structure of the workpiece, for example a different microstructure on the outside than on the inside. It is also possible in this way, for example, to specifically create an austenitic microstructure, a ferromagnetic workpiece, inter alia. For instance, it is possible to make, for example, a region of the workpiece sinter-hardenable and another region of the same workpiece, by contrast, non-sinter-hardenable. For example, such a configuration may be utilized in gears. In that case, for example, an outer region is sinter-hardened, but an inner region comprises a different material and a different density. Therefore, in the inner region, after the sintering, a different property of the material characteristics is present than in an outer region. For example, there is a certain softness of the microstructure in the interior compared to the toothing on the outer circumference. Such a configuration is utilized, for example, for components of a variable valve drive (VVT components).

For the rest, the invention is to be described in detail hereinafter with reference to a further specific example. However, this example should be regarded as just one of various executions and is not supposed to restrict the invention but to illustrate it. More particularly, individual features from this example can likewise be used in other executions and also in generalized form, especially where other materials, functions or else arrangements of layers are concerned.

For example, the invention can be used in the production of a compact material, similarly to a green body, specifically a compact composite for utilization in a hydrogen storage means. It may be the case here that the first material is a primarily hydrogen-storing material and the second material is a primarily heat-conducting material, both materials being conducted into the cavity through the opening cross section of the feed device and introduced into different regions of the cavity.

The term "hydrogen storage means" describes a reservoir vessel in which hydrogen can be stored. This can be done using conventional methods of saving and storage of hydrogen, for example compressed gas storage, i.e. storage in pressure vessels by compression with compressors, or liquefied gas storage or storage in liquefied form by cooling and compression. Further alternative forms of storage of hydrogen are based on solids or liquids, for example metal hydride storage means, i.e. on the principle of storage as a chemical compound between hydrogen and a metal or an alloy, or on adsorption storage, i.e. adsorptive storage of hydrogen in highly porous materials. In addition, for storage and transport of hydrogen, there are also possible hydrogen storage means which temporarily bind the hydrogen to organic substances, giving rise to liquid compounds that can be stored at ambient pressure, called "chemically bound hydrogen".

What the term "layers" means is preferably that a material is, or else two or more materials are, arranged in a lamina and this can be delimited as a lamina from the direct environment thereof. For example, different materials may be poured successively one on top of another in a loose arrangement, such that adjacent layers are in direct contact. In a preferred configuration, the layer of hydrogenatable material (hydrogenatable layer) may be arranged directly adjacent to a thermally conductive layer. Such an arrangement allows the heat which arises/heat required on absorption of hydrogen and/or release of hydrogen to be released or "passed" over from the hydrogenatable material directly to the adjacent layer.

At least one of the following functions: "primary hydrogen storage", "primary heat conduction", "primary compensation for expansion" and "primary gas conduction" is understood to mean that the respective layer fulfills at least this function as a main object in the second region of the composite material. For instance, it is possible that a layer is utilized primarily for hydrogen storage, but is simultaneously also capable of providing at least a certain thermal conductivity. In this case, however, for example, at least one other layer is present, which assumes the primary task of heat conduction, meaning that the greatest amount of heat is dissipated from or supplied to the compressed material composite. In this case, on the one hand, it is possible to utilize the primarily gas-conducting layer, by means of which, for example, hydrogen is passed into the material composite, or else, for example, is conducted out of it. In this case, heat can also be entrained by means of the fluid flowing through.

The hydrogenatable material can absorb the hydrogen and, if required, release it again. In a preferred embodiment, the material comprises particles, granulates, fibers, preferably cut fibers, flakes and/or other geometries. More particularly, the material may also take the form of sheets or powder. In this case, the material does not necessarily have a homogeneous configuration. Instead, the configuration may be regular or irregular. Particles in the context of the present invention are, for example, virtually spherical particles, and likewise particles having an irregular, angular outward shape. The surface may be smooth, but it is also possible that the surface of the material is rough and/or has unevenness and/or depressions and/or elevations. According to the invention, a hydrogen storage means may comprise the material in just one specific 3-dimensional configuration, such that all particles of the material have the same spatial extent. However, it is also possible that a hydrogen storage means comprises the material in different configurations/geometries. By virtue of a multitude of different geometries or configurations of the material, the material can be used in a multitude of different hydrogen storage means.

Preferably, the material comprises hollow bodies, for example particles having one or more cavities and/or having a hollow shape, for example a hollow fiber or an extrusion body with a hollow channel. The term "hollow fiber" describes a cylindrical fiber having one or more continuous cavities in cross section. Through the use of a hollow fiber, it is possible to combine a plurality of hollow fibers to give a hollow fiber membrane, by means of which absorption and/or release of the hydrogen from the material can be facilitated because of the high porosity.

Preferably, the hydrogenatable material has a bimodal size distribution. In this way, a higher bulk density and hence a higher density of the hydrogenatable material in the hydrogen storage means can be enabled, which increases the hydrogen storage capacity, i.e. the amount of hydrogen which can be stored in the storage means.

According to the invention, the hydrogenatable material may comprise, preferably consist of, at least one hydrogenatable metal and/or at least one hydrogenatable metal alloy.

Other hydrogenatable materials used may be:
alkaline earth metal and alkali metal alanates,
alkaline earth metal and alkali metal borohydrides,
metal-organic frameworks (MOFs) and/or
clathrates,
and, of course, respective combinations of the respective materials.

According to the invention, the material may also include non-hydrogenatable metals or metal alloys.

According to the invention, the hydrogenatable material may comprise a low-temperature hydride and/or a high-temperature hydride. The term "hydride" refers to the hydrogenatable material, irrespective of whether it is in the hydrogenated form or the non-hydrogenated form. Low-temperature hydrides store hydrogen preferably within a temperature range between $-55°$ C. and $180°$ C., especially between $-20°$ C. and $150°$ C., particularly between $0°$ C. and $140°$ C. High-temperature hydrides store hydrogen preferably within a temperature range of $280°$ C. upward, especially $300°$ C. upward. At the temperatures mentioned, the hydrides cannot just store hydrogen but can also release it, i.e. are able to function within these temperature ranges.

Where 'hydrides' are described in this context, this is understood to mean the hydrogenatable material in its hydrogenated form and also in its non-hydrogenated form. According to the invention, in the production of hydrogen storage means, it is possible to use hydrogenatable materials in their hydrogenated or non-hydrogenated form.

With regard to hydrides and their properties, reference is made in the context of the disclosure to tables 1 to 4 in B. Sakietuna et al., International Journal of Energy, 32 (2007), p. 1121-1140.

Hydrogen storage (hydrogenation) can be effected at room temperature. Hydrogenation is an exothermic reaction.

The heat of reaction that arises can be removed. By contrast, for the dehydrogenation, energy has to be supplied to the hydride in the form of heat. Dehydrogenation is an endothermic reaction.

For example, it may be the case that a low-temperature hydride is used together with a high-temperature hydride. For instance, in one configuration, it may be the case that, for example, the low-temperature hydride and the high temperature hydride are provided in a mixture in a layer of a second region. It is also possible for these each to be arranged separately in different layers or regions, especially also in different second regions. For example, it may be the case that a first region is arranged between these second regions. In a further configuration, a first region has a mixture of low- and high-temperature hydride distributed in the matrix. It is also possible that different first regions include either a low-temperature hydride or a high-temperature hydride.

Preferably, the hydrogenatable material comprises a metal selected from magnesium, titanium, iron, nickel, manganese, nickel, lanthanum, zirconium, vanadium, chromium, or a mixture of two or more of these metals. The hydrogenatable material may also include a metal alloy comprising at least one of the metals mentioned.

More preferably, the hydrogenatable material (hydrogen storage material) comprises at least one metal alloy capable of storing hydrogen and releasing it again at a temperature of 150° C. or less, especially within a temperature range from −20° C. to 140° C., especially from 0° C. to 100° C. The at least one metal alloy here is preferably selected from an alloy of the $AB_5$ type, the AB type and/or the $AB_2$ type. A and B here each denote different metals, where A and/or B are especially selected from the group comprising magnesium, titanium, iron, nickel, manganese, nickel, lanthanum, zirconium, vanadium and chromium. The indices represent the stoichiometric ratio of the metals in the particular alloy. According to the invention, the alloys here may be doped with extraneous atoms. According to the invention, the doping level may be up to 50 atom %, especially up to 40 atom % or up to 35 atom %, preferably up to 30 atom % or up to 25 atom %, particularly up to 20 atom % or up to 15 atom %, preferably up to 10 atom % or up to 5 atom %, of A and/or B. The doping can be effected, for example, with magnesium, titanium, iron, nickel, manganese, nickel, lanthanum or other lanthanides, zirconium, vanadium and/or chromium. The doping can be effected here with one or more different extraneous atoms. Alloys of the $AB_5$ type are readily activatable, meaning that the conditions needed for activation are similar to those in the operation of the hydrogen storage means. They additionally have a higher ductility than alloys of the AB or $AB_2$ type. Alloys of the $AB_2$ or of the AB type, by contrast, have higher mechanical stability and hardness compared to alloys of the $AB_5$ type. Mention may be made here by way of example of FeTi as an alloy of the AB type, $TiMn_2$ as an alloy of the $AB_2$ type and $LaNi_5$ as an alloy of the $AB_5$ type.

More preferably, the hydrogenatable material (hydrogen storage material) comprises a mixture of at least two hydrogenatable alloys, at least one alloy being of the $AB_5$ type and the second alloy being an alloy of the AB type and/or the $AB_2$ type. The proportion of the alloy of the $AB_5$ type is especially 1% by weight to 50% by weight, especially 2% by weight to 40% by weight, more preferably 5% by weight to 30% by weight and particularly 5% by weight to 20% by weight, based on the total weight of the hydrogenatable material.

The hydrogenatable material (hydrogen storage material) is preferably in particulate form (particles).

The particles especially have a particle size $x_{50}$ of 20 μm to 700 μm, preferably of 25 μm to 500 μm, particularly of 30 μm to 400 μm, especially 50 μm to 300 μm. $x_{50}$ means that 50% of the particles have a median particle size equal to or less than the value mentioned. The particle size was determined by means of laser diffraction, but can also be effected by sieve analysis. The median particle size in the present case is the particle size based on weight, the particle size based on volume being the same in the present case. What is reported here is the particle size of the hydrogenatable material before it is subjected to hydrogenation for the first time. During the storage of hydrogen, stresses occur within the material, which can lead to a reduction in the $x_{50}$ particle size over several cycles.

Preferably, the hydrogenatable material is incorporated in the matrix to such a firm degree that it decreases in size on storage of hydrogen. Preference is therefore given to using, as hydrogenatable material, particulate material which breaks up while the matrix remains at least predominantly undestroyed. This result is surprising, since it was expected that the matrix would if anything tend to break up on expansion as a result of the increase in volume of the hydrogenatable material during the storage of hydrogen when there is high expansion because of the increase in volume. It is assumed at present that the outside forces acting on the particles, as a result of the binding within the matrix, when the volume increases, lead to particle breakup together with the stresses within the particles resulting from the increase in volume. Breakup of the particles was discovered particularly clearly on incorporation into polymer material in the matrix. The matrix composed of polymer material was capable of keeping the particles broken up in this way in a stable fixed position as well.

Tests have incidentally shown that, in the case of utilization of a binder, especially of an adhesive binder in the matrix for fixing of these particles, particularly good fixed positioning within the matrix is enabled. A binder content may preferably be between 2% by volume and 3% by volume of the matrix volume.

Preferably, there is a change in the particle size because of breakup of the particles resulting from the storage of hydrogen by a factor of 0.6, more preferably by a factor of 0.4, based on the $x_{50}$ particle size at the start and after 100 storage operations.

In addition, for example, it is possible to utilize, as a matrix material, a carbon matrix into which the low-temperature hydride is inserted. For example, the University of Utrecht thesis entitled "Carbon matrix confined sodium alanate for reversible hydrogen storage" by J. Gao, retrievable under http://dspace.library.uu.nl/handle/1874/256764, reveals how the hydrogenatable material to be used and the matrix can be matched to one another, such that it is possible to operate the hydrogen storage means produced therefrom at relatively low temperatures as well. The contents of this thesis are hereby incorporated by reference into the disclosure of the present patent application.

In addition, at least one component of the composite material may have been produced in a sintering process. In a sintering process, fine-grain ceramic or metallic substances are heated, but the temperatures remain below the melting temperature of the main components of the material, such that the shape of the workpiece is conserved. At the same time, there is generally shrinkage because the particles of the starting material become more densely packed and fill pore spaces. A fundamental distinction is made between solid-phase sintering and liquid-phase sintering, where a melt is also formed. The thermal treatment in the course of sintering converts a fine- or coarse-grain green body formed in a preceding process step, for example by means of extrusion or powder pressing, to a solid workpiece. It is only through the thermal treatment that the sintering product receives its final properties, such as hardness, strength or thermal conductivity, which are required in the respective use. In this way, for example, it is possible to create an open-pore matrix into which the hydrogenatable material is inserted. It is also possible in this way to create channel structures which are, for example, gas-conducting and in which the hydrogen storage element can be utilized.

In a development of the hydrogen storage element production apparatus, the cavity to be filled is preferably round and a contact element with a contact face is preferably provided, which can be run at least at the surface of the at least first and/or second material introduced into the cavity and can be moved along it, and can more preferably be run into the at least first and/or second material and moved within it/them.

As well as a round geometry, it is also possible for a geometry, especially an angular geometry, of the cavity to be present. For instance, it is possible that, for example, the feed device can be moved in various directions, whether in a Cartesian coordinate system or some other orthogonal coordinate system, including, for example, a polar coordinate system. More particularly, the feed device and/or the cavity to be filled can be moved under control, such that there is a desired deposition of material.

In addition, it is possible that the feed device of the hydrogen storage element production apparatus has an opening cross section having at least one first region for the first material and having a different second region for the second material, specifically for preferably parallel, locally separate filling of the cavity, with the first region preferably at least partly, more preferably fully, embedded into the second region.

In this way, it is possible to produce a wide variety of different geometries in the deposition of the at least two materials, especially in the filling of the cavity. Thus, it is possible to form nonplanar or else planar layer geometries. If, for example, a previously produced material mix is utilized as a material to be supplied, it is also possible in this way to form a matrix in a wide variety of different geometries. The matrix includes, for example, a hydrogen-storing material, but is otherwise heat-conducting or preferably porous.

In a further configuration of the hydrogen storage element production apparatus according to the invention, the apparatus has at least one drive, by means of which at least one controlled relative movement between the cavity to be filled and the feed device is enabled. The control system can, for example, define a trajectory, along which the feed device and/or the cavity can be run. For example, computer-assisted open-loop or closed-loop control of the movement is envisaged. This can preferably be integrated into a corresponding control unit which subjects the device to open-loop or closed-loop control, especially, for example, also with regard to the filling of the cavities.

In a development of the hydrogen storage element production apparatus, the feed device (or filler) and/or the cavity is/are arranged so as to be rotatable relative to one another.

As well as the filling of the cavity (of the die of a press) with just a single material, especially a powder, the hydrogen storage element production apparatus proposed then allows the same material to be conducted into the first and also into the second inlet, but, for example, with different grain size. In this way, for example, it is possible to establish a controlled gradient in the hydrogen storage element. In addition, it is possible, for better distribution of the material, especially of a powder, for example, to provide the feed device with one or more scraper elements. It is thus possible, for example, to align the material. More particularly, it becomes possible to replace or else supplement a layer structure with a uniform helical structure. In addition, it is likewise possible to make the layer structure inhomogeneous in an extent at right angles to the machine axis.

By contrast with other methods, the invention thus allows not just a layer-by-layer construction of layers consisting of preferably powder, wherein the layer structure can be regarded as constant at right angles to the machine axis. Instead, it is simultaneously possible to produce at least two or more layers, especially each of different material.

In addition, it may be the case that the cavity of the hydrogen storage element production apparatus to be filled is a die cavity and the feed device is a filler and the hydrogen storage element production apparatus is a press for compaction of the at least first and the second material in the die cavity. Preferably, the press is formed by a lower ram and also an upper ram.

Another hydrogen storage element production apparatus which, however, may likewise be constructed according to the proposal is, for example, a 3D printer. This may have, for example, a rotating filler having two or more chambers for different materials, especially powders. In the 3D printer too, it is possible to implement the concept of providing a material feed concept in which the filler rotates about the longitudinal machine axis (i.e. about the axis along which the upper and/or lower ram(s) move(s)). A material reservoir, preferably for powder, is divided here into at least two segments, where each segment may be filled as desired with different powder. The configuration of the individual segments in terms of size, shape and position is not fixed here.

Solidification, for example by laser beam, in shafts of the filler that are intended for the purpose may follow the filling operation.

In a further concept of the invention, which may be present independently or else dependently thereon, a feed device of an apparatus, especially of a press, preferably of a device or press, as already described above, is proposed, specifically for feeding of at least one first and one second material, with an opening cross section of the feed device having at least one first region and a separate second region for parallel separate feeding of the first and second materials.

As above, this concept is also to be elucidated in detail hereinafter using the example of a hydrogen storage element. However, the details set out here are not restricted to this example. Instead, these can generally be employed in accordance with the proposed concept for the feed device.

A feed device for use in a hydrogen storage element production apparatus is likewise provided with an opening cross section with at least one first region for the first material and with a separate second region for the second material for preferably parallel, locally separate filling of the cavity, the first region being preferably at least partly, more preferably fully, embedded into the second region.

For example, the feed device is configured such that it has a material feed for the first material and a separate material feed for the second material, with the presence of a mixed zone feed along which the first and second materials are miscible and can be fed in. In this way, it is possible to form a gradient, but in particular also a matrix. The mixed zone feed is present within the feed device.

The term "matrix" already used above describes a composite material composed of two or more associated materials. In this case, one material preferably absorbs another. The matrix may have open pores or else closed pores. The matrix is preferably porous. The absorption of one material by the other material can result, for example, in supplementary material properties otherwise possessed only by the individual component. In respect of the properties of the composite materials, physical properties and geometry of the components are important. In particular, size effects often play a role. The bonding is effected, for example, in a cohesive or form-fitting manner or a combination of the two.

In this way, for example, fixed positioning of the hydrogenatable material in the matrix can be enabled. Further components of the matrix may, for example, be materials for the conduction of heat and/or the conduction of gas.

As well as the at least one polymer, the matrix may include one or more further components, for example materials for the conduction of heat and/or the conduction of gas.

The matrix may, in accordance with the invention, comprise one or more polymers and is therefore referred to as polymeric matrix. The matrix may therefore comprise one polymer or mixtures of two or more polymers. The matrix preferably comprises only one polymer. More particularly, the matrix itself may be hydrogen-storing. For example, it is possible to use ethylene (polyethylene, PE). Preference is given to utilizing a titanium-ethylene compound. In a preferred configuration, this can store up to 14% by weight of hydrogen.

The term "polymer" describes a chemical compound composed of chain or branched molecules, called macromolecules, which in turn consist of identical or equivalent units, called the constitutional repeat units. Synthetic polymers are generally plastics.

Through the use of at least one polymer, the matrix can impart good optical, mechanical, thermal and/or chemical properties to the material. For example, the hydrogen storage means, by virtue of the polymer, may have good thermal stability, resistance to the surrounding medium (oxidation resistance, corrosion resistance), good conductivity, good hydrogen absorption and storage capacity or other properties, for example mechanical strength, which would otherwise not be possible without the polymer. It is also possible to use polymers which, for example, do not enable storage of hydrogen but do enable high expansion, for example polyamide or polyvinyl acetates.

According to the invention, the polymer may be a homopolymer or a copolymer. Copolymers are polymers composed of two or more different types of monomer unit. Copolymers consisting of three different monomers are called terpolymers. According to the invention, the polymer, for example, may also comprise a terpolymer.

Preferably, the polymer (homopolymer) has a monomer unit which, as well as carbon and hydrogen, preferably additionally includes at least one heteroatom selected from sulfur, oxygen, nitrogen and phosphorus, such that the polymer obtained, in contrast to polyethylene, for example, is not entirely nonpolar. It is also possible for at least one halogen atom selected from chlorine, bromine, fluorine, iodine and astatine to be present. Preferably, the polymer is a copolymer and/or a terpolymer in which at least one monomer unit, in addition to carbon and hydrogen, additionally includes at least one heteroatom selected from sulfur, oxygen, nitrogen and phosphorus and/or at least one halogen atom selected from chlorine, bromine, fluorine, iodine and astatine is present. It is also possible that two or more monomer units have a corresponding heteroatom and/or halogen atom.

The polymer preferably has adhesive properties with respect to the hydrogen storage material. This means that it adheres well to the hydrogen storage material itself and hence forms a matrix having stable adhesion to the hydrogen storage material even under stresses as occur during the storage of hydrogen.

The adhesive properties of the polymer enable stable penetration of the material into a hydrogen storage means and the positioning of the material at a defined point in the hydrogen storage means over a maximum period of time, i.e. over several cycles of hydrogen storage and hydrogen release. A cycle describes the operation of a single hydrogenation and subsequent dehydrogenation. The hydrogen storage material should preferably be stable over at least 500 cycles, especially over at least 1000 cycles, in order to be able to use the material economically. "Stable" in the context of the present invention means that the amount of hydrogen which can be stored and the rate at which hydrogen is stored, even after 500 or 1000 cycles, corresponds essentially to the values at the start of use of the hydrogen storage means. More particularly, "stable" means that the hydrogenatable material is kept at least roughly at the position within the hydrogen storage means where it was originally introduced into the storage means. "Stable" should especially be understood to the effect that no separation effects occur during the cycles, where finer particles separate and are removed from coarser particles.

The hydrogen storage material of the present invention is especially a low-temperature hydrogen storage material. In the course of hydrogen storage, which is an exothermic process, temperatures of up to 150° C. therefore occur. A polymer which is used for the matrix of a corresponding hydrogen storage material therefore has to be stable at these temperatures. A preferred polymer therefore does not break down up to a temperature of 180° C., especially up to a temperature of 165° C., especially up to 145° C.

More particularly, the polymer is a polymer having a melting point of 100° C. or more, especially of 105° C. or more, but less than 150° C., especially of less than 140° C., particularly of 135° C. or less. Preferably, the density of the polymer, determined according to ISO 1183 at 20° C., is 0.7 g/cm$^3$ or more, especially 0.8 g/cm$^3$ or more, preferably 0.9 g/cm$^3$ or more, but not more than 1.3 g/cm$^3$, preferably not more than 1.25 g/cm$^3$, especially 1.20 g/cm$^3$ or less. The tensile strength according to ISO 527 is preferably in the range from 10 MPa to 100 MPa, especially in the range from 15 MPa to 90 MPa, more preferably in the range from 15 MPa to 80 MPa. The tensile modulus of elasticity according to ISO 527 is preferably in the range from 50 MPa to 5000 MPa, especially in the range from 55 MPa to 4500 MPa, more preferably in the range from 60 MPa to 4000 MPa. It has been found that, surprisingly, polymers having these mechanical properties are particularly stable and have good processibility. More particularly, they enable stable coherence between the matrix and the hydrogenatable material embedded therein, such that the hydrogenatable material remains at the same position within the hydrogen storage means over several cycles. This enables a long lifetime of the hydrogen storage means.

More preferably, in the context of the present invention, the polymer is selected from EVA, PMMA, EEAMA and mixtures of these polymers.

EVA (ethyl vinyl acetate) refers to a group of copolymers of ethylene and vinyl acetate having a proportion of vinyl acetate in the range from 2% by weight to 50% by weight. Lower proportions of vinyl acetate lead to the formation of rigid films, whereas higher proportions lead to greater adhesiveness of the polymer. Typical EVAs are solid at room temperature and have tensile elongation of up to 750%. In addition, EVAs are resistant to stress cracking. EVA has the following general formula (I):

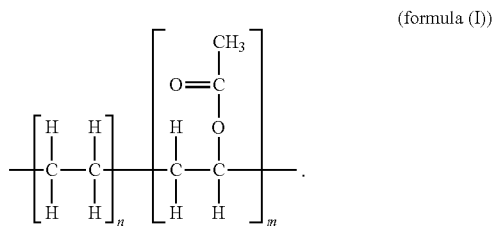
(formula (I))

EVA in the context of the present invention preferably has a density of 0.9 g/cm³ to 1.0 g/cm³ (according to ISO 1183). Yield stress according to ISO 527 is especially 4 to 12 MPa, preferably in the range from 5 MPa to 10 MPa, particularly 5 to 8 MPa. Especially suitable are those EVAs which have tensile strengths (according to ISO 527) of more than 12 MPa, especially more than 15 MPa, and less than 50 MPa, especially less than 40 MPa, particularly 25 MPa or less. Elongation at break (according to ISO 527) is especially >30% or >35%, particularly >40% or 45%, preferably >50%. The tensile modulus of elasticity is preferably in the range from 35 MPa to 120 MPa, particularly from 40 MPa to 100 MPa, preferably from 45 MPa to 90 MPa, especially from 50 MPa to 80 MPa. Suitable EVAs are sold, for example, by Axalta Coating Systems LLC under the Coathylene® CB 3547 trade name.

Polymethylmethacrylate (PMMA) is a synthetic transparent thermoplastic polymer having the following general structural formula (II):

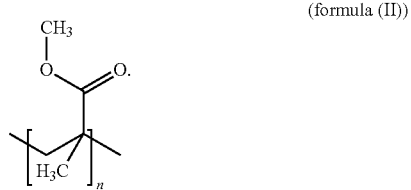
(formula (II))

The glass transition temperature, depending on the molar mass, is about 45° C. to 130° C. The softening temperature is preferably 80° C. to 120° C., especially 90° C. to 110° C. The thermoplastic copolymer is notable for its resistance to weathering, light and UV radiation.

PMMA in the context of the present invention preferably has a density of 0.9 to 1.5 g/cm³ (according to ISO 1183), especially of 1.0 g/cm³ to 1.25 g/cm³. Especially suitable are those PMMAs which have tensile strength (according to ISO 527) of more than 30 MPa, preferably of more than 40 MPa, especially more than 50 MPa, and less than 90 MPa, especially less than 85 MPa, particularly of 80 MPa or less. Elongation at break (according to ISO 527) is especially <10%, particularly <8%, preferably <5%. The tensile modulus of elasticity is preferably in the range from 900 MPa to 5000 MPa, preferably from 1200 to 4500 MPa, especially from 2000 MPa to 4000 MPa. Suitable PMMAs are sold, for example, by Ter Hell Plastics GmbH, Bochum, Germany, under the trade name of 7M Plexiglas® pellets.

EEAMA is a terpolymer formed from ethylene, acrylic ester and maleic acid anhydride monomer units. EEAMA has a melting point of about 102° C., depending on the molar mass. It preferably has a relative density at 20° C. (DIN 53217/ISO 2811) of 1.0 g/cm³ or less and 0.85 g/cm³ or more. Suitable EEAMAs are sold, for example, under the Coathylene® TB3580 trade name by Axalta Coating Systems LLC.

Preferably, the composite material comprises essentially the hydrogen storage material and the matrix. The proportion by weight of the matrix based on the total weight of the composite material is preferably 10% by weight or less, especially 8% by weight or less, more preferably 5% by weight or less, and is preferably at least 1% by weight and especially at least 2% by weight to 3% by weight. It is desirable to minimize the proportion by weight of the matrix. Even though the matrix is capable of storing hydrogen, the hydrogen storage capacity is not as significant as that of the hydrogen storage material itself. However, the matrix is needed in order firstly to keep any oxidation of the hydrogen storage material that occurs at a low level or prevent it entirely and to assure coherence between the particles of the material.

It is preferable that the matrix is a polymer having low crystallinity. The crystallinity of the polymer can considerably alter the properties of a material. The properties of a semicrystalline material are determined both by the crystalline and the amorphous regions of the polymer. As a result, there is a certain relationship with composite materials, which are likewise formed from two or more substances. For example, the expansion capacity of the matrix decreases with increasing density.

The matrix may also take the form of prepregs. Prepreg is the English abbreviation of "preimpregnated fibers". Prepregs are semifinished textile products preimpregnated with a polymer, which are cured thermally and under pressure for production of components. Suitable polymers are those having a highly viscous but unpolymerized thermoset polymer matrix. The polymers preferred according to the present invention may also take the form of a prepreg.

The fibers present in the prepreg may be present as a pure unidirectional layer, as a fabric or scrim. The prepregs may, in accordance with the invention, also be comminuted and be processed as flakes or shavings together with the hydrogenatable material to give a composite material.

In one version of the present invention, the polymer may take the form of a liquid which is contacted with the hydrogenatable material. One meaning of "liquid" here is that the polymer is melted. However, the invention also encompasses dissolution of the polymer in a suitable solvent, in which case the solvent is removed again after production of the composite material, for example by evaporation. However, it is also possible that the polymer takes the form of pellets which are mixed with the hydrogenatable material. As a result of the compaction of the composite material, the polymer softens, so as to form the matrix into which the hydrogenatable material is embedded. If the polymer is used in the form of particles, i.e. of pellets, these preferably have an $x_{50}$ particle size (volume-based particle size) in the range from 30 µm to 60 µm, especially 40 µm to 45 µm. The $x_{90}$ particle size is especially 90 µm or less, preferably 80 µm or less.

In addition, it is possible to provide the feed device with an additional unit for feeding of material in strand, ribbon or sheet form, by means of which a material ribbon can be conducted into the opening cross section. It is thus possible, for example, to supply a woven fabric, a nonwoven fabric, a film, laminates made from two or more materials or some other material present in ribbon form together with the other at least two materials, preferably in parallel with the feeding of the first and second materials. It is likewise also possible to supply fibers, wires or other materials to be embedded by a corresponding configuration of the feed device and lay them down as well.

In a further concept of the invention, a process for producing a blank, preferably with a device as described above, is proposed and elucidated in detail hereinafter. At least one first material and one second material are utilized, with a first material feed of the first material via a first region of a feed device and a second material feed of the second material, parallel to the first material feed, via a second region of the feed device, wherein the at least first and second materials fed in in parallel and in various regions are filled into a cavity and the blank is formed therefrom.

This concept too is elucidated in detail hereinafter using the example of a hydrogen storage element, each of the respective features not being restricted to this configuration. Instead, this serves merely for elucidation, and it is generally possible to connect the features to the concept proposed.

With regard to the hydrogen storage element, by means of at least one first material comprising a hydrogen-storing material, and by means of a second material which is heat-conducting, a composite material is formed, with a first material feed of the first material via a first region of a feed device and a second material feed of the second material, parallel to the first material feed, via a second region of the feed device.

The materials used may especially be those that have already been described above.

What is meant by the term "composite material" here is that various kinds of materials are used in the hydrogen storage element in order to arrange other materials, possibly having different functionalities, as well as hydrogenatable material. The composite material is formed, for example, from individual components such as the matrix and the individual layers. In respect of the properties of the composite material, physical properties and geometries of the components, for example, are of significance. The composite material has preferably been compacted.

In a development of the process, at least one of the two materials, preferably the first and second materials, is pourable, free-flowing and hence flowable, and is preferably fed in in pulverulent form. For example, the feed device is rotated, the first and second materials exit the feed device in parallel, and a composite material is formed as hydrogen storage element, in which the at least two materials are not arranged layer by layer one on top of the other, but instead one material is arranged in the form of a screw or helix or in the form of a wave. It is advantageous that the helical geometry in the composite material is supported by the material that surrounds the helix as the structure.

It is preferable that the first and second materials form a porous structure in the hydrogen storage element, preferably one or more channels in the composite material by means of one or more spikes or spacers and/or material to be removed. More particularly, it is also possible in this way to create a composite material which, after compaction, without further aftertreatment, is arranged directly in a vessel of a hydrogen storage means.

In a further configuration, the first and second materials are arranged at least partly in separate locations from one another and form separate layers or generally regions of the hydrogen storage element.

In yet a further configuration of the process, the first and second materials are introduced into a cavity, the first and second materials being compressed in the cavity, preferably by moving an upper and/or lower ram within the cavity. In a development, the cavity is formed by a vessel of the hydrogen storage means.

It is further preferable when isostatic pressing of the composite material for the hydrogen storage element is effected. By the application of pressures above 500 bar, especially of pressures in a range between 1500 and 6000 bar, it is possible to create a particularly close connection between a hydrogenatable material and a heat-conducting material, for example.

Another kind of compaction can incidentally be effected under the simultaneous influence of heat and/or, for example, of a gas. It is also possible, for example, to provide suction, for example for removal of a binder which may be arranged in a first and/or second region of the composite body by suction. The binder may, for example, be removed completely or else only partially from the composite material, for example to create a porous structure. For example, a binder may be arranged in one of the two regions and no binder in the other of the two regions. It is also possible to use different binders, for example, by introducing a different binder in the first region than in the second region.

In a further concept of the invention, a blank is proposed, comprising at least one first and one second material, preferably corresponding to the materials which have already been described above. The first and second materials are arranged separately from one another at least in one region and form, for example, separate layers. In this way, it is possible with preference to create layers in 3-D form such as a helix, a screw, a wave or another nonplanar geometry of at least one layer, especially the layer of the first material and the layer of the second material in the blank.

The concept is again illustrated hereinafter as well with reference to a hydrogen storage element comprising a composite material, although the respective features should again be understood more generally in the sense of the above concept and are not limited to the example. For instance, at least one first and one second material are proposed, the first material comprising a hydrogen-storing material and the second material a heat-conducting material, the hydrogen storage element preferably having been produced with a production apparatus and/or by a process as described above.

It has been found to be advantageous when, in the hydrogen storage element, the second material extends from an interior of the composite material to an exterior of the composite material, the first and second materials being separated from one another at least in one region.

What is meant by "variably" is that the density of the hydrogenatable material in the matrix and in the layers has a gradient, for example such that there is a slope or a rise in the amount and/or density of the hydrogenatable material, for example depending on the fluid which flows through the hydrogen storage element. It is preferably the case that a gradient is formed between the first and second materials, along which a transition from the first to the second layer takes place.

It may also be the case that the hydrogen storage element has components in the form of a core-shell structure, in which the core comprises a first material and the shell a different second material, the first material and/or the second material comprising a hydrogen-storing material. The latter is preferably present, for example, in the form of layers of the composite material. In one configuration, the second material of the shell comprises a polymer which is configured so as to be at least hydrogen-permeable. In a further configuration, the core comprises a heat-conducting material and the shell a hydrogen-storing material. On the other hand, it may be the case that the core comprises a primarily hydrogen-storing material and the shell a primarily heat-conducting material, the heat-conducting material being hydrogen-permeable.

In addition, in the process for producing the hydrogen storage element, separate laminas of a hydrogen-storing material and a heat-conducting material can be introduced into a press mold and these can be compressed together to produce a sandwich structure, in which case the heat-conducting material, on use of the sandwich structure for hydrogen storage, assumes the task of heat conduction, preferably in the direction of the extent of the laminas. It is possible, for example, for one or more matrices to be arranged between the separate laminas and/or adjacent thereto, such that the composite material thus receives first and second regions.

For example, it may be the case that a metal powder and/or normal natural graphite are utilized as heat-conducting material, in which case, when normal natural lenticular graphite or, for example, flakes of expanded graphite are used, there is preferably horizontal alignment on filling, such that it is possible to utilize heat conduction in the direction of an aligned hexagonal lattice structure in the sandwich structure.

In addition, it may be the case that, alternatively or additionally, one or more laminas composed of films of a rolled expanded graphite, flakes of a rolled expanded graphite and/or a graphite fabric are introduced into the sandwich structure as heat-conducting material.

It is additionally preferable that the composite material of the hydrogen storage element is porous. This can facilitate conduction of hydrogen gas.

More particularly, a third material is provided, which forms a functional lamina in the hydrogen storage element, especially a porous, gas-permeable lamina.

In a preferred embodiment, a matrix and at least one layer each comprise carbon. In this way, the thermal conductivity of the hydrogen storage element can be improved. It is thus possible to better dissipate/supply the heat which arises on absorption and/or release of the hydrogen.

It is preferable that the matrix and/or a layer comprises a mixture of various types of carbon, including, for example, expanded natural graphite as one of the types of carbon.

Preference is given to using unexpanded graphite together with expanded natural graphite, in which case more unexpanded graphite than expanded graphite is used, based on weight. More particularly, the matrix may comprise expanded natural graphite with, for example, a hydrogenatable material arranged therein.

Preferably, the composite material has an elastic property in at least one region. In this way, it is possible to ensure that the hydrogenatable material can expand, for example, on absorption of hydrogen without damaging or excessively stressing the composite material.

Hereinafter, closer reference is made to various further executions of the inventive concept.

As well as the possibility that the feed device, also called filling unit or filler, can rotate in the longitudinal axis of the machine, it is possible, for example, to position the filler for filling of the die cavity above the latter, with the top end of the lower ram concluding with the top end of the die. While the lower ram is being moved into the lower position, the filler rotates with release of the materials about the longitudinal machine axis. A plurality of chambers or material feed shafts at the outlet orifice of the filler that are filled with different powders thus gives rise to a characteristic helical structure. The layer thicknesses can be controlled via the configuration of the chambers, the speed of rotation and the speed of the lower ram. However, the proportion of the individual layers at right angles to the longitudinal machine axis is fixed essentially by the structure and the division of the chambers. As well as the internals for division of the filler into various chambers, it is additionally possible for different internals to be accommodated in the chambers, which affect the flow characteristics of the powder or similar properties. These may, for example, be radial spokes or else grids or other geometries. The basic construction of a press mold is not restricted here.

It is additionally possible to use a plurality of mold planes and spikes. It is additionally possible that, in addition to the powder introduced, internals in the form of plies of films, fibers or fabrics, or carbon foil, carbon fibers or carbon fabric are introduced into the die cavity. These plies may be introduced either as coherent films or fabrics, or else in the form of flakes or finely chopped material. The plies may be introduced here in addition to the existing materials, or may partly or fully replace them.

As well as the use of different powders or powders and additions, in the form, for example, of finely chopped material, it is likewise possible to use powders of the same alloy with different particle sizes and/or different particle form. Additions which can be added to the powder can influence, for example, the flow characteristics and properties during filling, during compaction or during subsequent process steps. It is likewise possible for the powders used in a chamber to consist of mixtures of different powders.

In the case of use of flakes or finely chopped material, these may be aligned by means of the internals addressed previously in accordance with the desired properties of the compacts. Thus, in one execution, carbon fiber flakes are aligned such that the heat flow in the compact is preferably at right angles to the longitudinal axis.

In a further execution of the filler, it is provided with a device that sets the filler in vibration at right angles to the machine axis, in order thus to affect the flow characteristics of the powder or of the finely chopped material or bulk material.

An additional execution of the invention envisages a construction composed of three functional layers, in which case, for example, an outer layer serves for removal of heat or supply of heat, a middle layer serves as storage medium, and an inner layer serves for the supply or removal of the medium to be stored. In this case, the outer layer for heat transfer may be executed as a graphite layer, the middle layer as a metal hydride for storage of hydrogen, and the inner layer may be made from another material, especially metal alloy, preferably chromium-nickel powder, which serves for supply and removal of the hydrogen.

In a further execution, the filler is filled outside the die filling position. In this case, the filler rotates during the filler filling operation, whereas it does not necessarily rotate during the filling of the die cavity. Rotation of the filler in the course of filling of the die may be advisable in order, for example, to counteract filling differences which can occur in the case of cavities for production of components having toothings. Filling of the die with suction is not absolutely necessary, but may be advisable in order thus to prevent uncontrolled mixing of the individual powders. For example, it is possible to fill the filler in the outer region with a different powder than in the inner region, viewed with reference to the center axis or the axis of rotation of the filler. For example, it is thus possible to fill the outer ring of the filler with a powder having specific properties, for example one suitable for hardening. In addition, it is possible that the filler has three or more chambers, in which case the inner and outer regions are filled with a powder into which pressing auxiliary has been introduced, in which case a powder without pressing auxiliary is preferably introduced in the middle region. Since the pressing auxiliary serves to reduce the friction between powder and mold components, it is possible to dispense with pressing auxiliary in the middle region. In addition, the addition of pressing auxiliary, in spite of its low density, always means a decrease in the particle density. This decrease in particle density can thus be reduced further without lowering the lubricating function between mold components and powder.

With the three-chamber or else multichamber filler described, consisting of an inner region and at least two surrounding ring regions, it is thus possible, for example, also to press a gear with an inner hole, in which the die cavity is filled by means of the filler construction described such that the pressing auxiliary is present only in the inner and outer regions, i.e. in the region of the spike and the outer toothing. The chamber construction here may be of any degree of complexity and is independent of the components to be pressed. It is even possible to use different powders for openings, for example. In this case, it is merely necessary to position the setting on transfer of the filler to the filling position of the die with sufficient accuracy. By means of different filling of the component cavity, it is thus possible to produce various component properties according to the requirement of the individual component regions or functional bases of the component. For example, it is possible, in the case of a gear, to produce the component region between inner toothing and outer toothing with a powder which is compressed to a very low density, in order thus to assure the damping properties of the porous structure and, in addition, to assure the high density needed for the high stress on the inner and outer regions. Correspondingly, the filler proposed can also be used to create a wide variety of different complex geometries for the hydrogen storage element.

In the moving of the filler into the filling position for filling of the die, it is possible, for example, that all the tool components arranged beneath, at their top ends, are positioned in a plane with the top end of the die. In this way, it is possible to counteract mixing of the powders in the course of movement of the filler over the die.

In a further working example, however, it is also possible that the top end of the lower ram is not in a plane with the top end of the die, but is below it. It is thus possible to apply a layer of preferably powder to the lower ram, in which case this need not be a single powder from a single chamber. It is also possible for powders to be introduced into the die cavity as the first layer from two or more chambers, or other materials as described above. For example, a filler may be formed from three chambers, in which case one chamber may be filled with graphite, one with a metal hydride and a further chamber with a powder intended for gas conduction. If the chamber of the filler provided with graphite, at the moment when the filler moves in the direction of the filling position of the die, is opposite the die, it is possible by lowering the lower mold component or the lower mold components before they reach the filler to fill the lower region of the die cavity with graphite. If the filler is above the die cavity, the filler can then generate by rotation, for example, a helical structure on the graphite layer in the cavity, which thus commences with a graphite layer at the bottom. It is likewise possible by the same method to generate a homogeneous powder layer comprising graphite at the top in the material arrangement to be pressed in the cavity, in order to establish a homogeneous graphite layer at the top end and at the lower end of the compact.

In addition, it is possible that the direction of rotation and the speed of rotation is altered during the filling operation, in which case it is likewise possible that the filler remains stationary in a fixed position.

It is likewise possible that the position of the entire filler relative to the cavity to be filled is varied during the filling operation.

As well as the introduction of the materials necessary for the later function of the compact or the finished product formed therefrom, which can be introduced by means of the filler, it is likewise possible that individual components are introduced as spacers into the cavity, which are replaced or removed in later process steps. This can optionally be effected by a thermal or chemical process.

It is likewise conceivable that the shape of the component is not produced by the compression from powders and/or finely chopped material or flakes, but by extrusion of different extrusion media into a shape by rotating them, or into a non-rotating shape by rotating the inlet geometry.

In a further concept of the invention which can be implemented with one or more of the above-described variants together, or else independently therefrom, a press with a cavity to be filled with material and with a comb movable by means of a moving device of the press is proposed, wherein the moving device can run the comb into the material and over it. For example, a programmable control system for the moving device is present, which converts a programmable path into a movement of the comb. By means of the comb or else a bar or one or more teeth, it is firstly possible to bring about smoothing, especially alignment of a material at least in the region of a surface thereof. Secondly, it is also possible by means of the comb or other components to introduce a gradient into the layers.

Preferably, the comb is at least partly exchangeable. In this way, the apparatus can remain as it is. However, according to the blank to be produced and/or material to be used, it is possible to utilize an adapted comb, a bar, a tooth or the like. Incidentally, the comb may have a multitude of teeth. The comb preferably has at least one tooth which has a broadening for making contact with the material. This makes it possible to establish controlled gradients by means, for example, of different broadenings.

In a development, a separation between two teeth of the comb can be altered. This can be effected, for example, during operation, i.e. during the contact of the teeth with the material. In this way, it is possible, for example, to produce spiral patterns or else different gradient separations, matched, for example, to a helix. It is further preferable when two or more combs can be moved in parallel.

Preferably, at least two materials for filling of the cavity of the press are provided, the comb being movable to such an extent that it runs at least into the filled first material, preferably into the first and second materials. If the material has been introduced into a cavity of a press, the comb performs a movement so as to make contact with the material. It is also possible that the comb dips into the filled material and is moved in the cavity. The comb may, for example, dip in to different depths. It is additionally possible that the comb, in the course of filling of the cavity with first and second material, dips into and is moved within at least one of the two first and second materials. The combs may be integrated into the filler geometry.

Further advantageous configurations and also features are apparent from the figures which follow and the corresponding description. The individual features that are apparent from the figures and the description are merely illustrative and not restricted to the particular configuration. Instead, one or more features from one or more figures can be combined with other features from other figures and also from the above description to give further configurations. Therefore, the features are specified not in a restrictive manner but instead by way of example. More particularly, some executions of the filler construction are presented:

FIGS. 1 to 8 each show three representations, namely on the left a top view of the filler for illustration of its chamber and especially chamber outlet orifice arrangement, and top right a perspective view of the compact, and bottom right a section through the compact which can be produced by means of the filler and a press (not shown), with choice of a cylindrical compact in each case for illustration and without showing openings or other details of geometry, FIGS. 9 to 28 show, in principle, the sequence in the filling of a die cavity with two fillers in different process stages, FIGS. 29 to 44 show, in principle, the sequence in the filling of a die cavity with one filler having two chambers, FIGS. 45 to 54 show, in principle, the sequence in the filling of a die cavity with a rotary filler, FIGS. 55 to 60 show a further working example of a rotary filler having three chambers and a representation of a blank produced by compression of powder materials introduced into a die cavity by means of the rotary filler, and FIGS. 61 to 63 show a further example of a rotary filler.

FIG. 1 shows a filler 11 with two chambers 5, 6 of equal size for two different powders 1, 2, and the corresponding compact 9.

FIG. 2 shows a filler 11 with three chambers 5, 6, 7, the division of the three chambers 5, 6, 7 by area being different in each case, and the corresponding compact 9.

FIG. 3 shows a filler 11 similar to that from FIG. 2, but with four chambers 5, 6, 7, 8 rather than three chambers, and the corresponding compact 9.

FIG. 4 shows a possible chamber construction of a filler 11 for three powders 1, 2, 3, with which four layers of the compact 9 (likewise shown) are produced, the material in the center of the compact 9 here being homogeneous and a helical structure being present on the outside.

FIG. 5 shows a filler 11 for three different materials, where material 1 surrounds the helix formed by materials 2 and 3 in the compact 9 which is likewise shown.

FIG. 6 shows a filler 11 and the compact 9 which is produced with the aid of normal filling at the top and bottom ends, and with a helical structure in the middle, it being possible to isolate the materials present in the interior, material 2 and material 3 here, completely from the outside, here by means of material 1, material 4 and material in the chamber 5, and the filler 11 serving for production of the middle segment of the compact 9 in the form of a helix.

FIG. 7 shows a further working example of a filler 11 and the compact 9 producible therewith.

FIG. 8 shows a further working example of a filler 11 and the compact 9 producible therewith.

Figure 1:
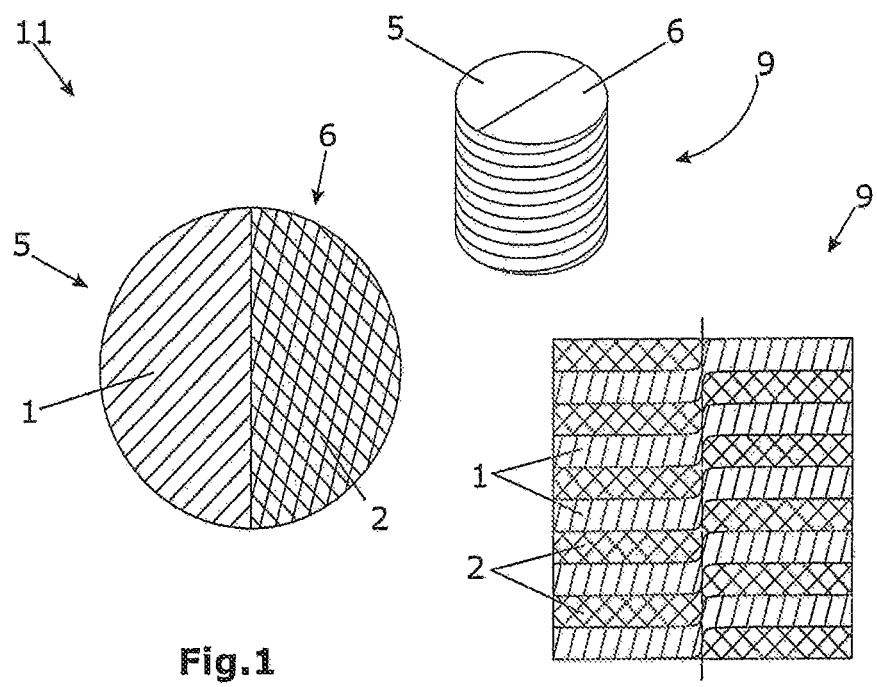
Figure 2:
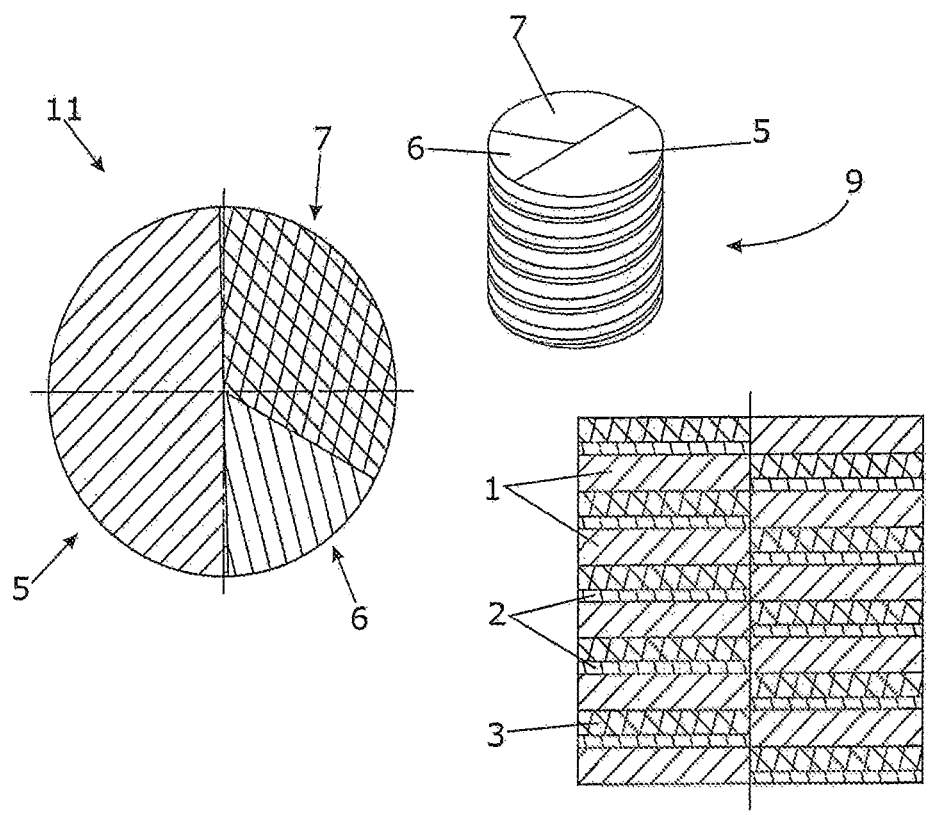
Figure 3:
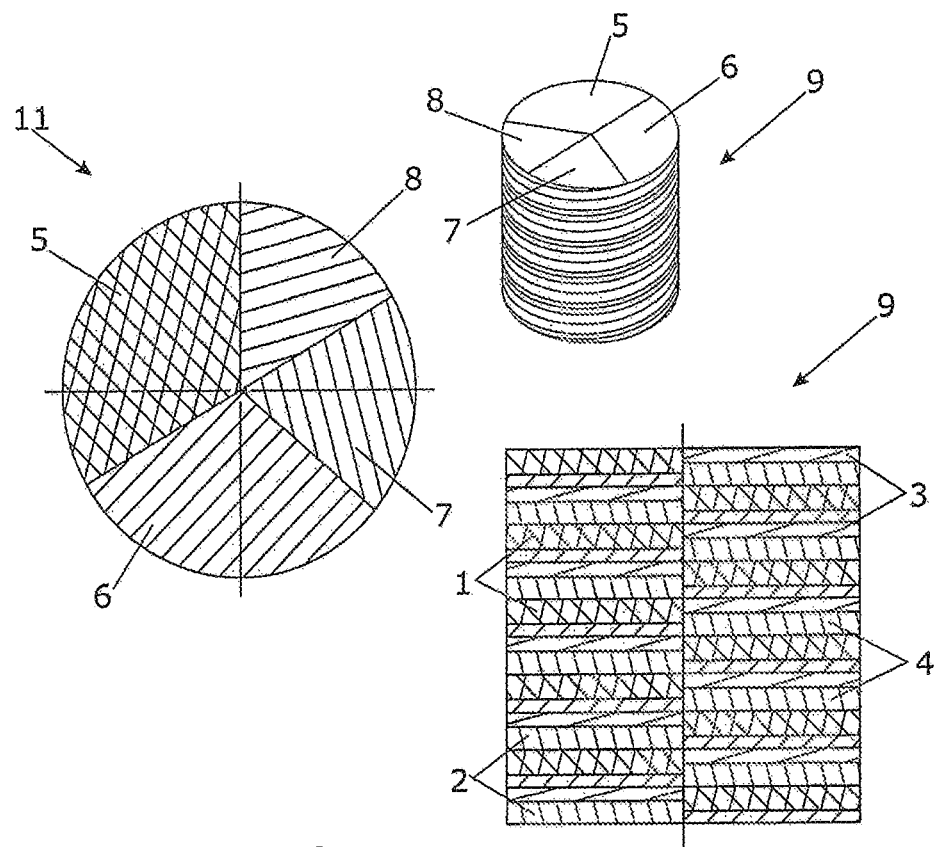
Figure 4:
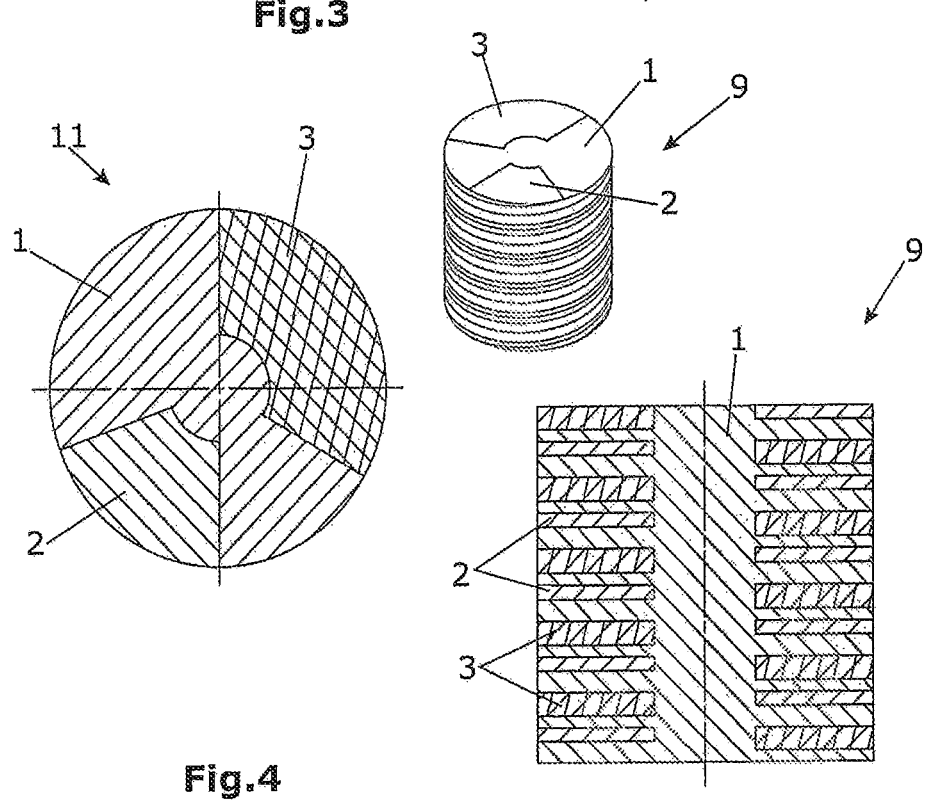
Figure 5:
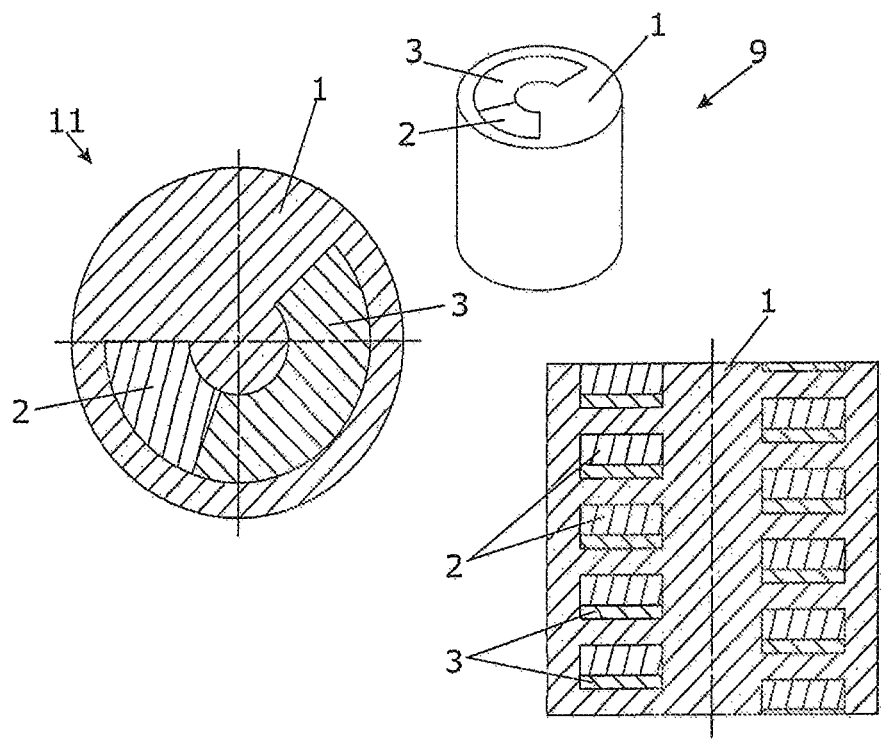
Figure 6:
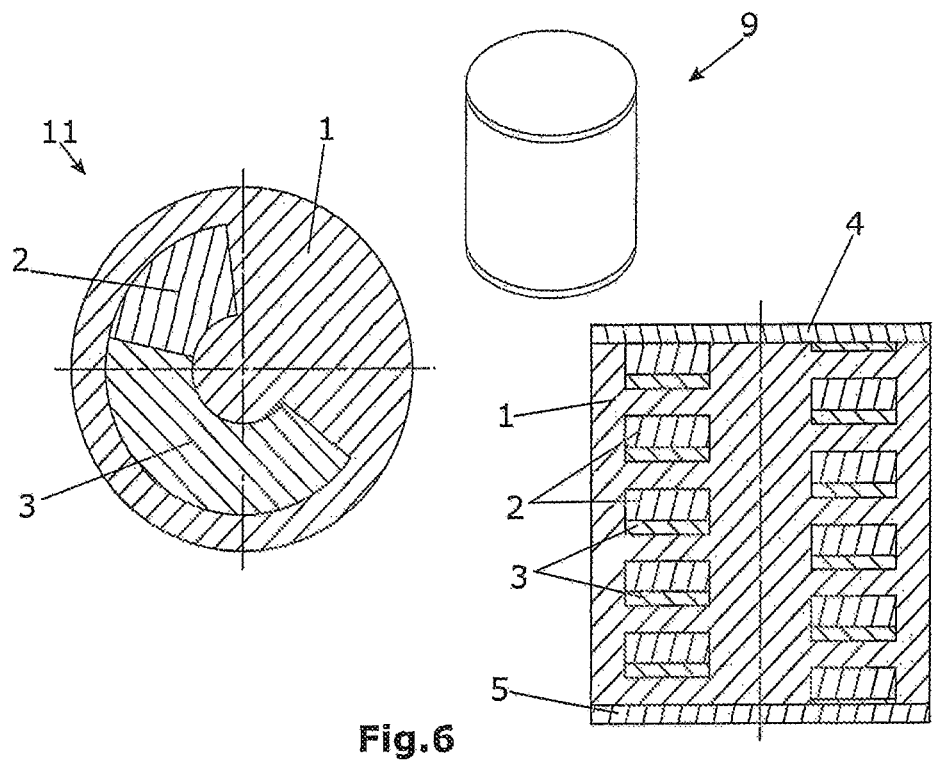

In the top views of fillers to the left of each of FIGS. 1 to 8, outlet orifice arrangements for the filler chambers are shown, the effect of which is that powder material is laid down in intermeshing helices in a press cavity when the filler in its filling position rotates above the press cavity and the base of the cavity becomes ever further removed in the course of relative rotation of the filler. The outlet orifices of at least two chambers, viewed in the radial direction and the direction of rotation of the filler, are offset relative to one another, i.e. cover concentric area regions which overlap one another, or one of which is arranged within the other.

FIG. 9 to FIG. 28 show the basic sequence in the filling of a die cavity with two fillers. In this case, the filler 18 is filled with the material 1, and filler 24 with material 2. The example shows a 4-lamina structure, wherein two laminas of powder 1 and two laminas of powder 2 are compressed. However, it is also possible to use more than two fillers. In this case, the number, sequence and thickness of the laminas may be configured freely on the basis of the properties to be achieved. The respective sequence in each figure is described briefly hereinafter.

Figure 9:
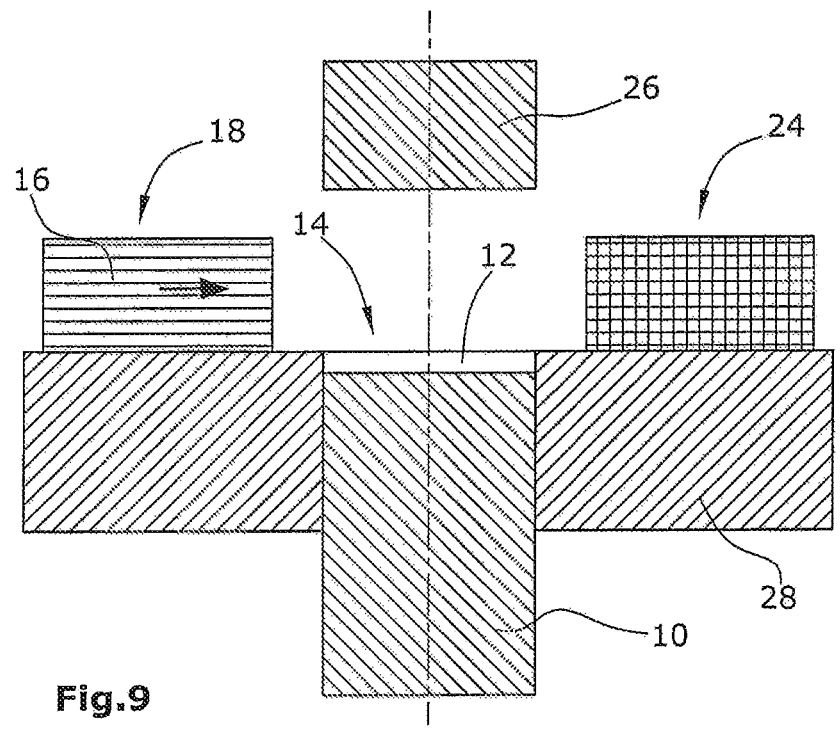

FIG. 9: the lower ram 10 is run downward for the particular path that corresponds to the height of the part of the filling space 12 (of the cavity 14) for the first material 16. The first filler 18 moves over the cavity 14.

Figure 10:
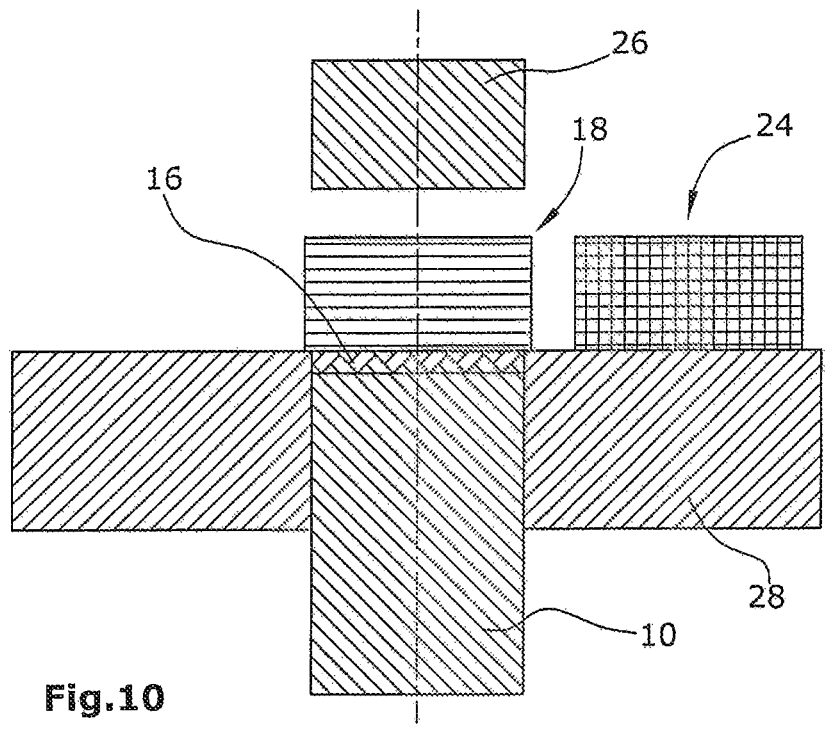

FIG. 10: the first (powder) material 16 falls under gravity into the die cavity 14.

Figure 11:
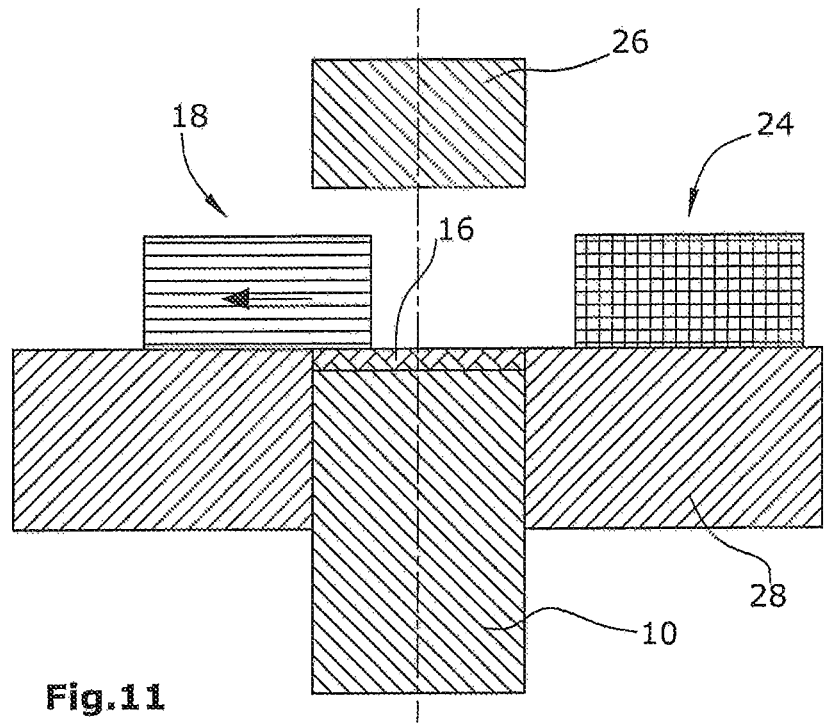

FIG. 11: the filler 18 returns back to its starting position and scrapes the (powder) material 16 in the die cavity 14 at the level of the top end of the die 20.

Figure 12:
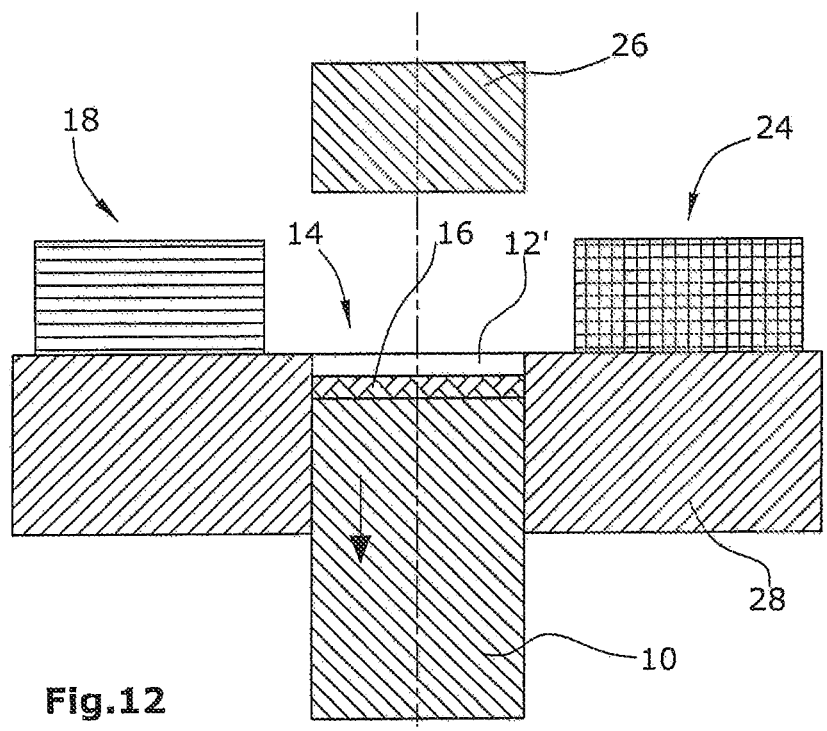

FIG. 12: the lower ram 10 moves downward and thus defines a further part of the filling space 12' (of the cavity 14) for a second (powder) material 22.

Figure 13:
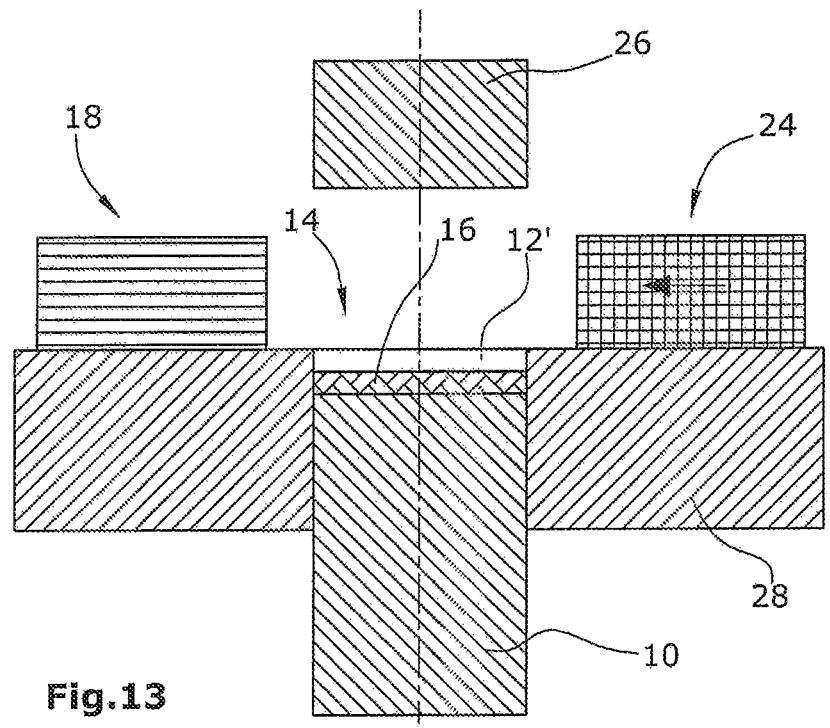

FIG. 13: the second filler 24 moves over the cavity 14.

Figure 14:
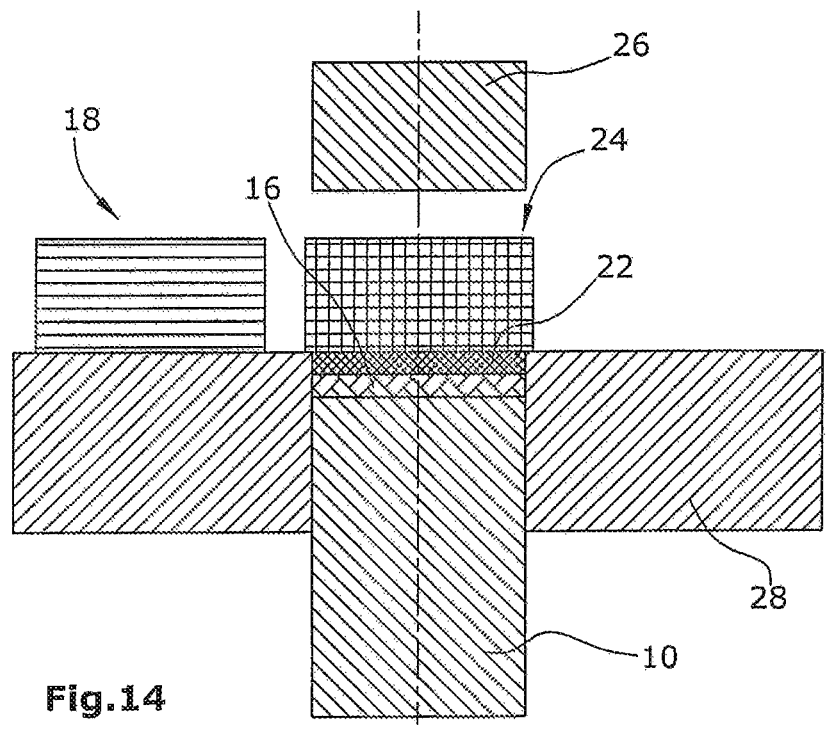

FIG. 14: the (powder) material falls under gravity into the die cavity 14 onto the (powder) material 16.

Figure 15:
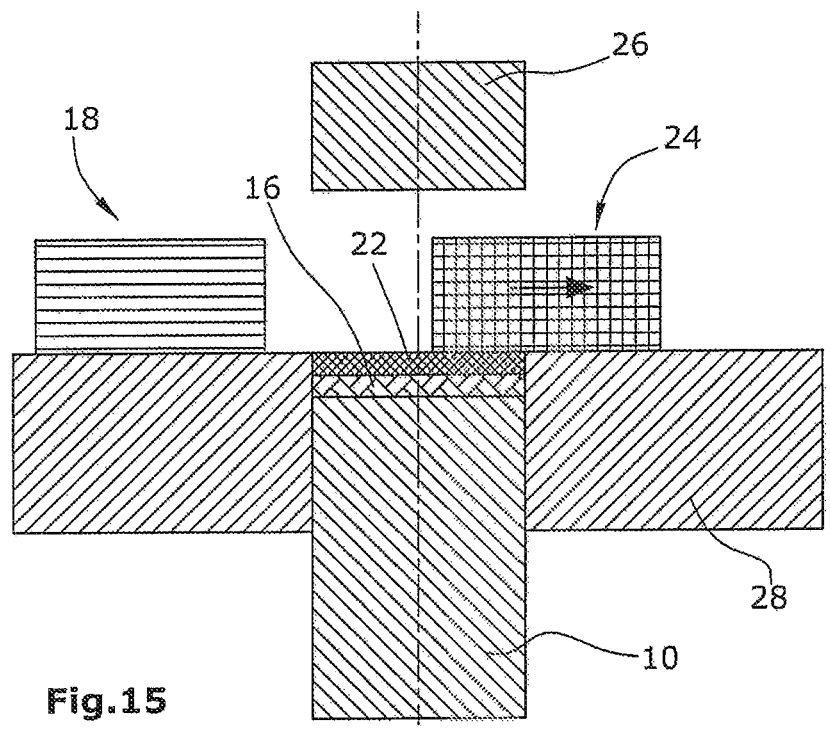

FIG. 15: the filler 24 returns to the starting position and scrapes the (powder) material 22 at the level of the top end of the die 20.

Figure 16:
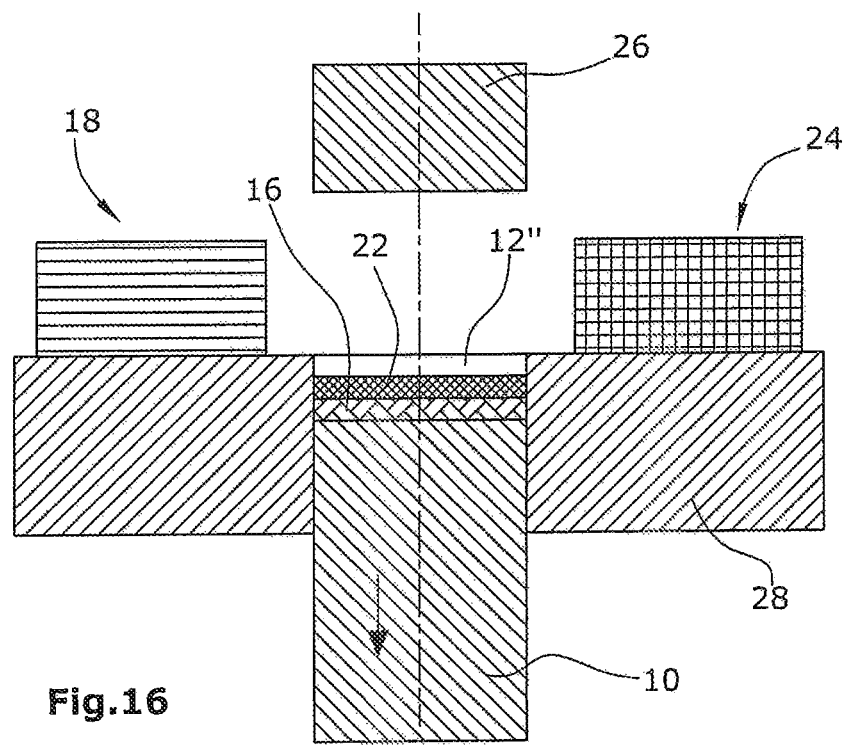

FIG. 16: the lower ram 10 moves further downward in a stepwise manner and thus defines a further part of the filling space 12" for the next lamina of first (powder) material 16. This is then the second layer of (powder) material 16.

Figure 17:
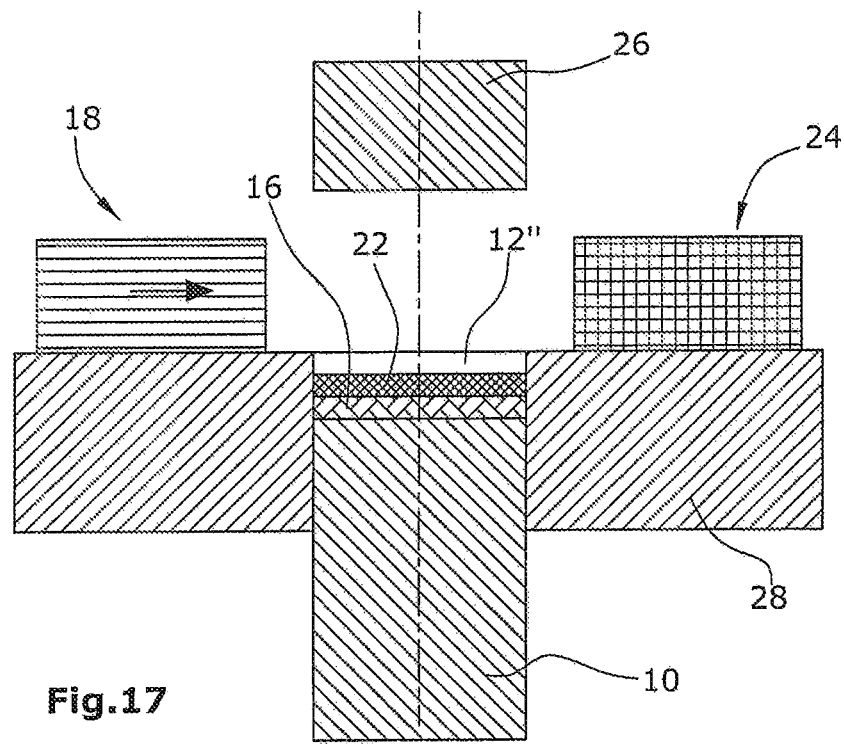

FIG. 17: the filler 18 moves over the die cavity 14.

Figure 18:
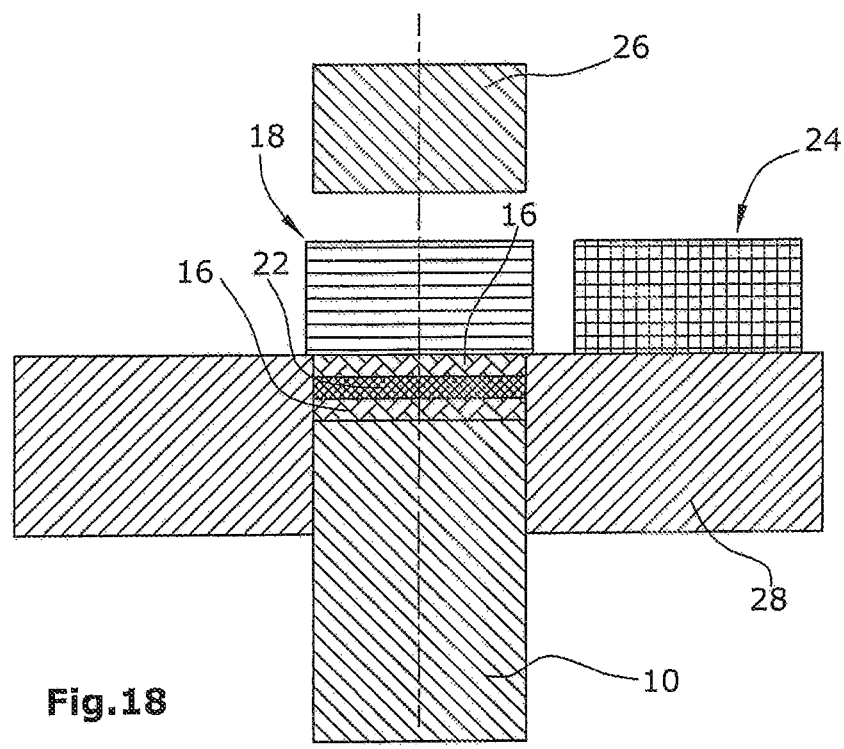

FIG. 18: the (powder) material 16 falls out of the filler 18 under gravity into the die cavity 14 onto the (powder) material 22.

Figure 19:
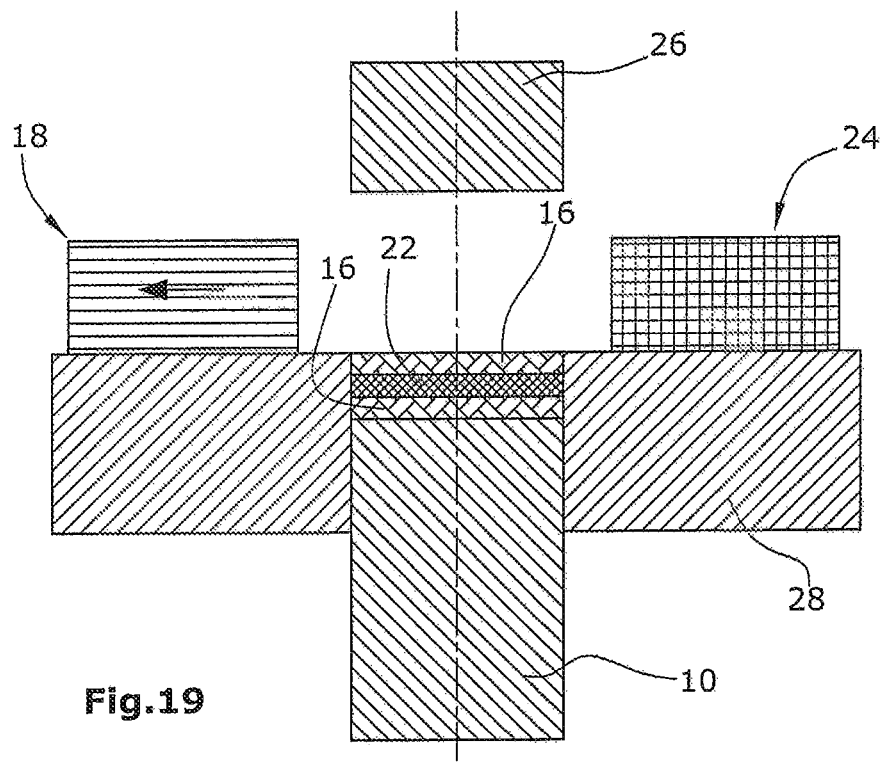

FIG. 19: the filler 18 is moved back to its starting position.

Figure 20:
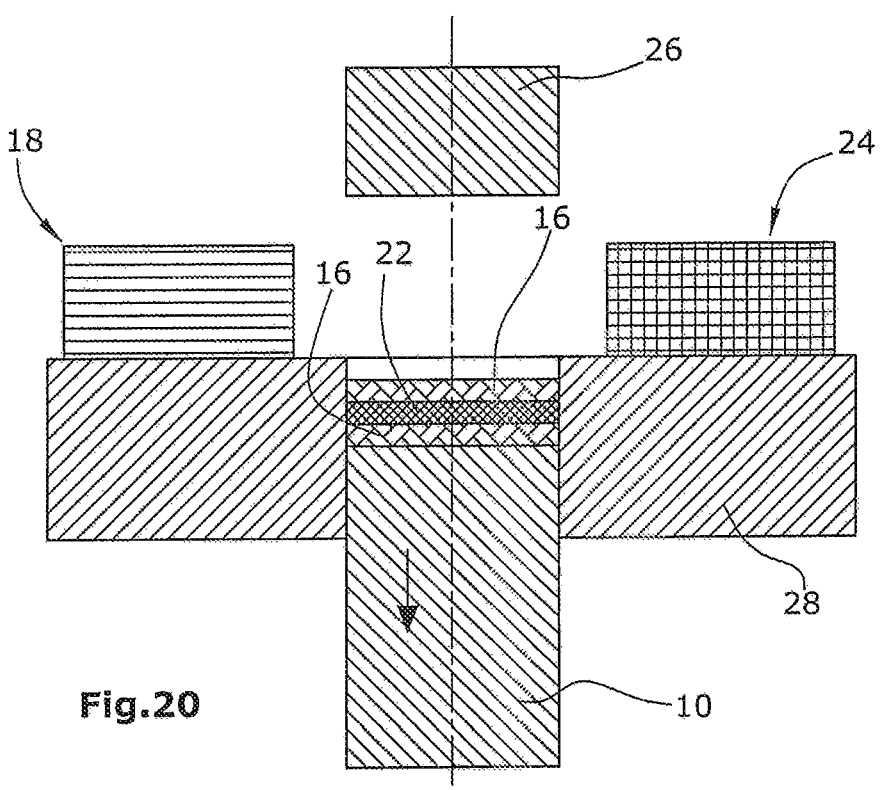

FIG. 20: the lower ram 10 moves further downward in a stepwise manner and thus defines a further part of the filling space for the next lamina of second (powder) material 22.

Figure 21:
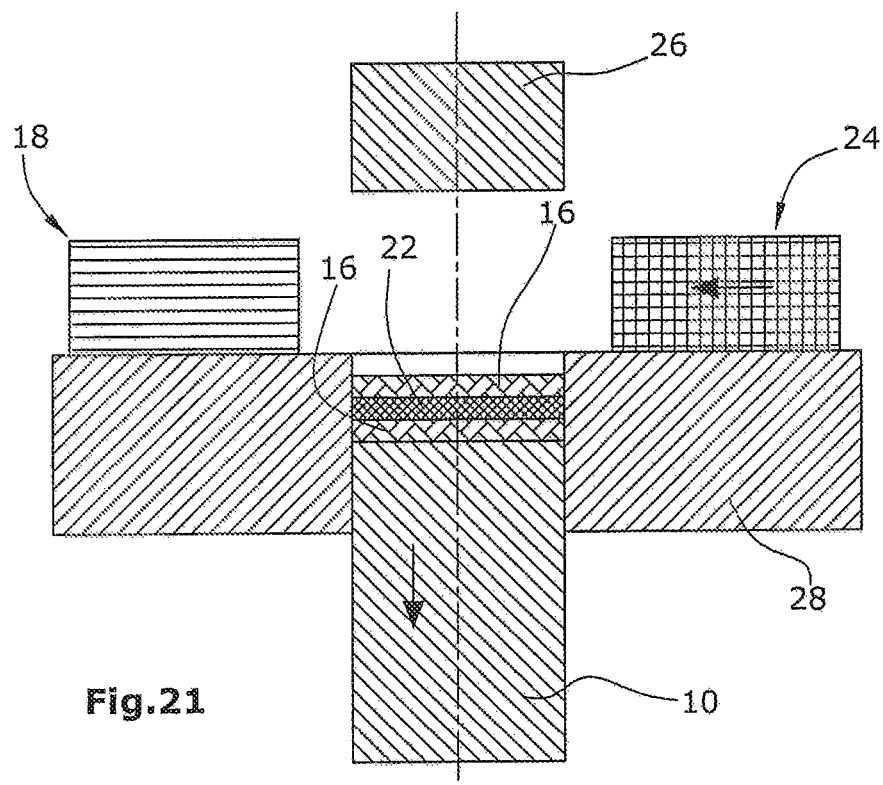

FIG. 21: the filler 24 moves over the cavity 14.

Figure 22:
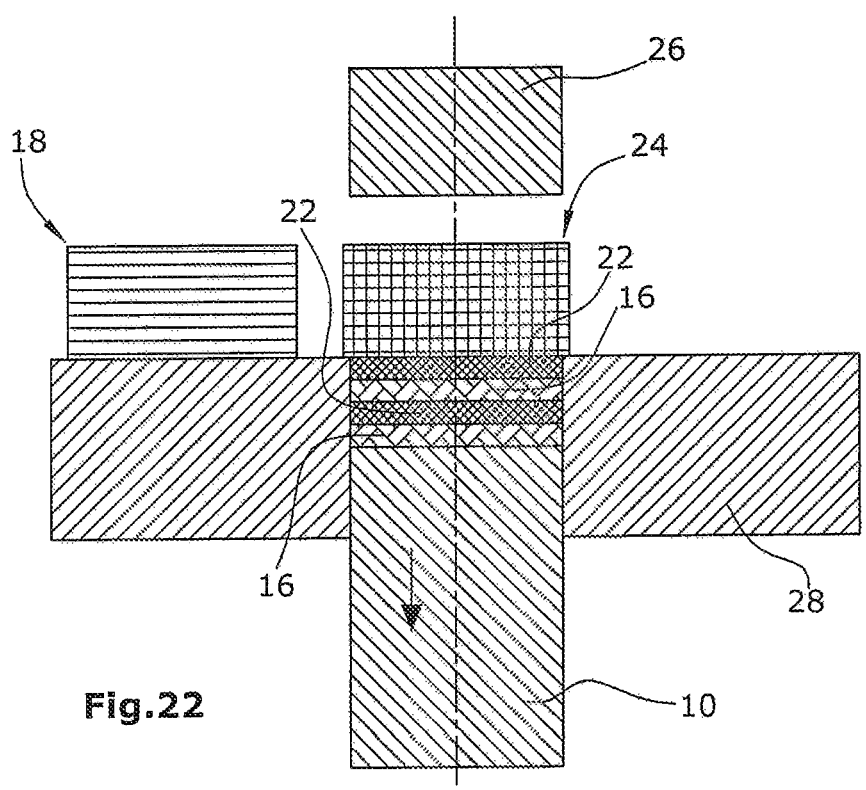

FIG. 22: the (powder) material 22 falls under gravity into the die cavity 14 onto the upper (powder) material 16.

Figure 23:
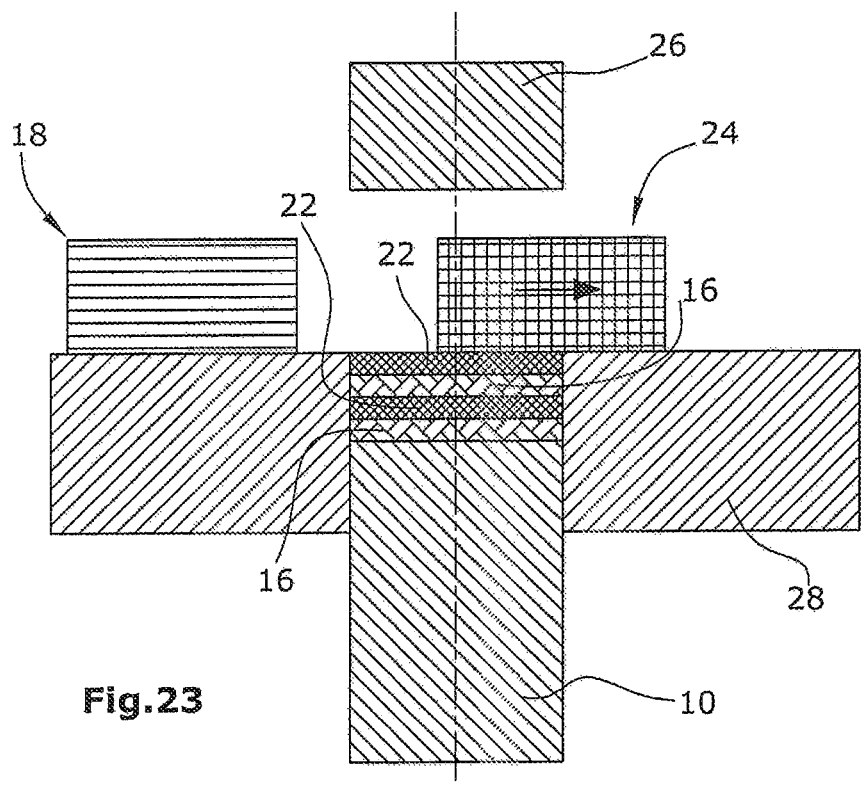

FIG. 23: the filler 24 returns to the starting position and scrapes the (powder) material 22 at the level of the top end of the die 20.

Figure 24:
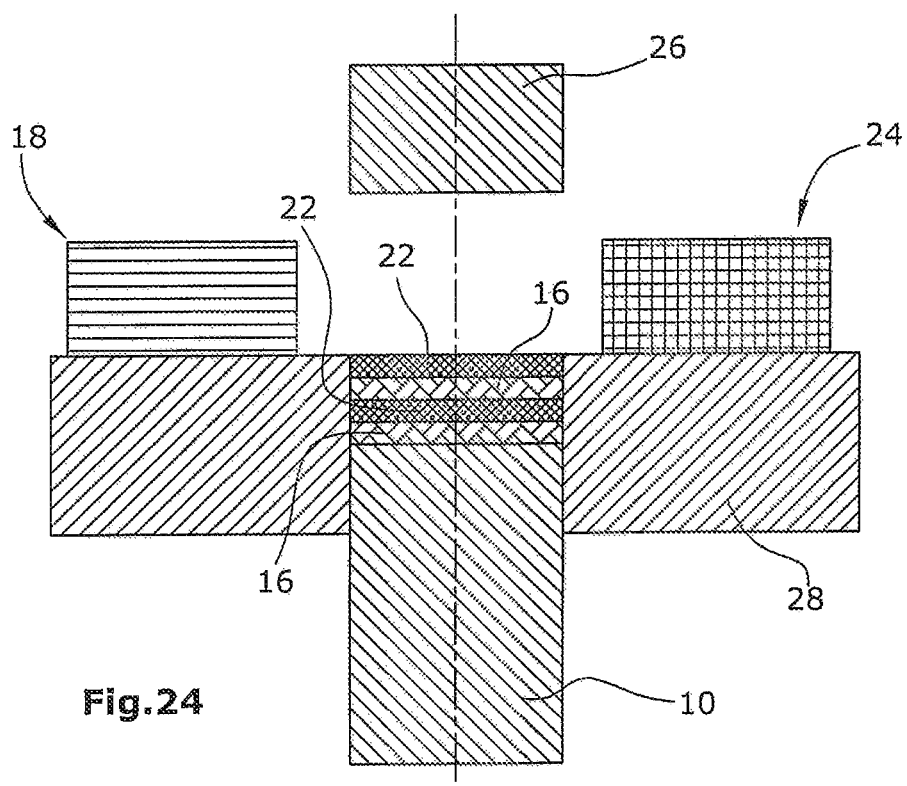

FIG. 24: the die cavity 14 is filled with two laminas of two materials arranged alternately one on top of another.

Figure 25:
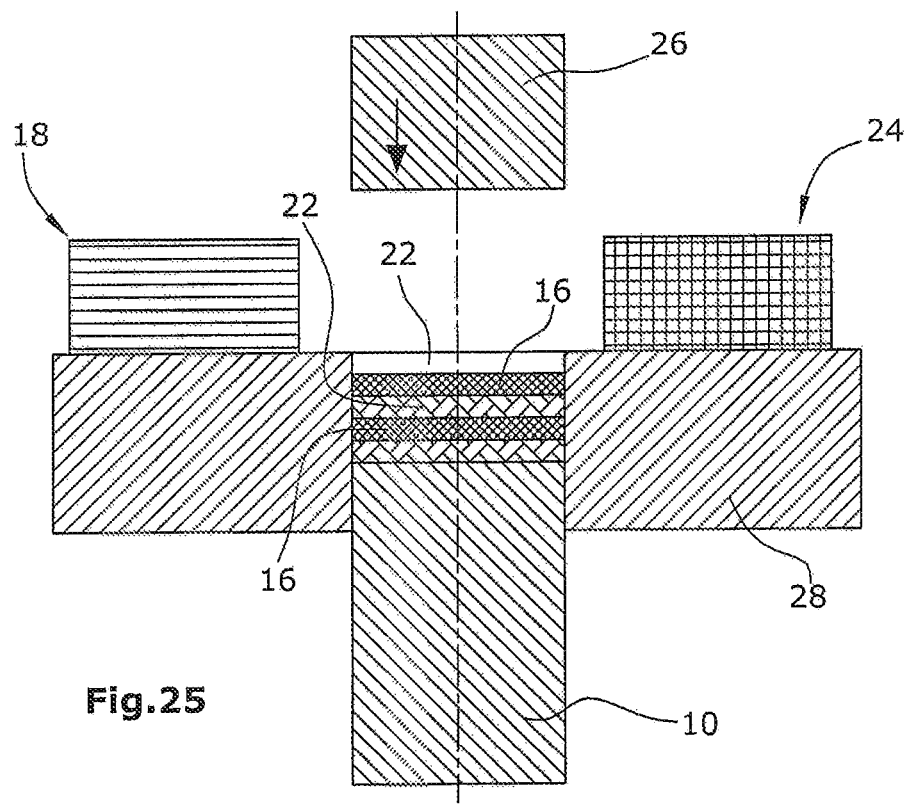

FIG. 25: the upper ram 26 moves toward the lower ram 10. The lower ram 10, prior to the compression of the material laminas in the cavity 14, may be run slightly downward by the upper ram, as shown here (for production of what is called an underfilling).

Figure 26:
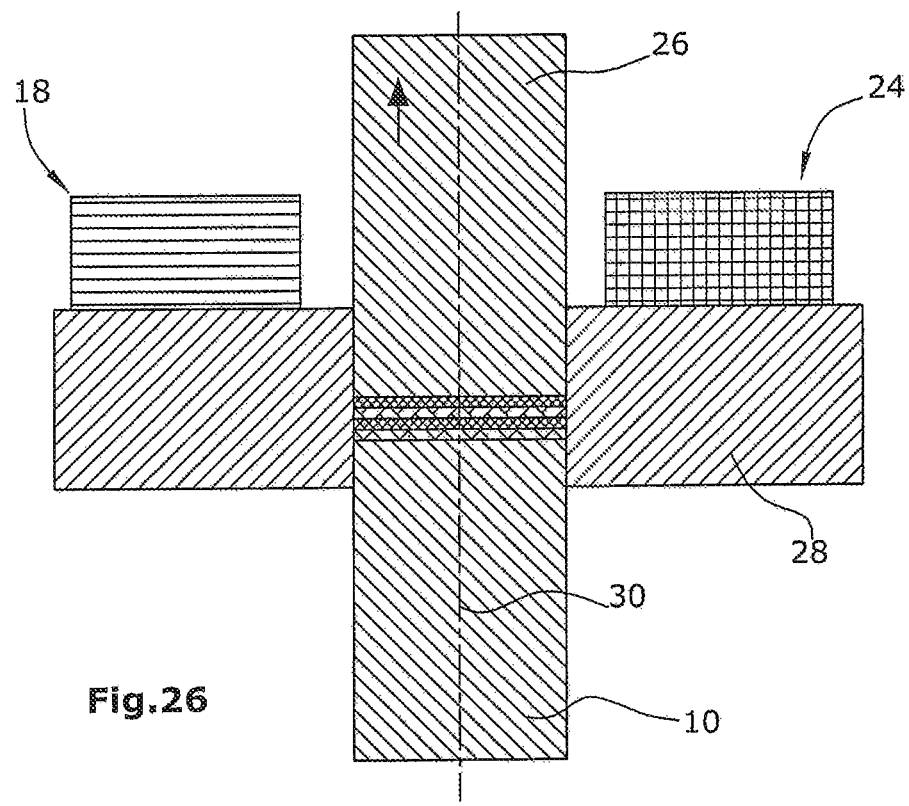

FIG. 26: the upper ram 26 compresses the four layers to the desired density and then moves back to its starting position. The lower ram 10 remains in the position that it adopted beforehand. However, it is also possible that the lower ram 10 moves toward the upper ram 26 after the dipping of the upper ram 26 into the die cavity 14. It is likewise possible that the die cavity 14 is moved in a linear manner in the longitudinal machine axis 30, in which case the die cavity, with fixed lower ram 10, is moved, preferably at half the upper ram speed, in the same direction as the upper ram 26.

Figure 27:
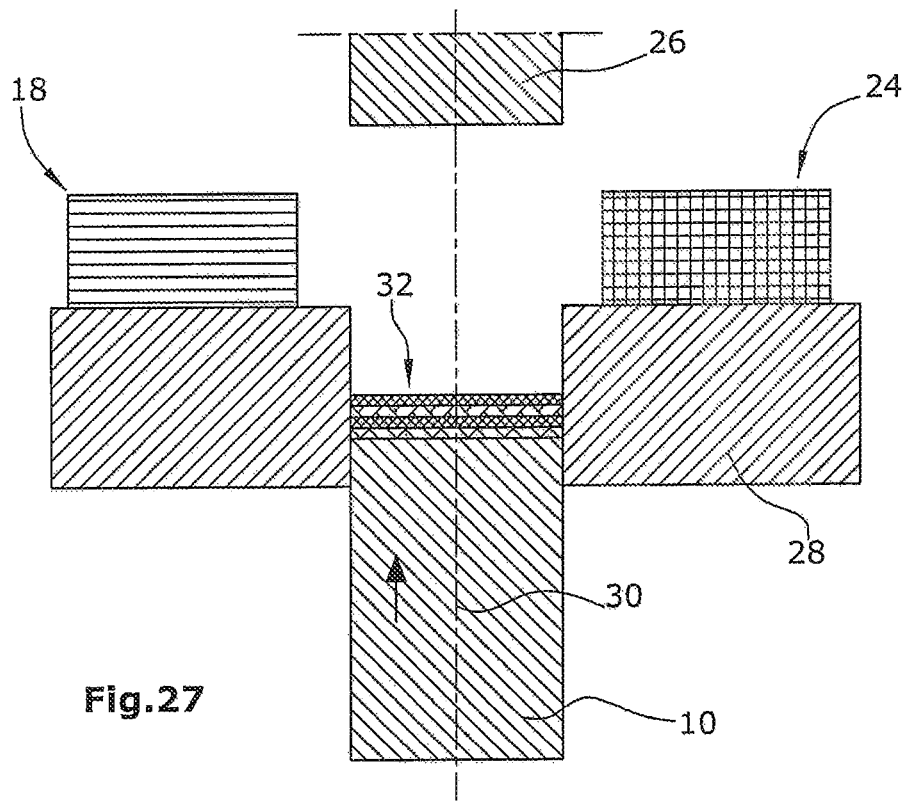

FIG. 27: after the pressing operation, the compact 32 is ejected from the die 28 by the lower ram 10. It is likewise possible here that the upper ram 26, during the ejection of the compact 32, acts on the compact 32 with a small force and only moves back to the starting position after the complete ejection of the compact 32.

Figure 28:
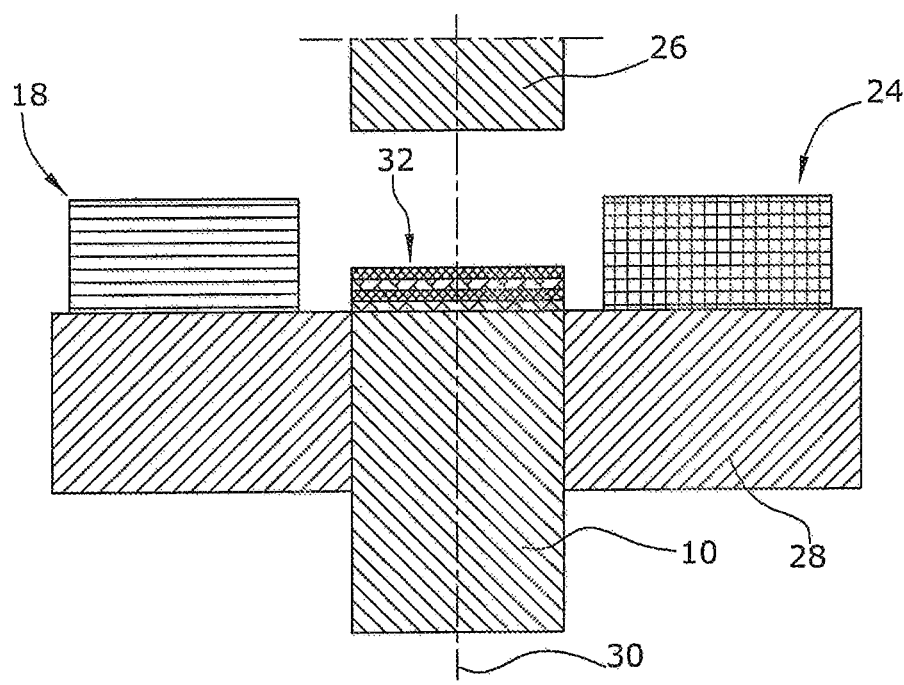

FIG. 28 shows the ejected compact 32 and the machine components in starting position. The compact 32 can be removed. The cycle of operation can begin from the outset for production of a next compact.

FIG. 29 to FIG. 44 show the basic sequence of filling with a (single) filler 18 having two chambers 34, 36, which can thus store two different powders. It is likewise possible here that more than two different chambers are used for correspondingly more than two powders.

Figure 29:
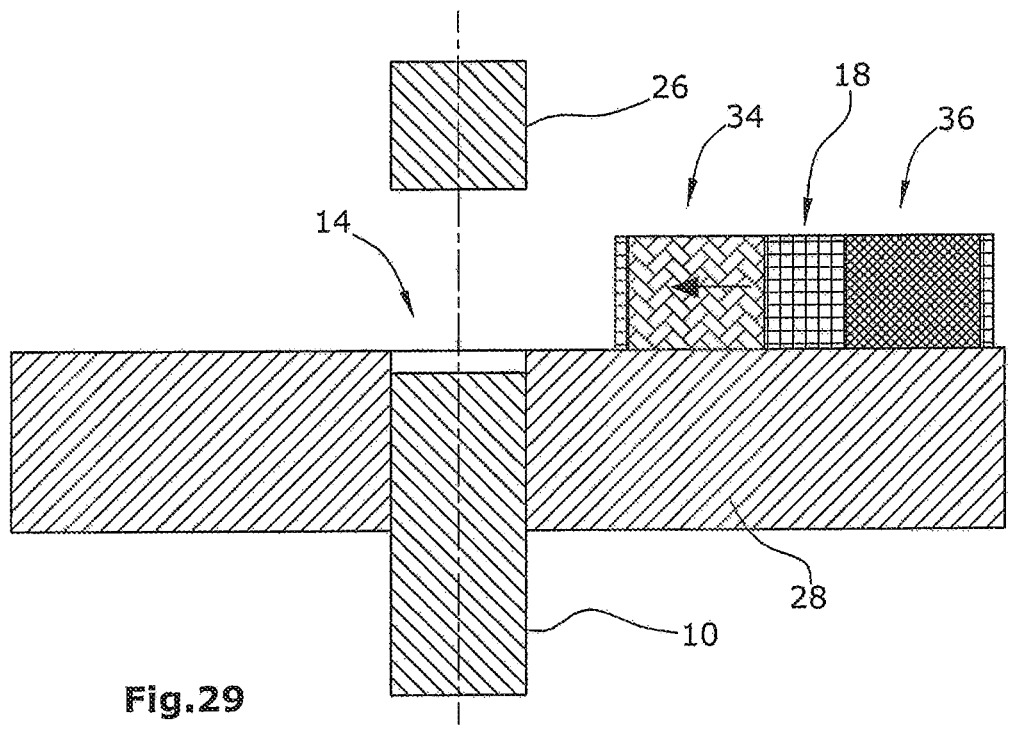

FIG. 29: the lower ram 10 moves into the first filling position and the filler 18 moves over the die 28 until the first chamber 34 comprising the first (powder) material 16 covers the die cavity 14.

Figure 30:
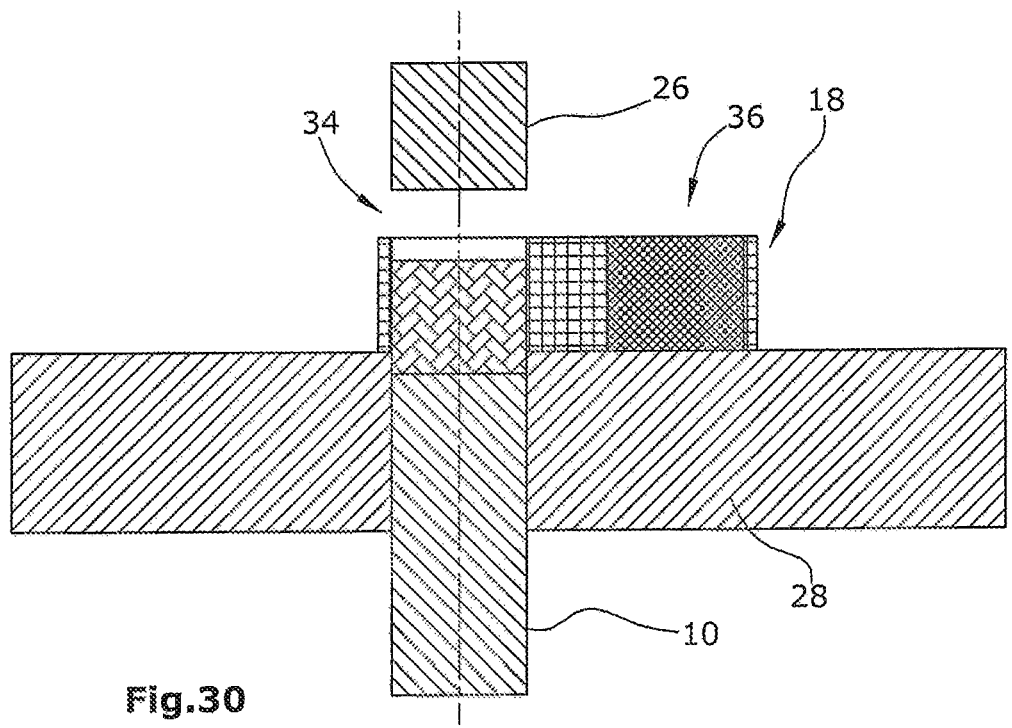

FIG. 30: the filler 18 is above the die cavity 14 with its first chamber 34 and the (powder) material 16 is dropped out of the chamber 34 into the die cavity.

Figure 31:
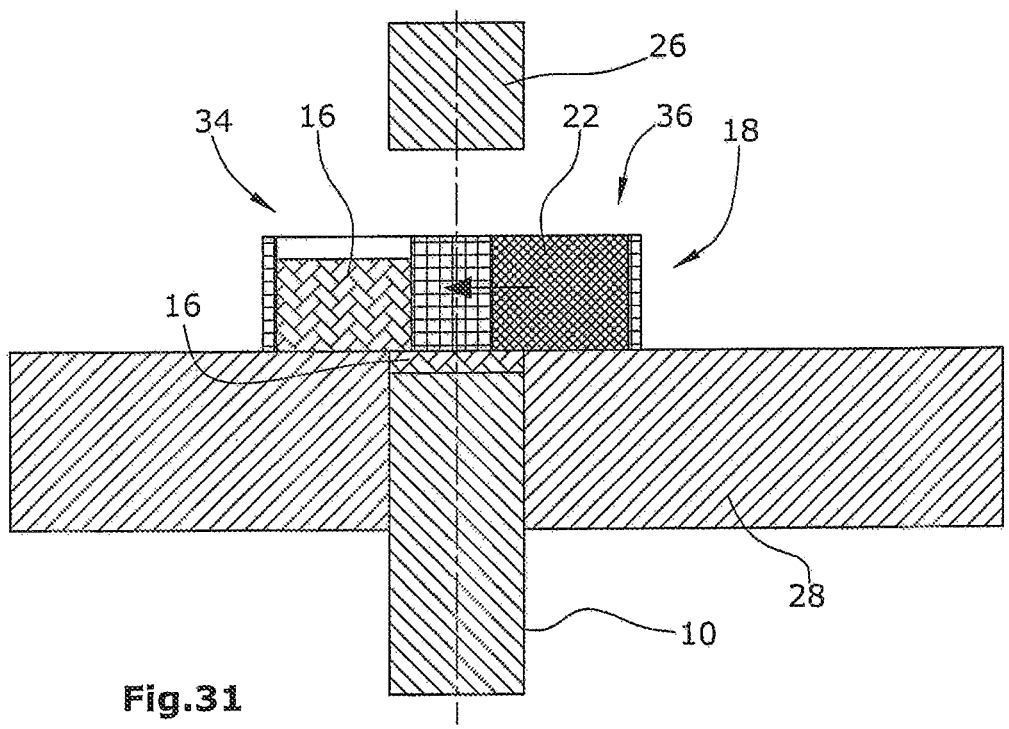

FIG. 31: the filler 18 is moved further until its chamber 36 comprising the (powder) material 22 is above the die cavity 14.

Figure 32:
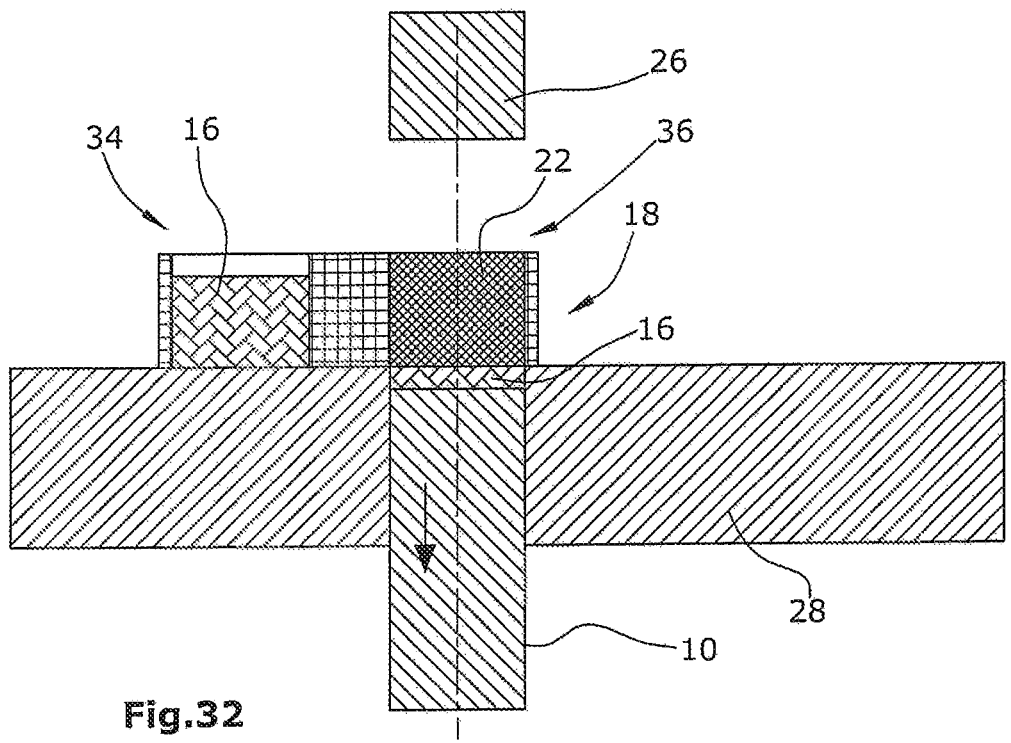

FIG. 32: the lower ram 10 is moved downward until the fill height for the second layer of (powder) material 22 has been attained.

Figure 33:
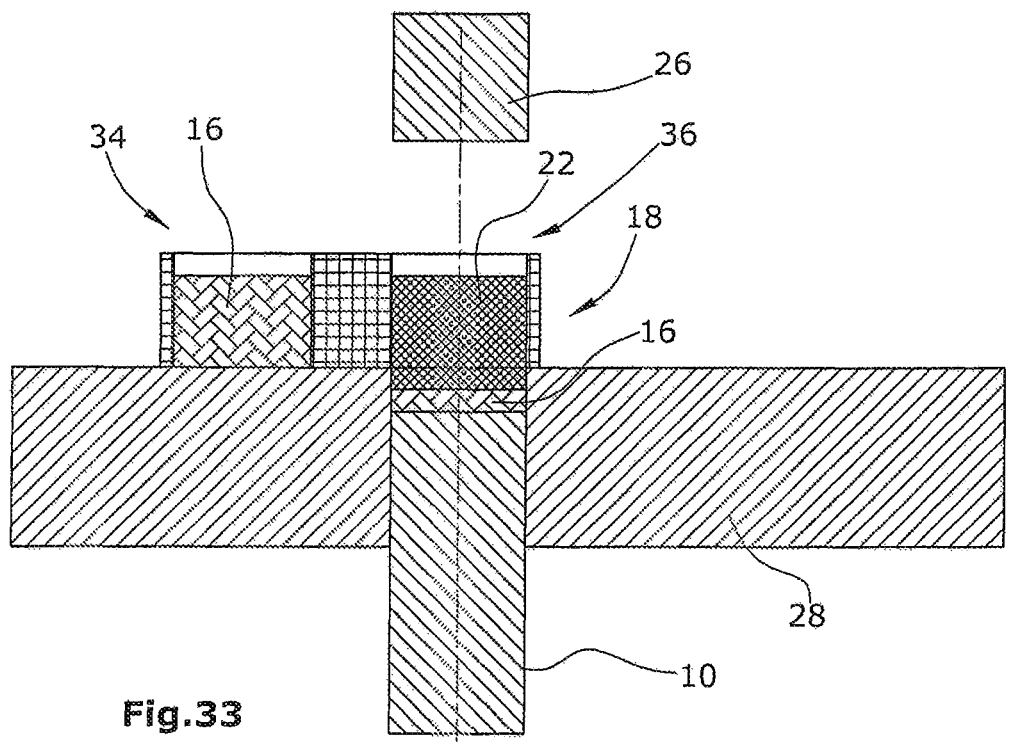

FIG. 33: the (powder) material 22 falls out of the chamber 36, specifically during the downward movement of the lower ram 10, into the die cavity 14 and thus forms the second layer. However, it is equally possible at this early stage to (completely) lower the lower ram 10 when the chamber 36 is above the cavity 14.

Figure 34:
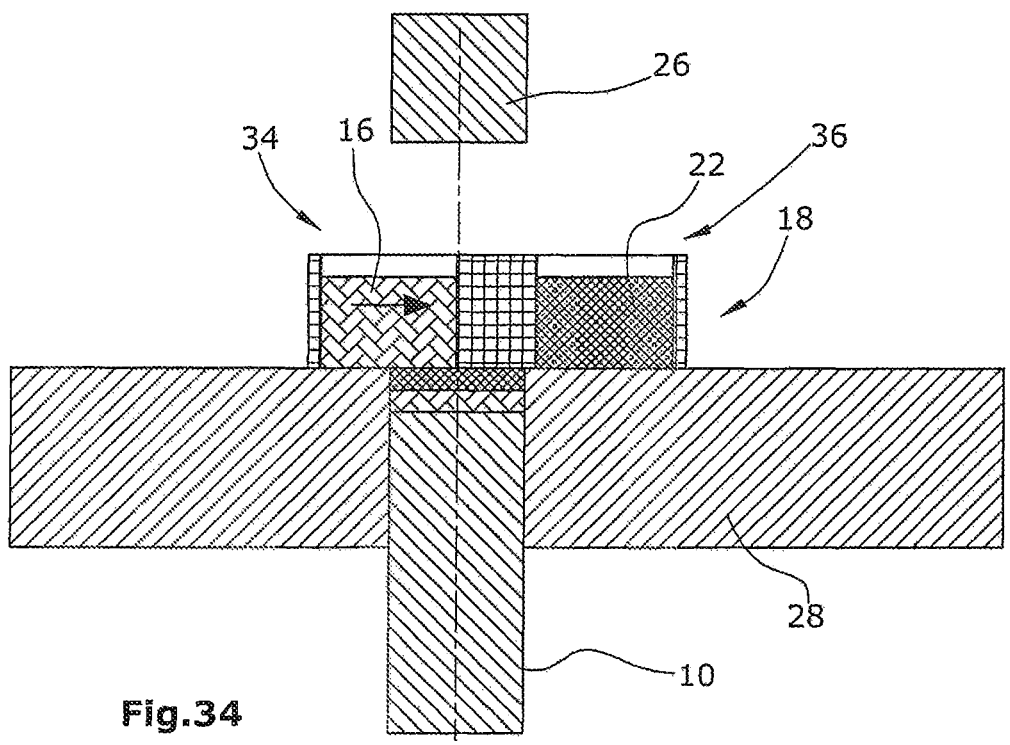

FIG. 34: the filler 18 is moved until the chamber 34 comprising the (powder) material 16 is above the die cavity 14.

Figure 35:
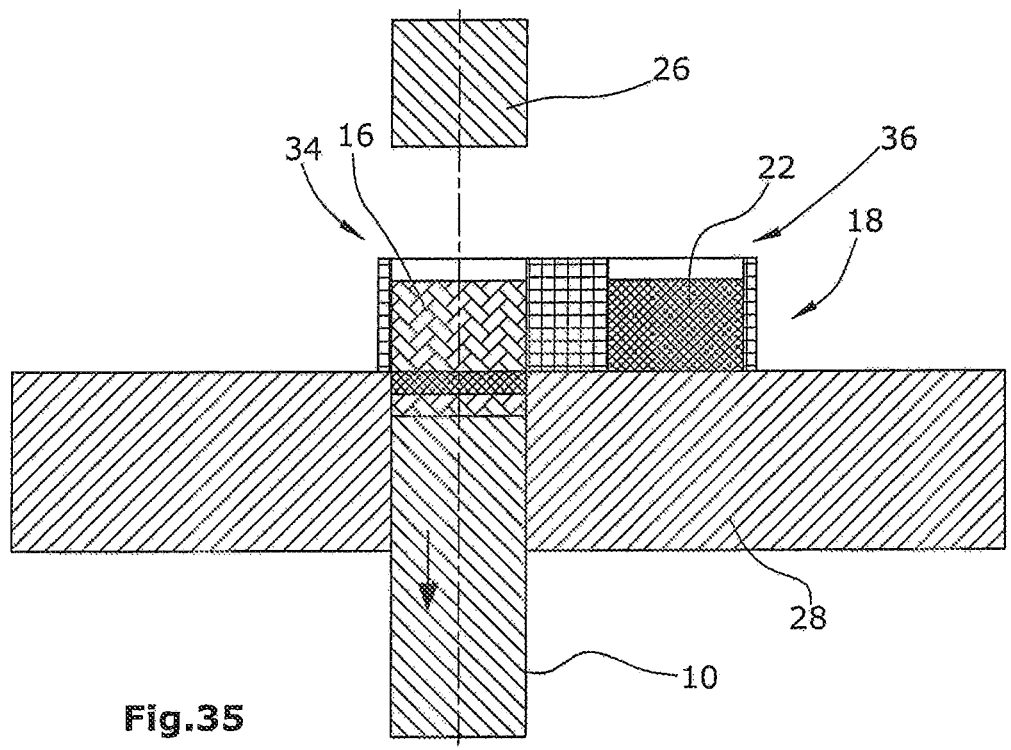

FIG. 35: the lower ram 10 is moved downward until the fill height for the third layer has been attained.

Figure 36:
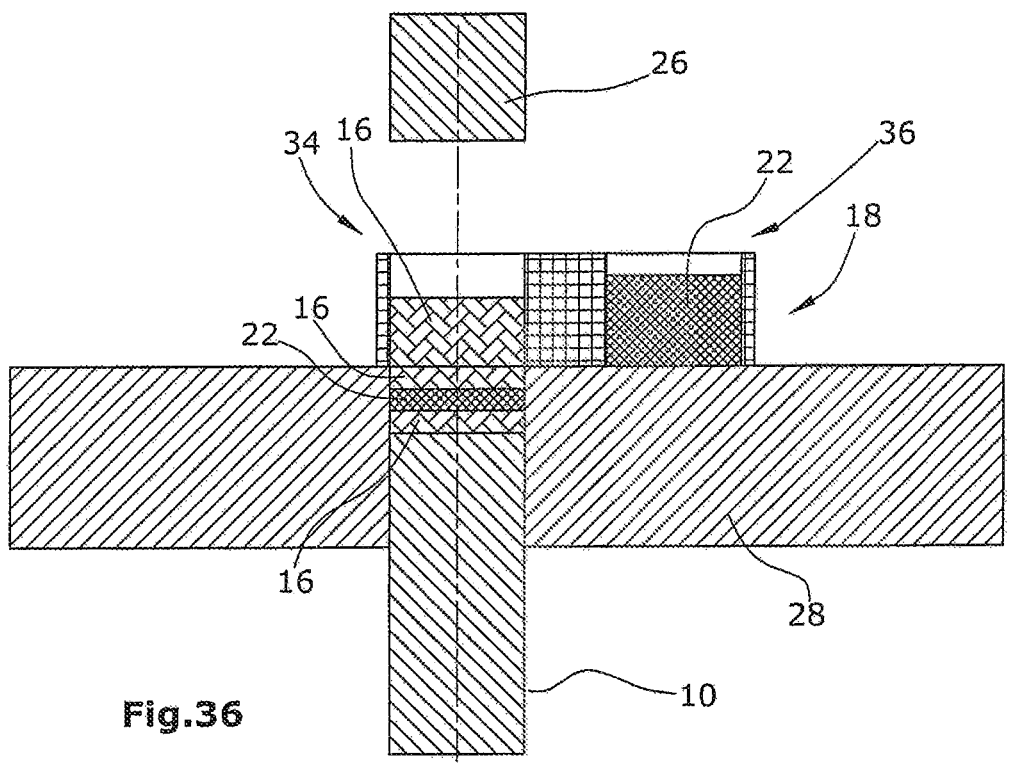

FIG. 36: the (powder) material 16 falls out of the chamber 34, specifically during the downward movement of the lower ram 10 into the die cavity 14, and thus forms the third layer.

Figure 37:
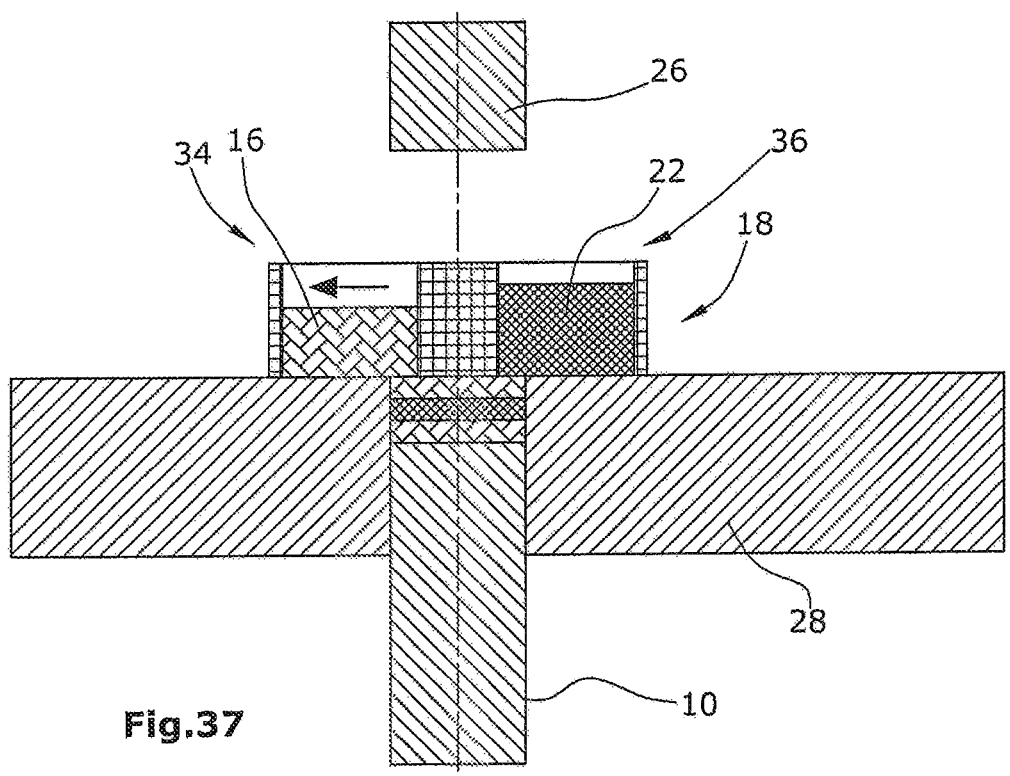

FIG. 37: the filler 18 is moved further until the chamber 36 comprising the (powder) material 22 is above the die cavity 14.

Figure 38:
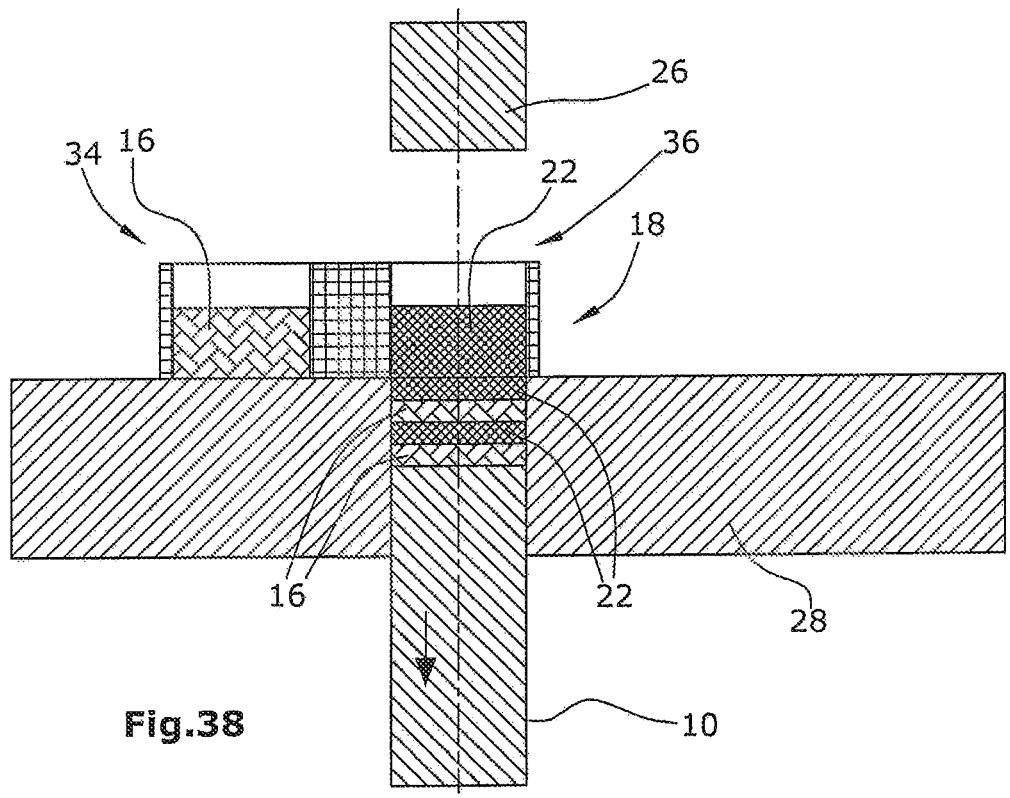

FIG. 38: the lower ram 10 is moved downward until the fill height for the second layer has been attained. The (powder) material 22 falls out of the chamber 36 during the downward movement of the lower ram 10 into the die cavity 14, and thus forms the fourth layer.

Figure 39:
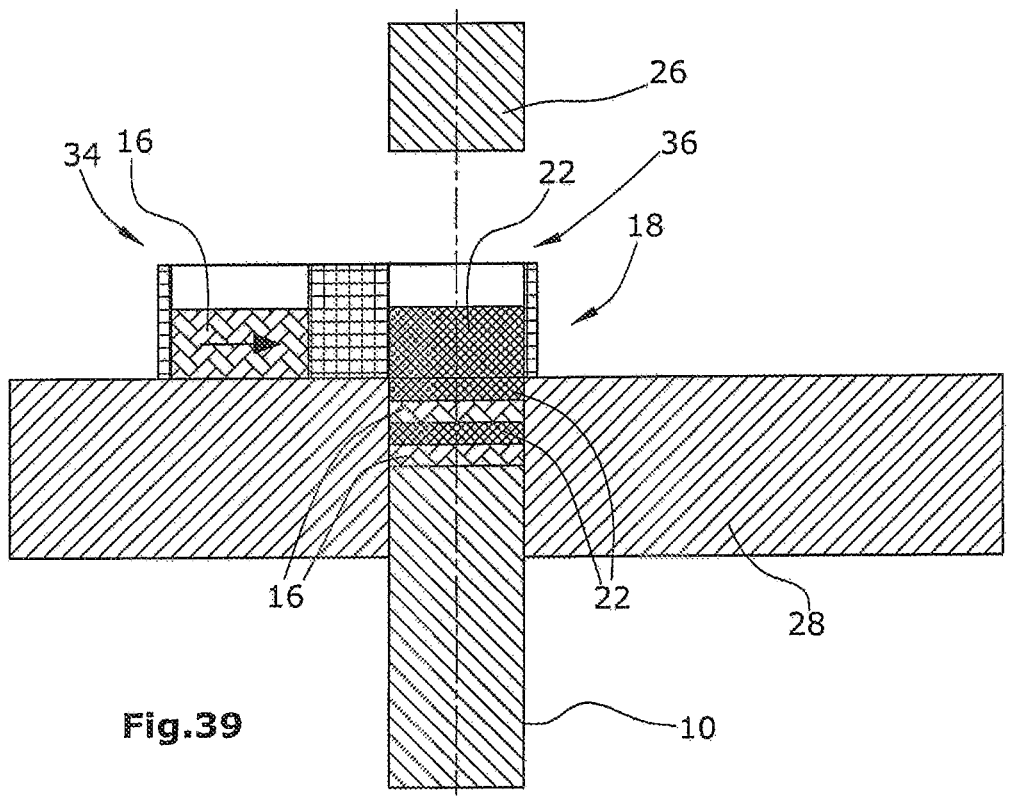

FIG. 39: the filler 18 is moved into the starting position.

Figure 40:
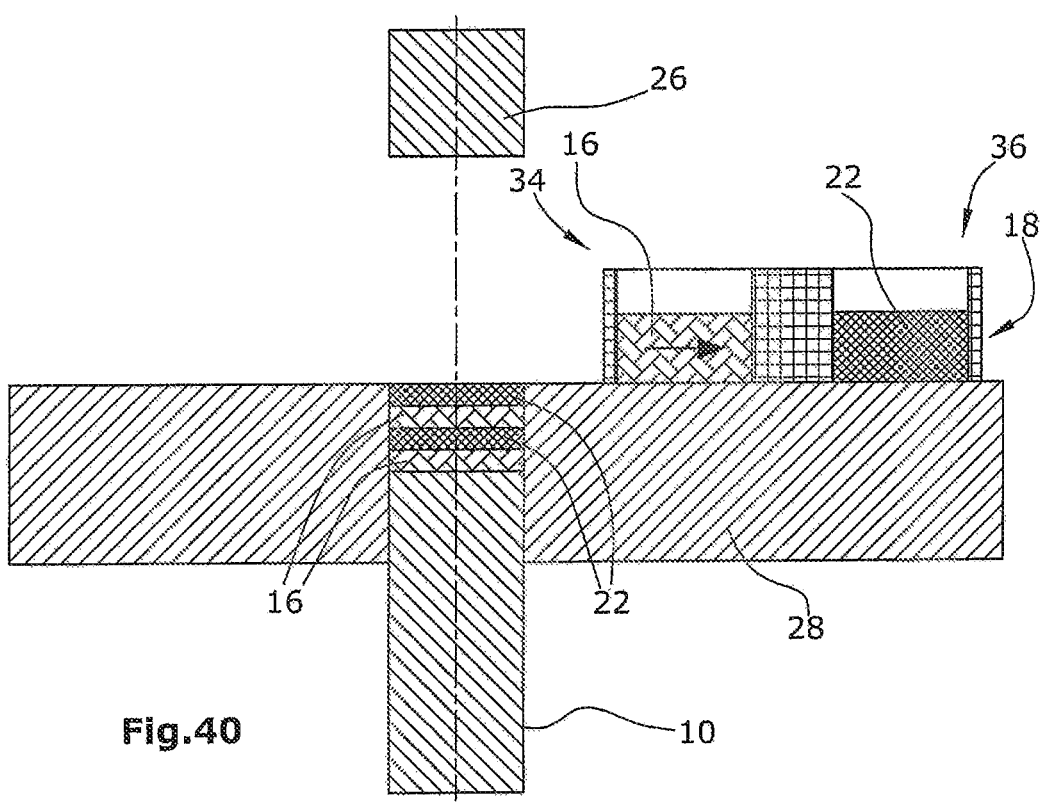

FIG. 40: the upper ram 26 is moved in the axial direction in the direction of the lower ram 10 in order to compress the individual laminas.

Figure 41:
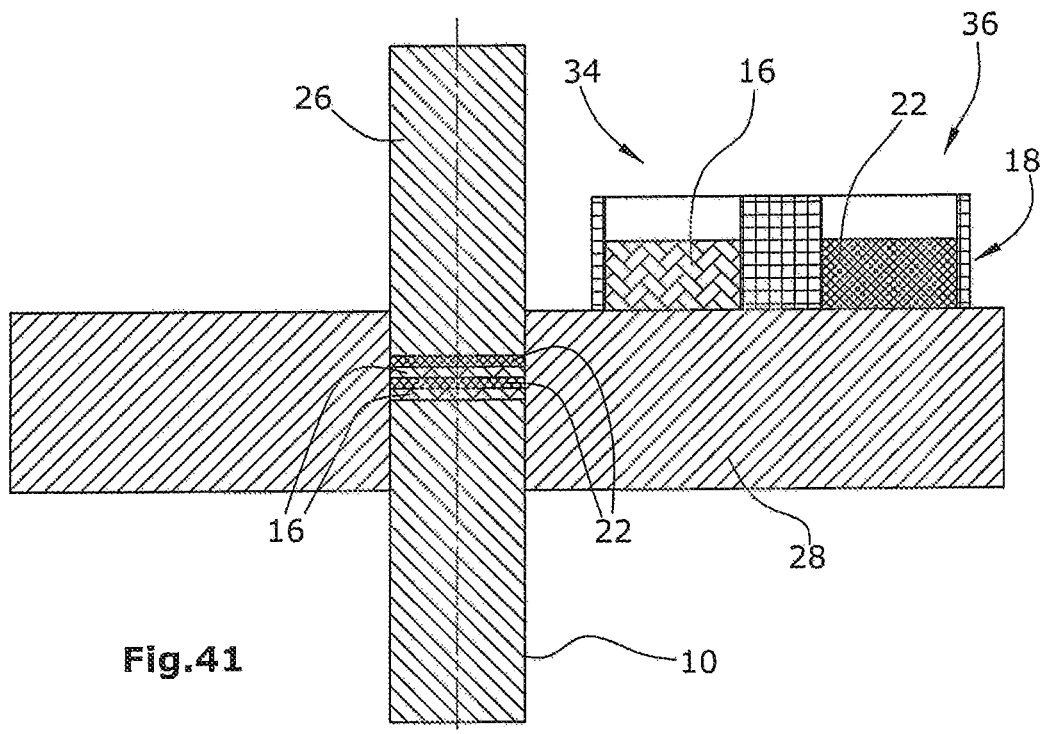

FIG. 41: the upper ram 26 and lower ram 10 are in the final pressing position.

Figure 42:
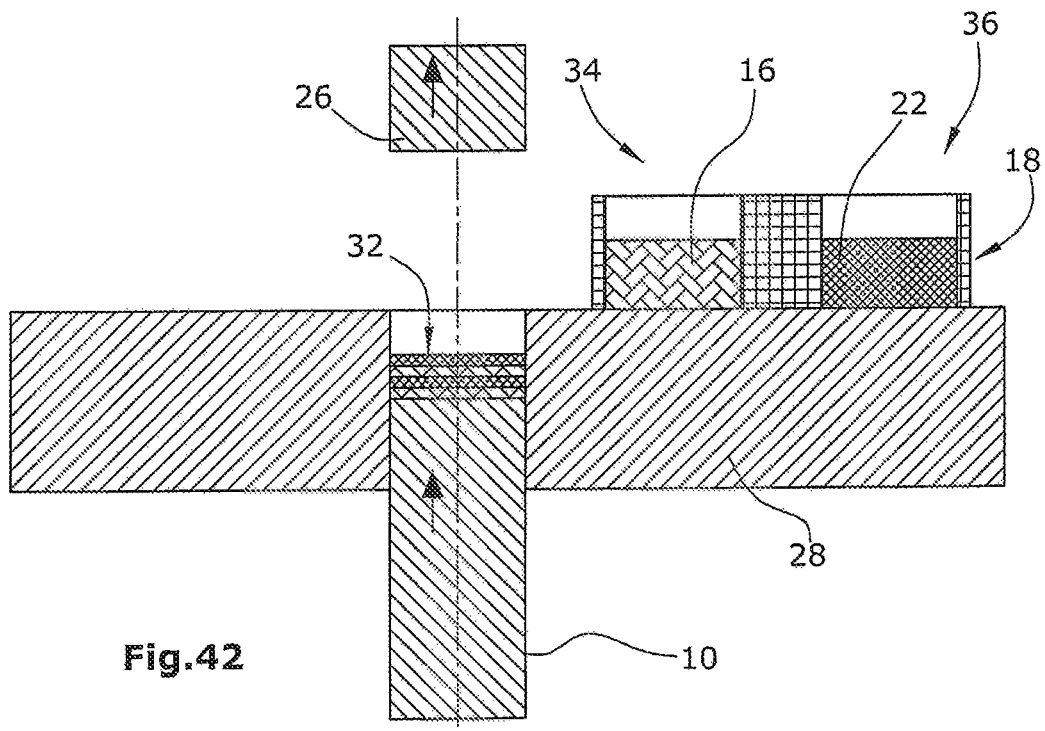

FIG. 42: the upper ram 26 is moved into starting position and the lower ram 10 ejects the compact 32.

Figure 43:
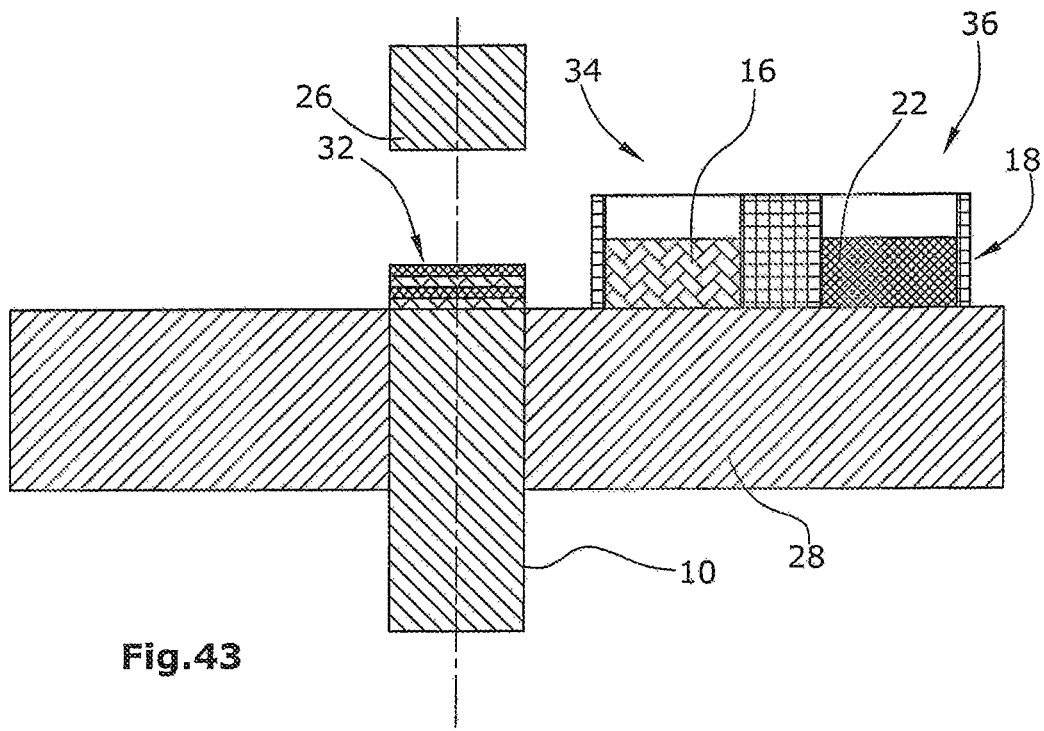

FIG. 43: the mold components are in their starting positions with ejected compact 32.

Figure 44:
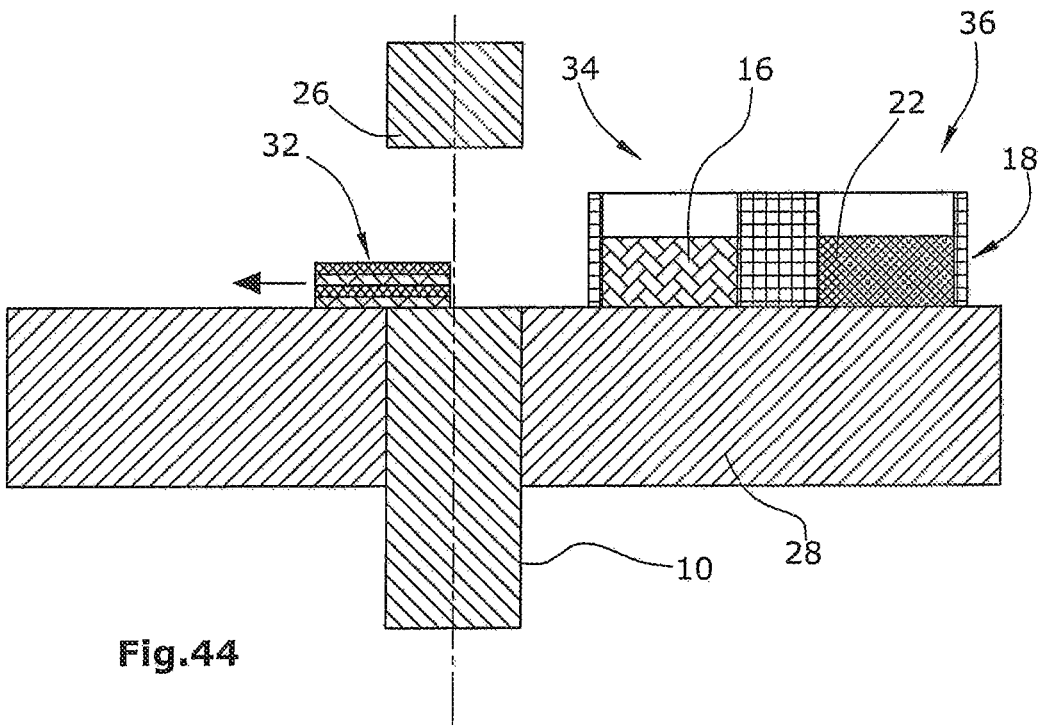

FIG. 44: the compact 32 is removed; the cycle of operation can start again.

FIG. 45 to FIG. 54 show the basic sequence in the filling of the cavity with a rotary filler having two or more chambers. In this case, the filler needs to rotate only during the downward motion of the lower ram or during the filling of the cavity. However, it is also conceivable that the filler rotates permanently.

Figure 45:
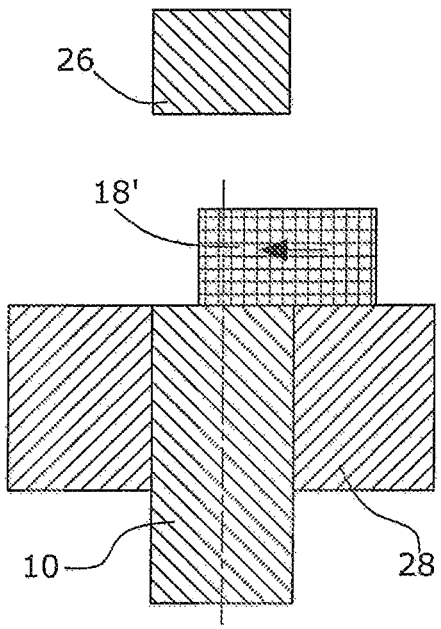

FIG. 45: the rotary filler 18' is moved over the die cavity 14.

Figure 46:
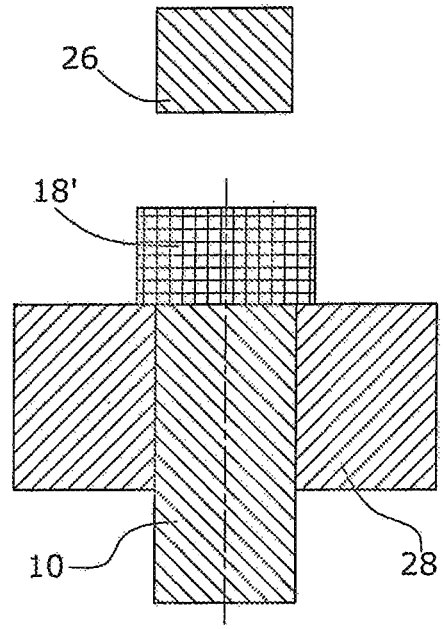

FIG. 46: the rotary filler 18' is above the die cavity 14.

Figure 47:
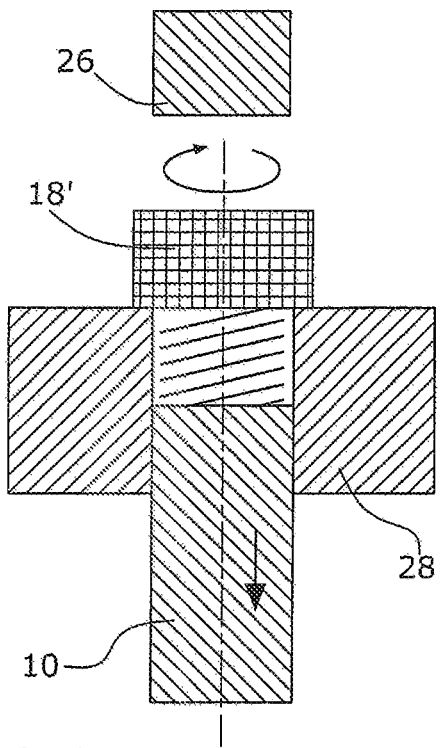

FIG. 47: the rotary filler 18' rotates about the longitudinal machine axis 30, while the lower ram 10 moves downward along the longitudinal machine axis 30, in order to free up the cavity 14 gradually for introduction of material.

Figure 48:
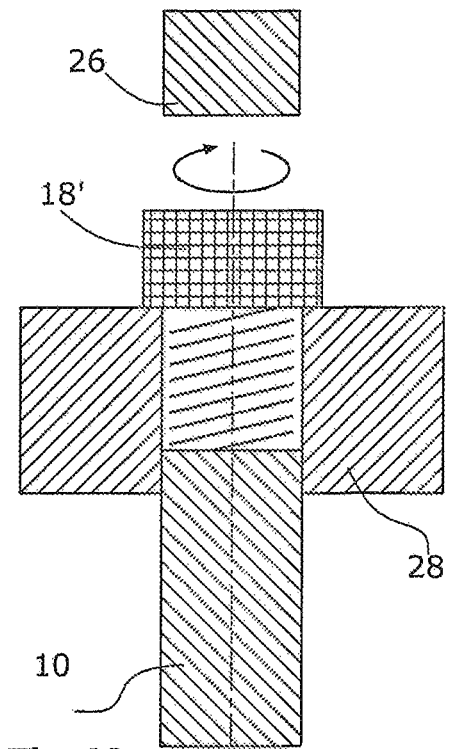

FIG. 48: the lower ram 10 is in its lower filling position. The rotary filler 18' no longer rotates.

Figure 49:
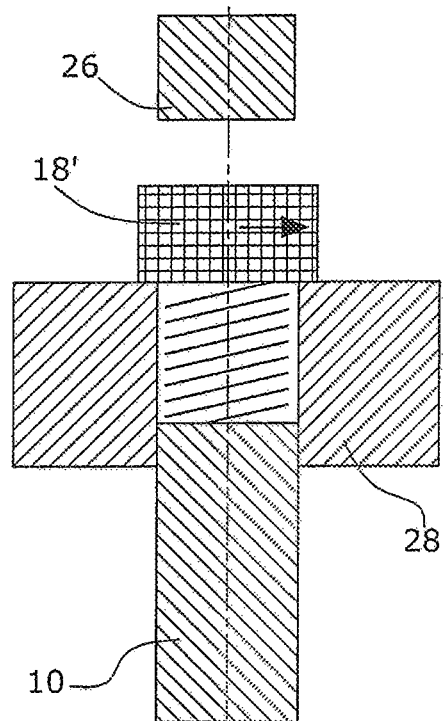

FIG. 49: the rotary filler 18' is moved back into its starting position.

Figure 50:
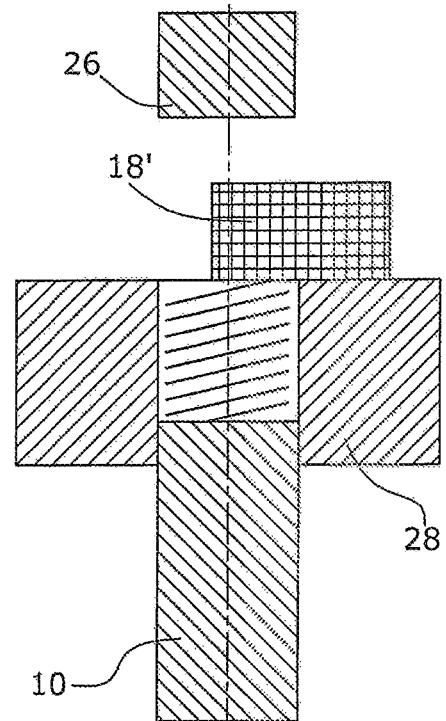

FIG. 50: the rotary filler 18' is between the filling position and starting position.

Figure 51:
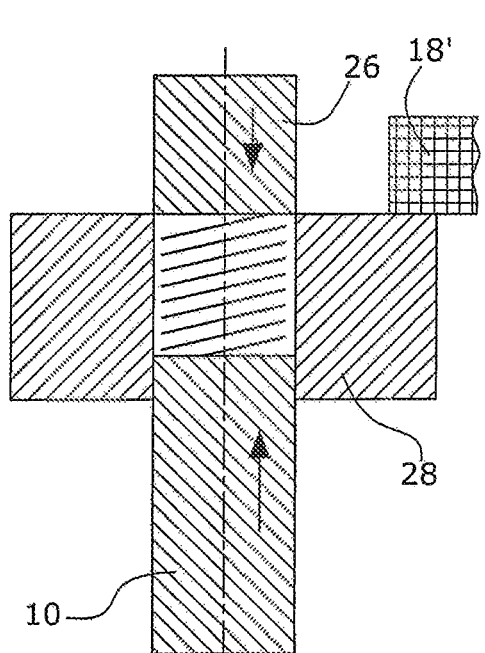

FIG. 51: the upper ram 26 moves in the direction of the lower ram 10, with the rotary filler 18' not shown.

Figure 52:
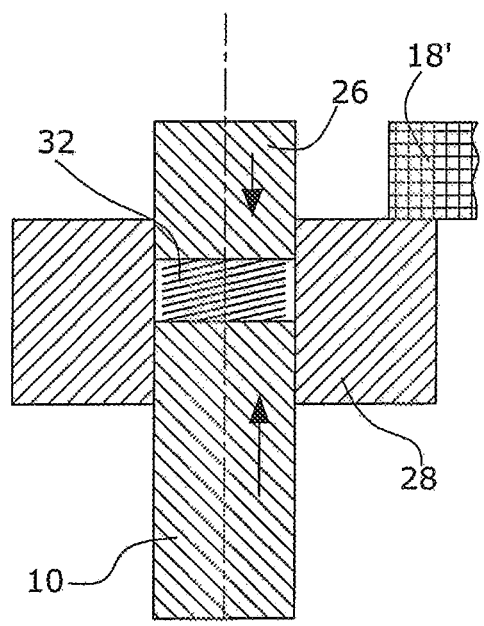

FIG. 52: upper ram 26 and lower ram 10 compress the (powder) material present in a double helix in the cavity 14 to give a compact 32. Here too, the rotary filler 18' is not shown.

Figure 53:
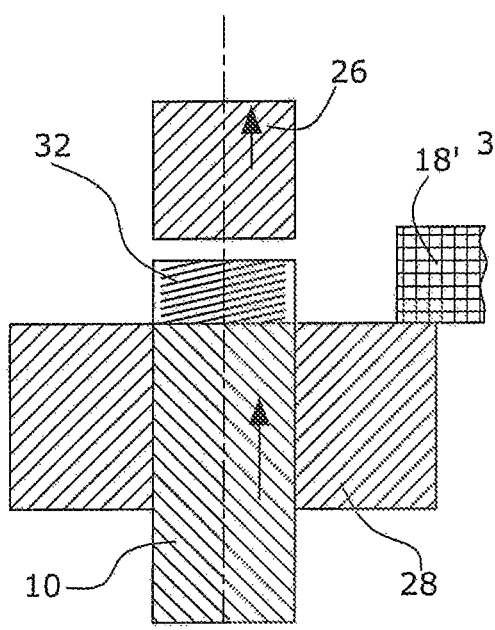

FIG. 53: the upper ram 26 moves into its starting position. The lower ram 10 also moves into starting position and ejects the compact 32. The rotary filler 18' is not shown here either.

Figure 54:
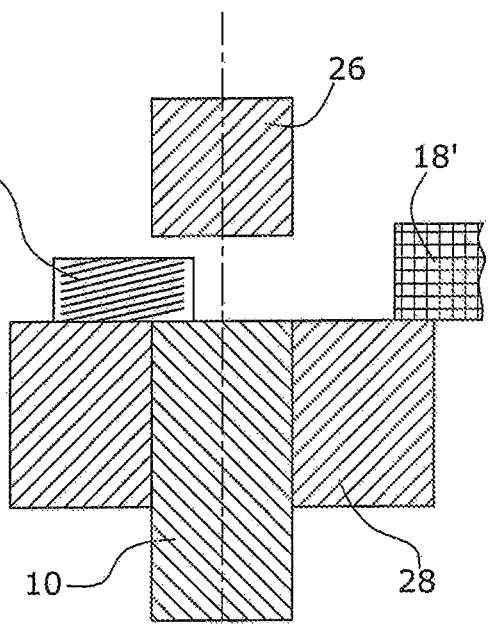

FIG. 54: the compact 32 is removed. Thereafter, the cycle can restart, in which case the rotary filler 18' (not shown) comes into action again.

FIGS. 55 to 60 show a further working example of a press 100 for production of a blank from in this case three different powder materials arranged in an intermeshed and helical manner in the blank. According to FIG. 55, the press 100 has a die 110 with a cavity 112. The cavity 112 in this working example is designed as a passage orifice of the die 110 and is closed at its base by a lower ram 116 which can be moved axially along the center axis 114. The upper ram 119 can likewise be moved back and forth along the center axis 114 of the cavity 112. In this way, it is possible, as is common knowledge, to compress powder material introduced into the cavity 112 to give a blank (if appropriate with additional use of heat).

To introduce the powder material into the cavity 112, what are called fillers 118 are used, which can generally also be referred to as filling units 120. In this working example, the filling unit 120 has a rotary filler 118 which, when it is above the orifice 122 of the cavity 112, rotates about the center axis 114 relative to the cavity 112.

Figure 55:
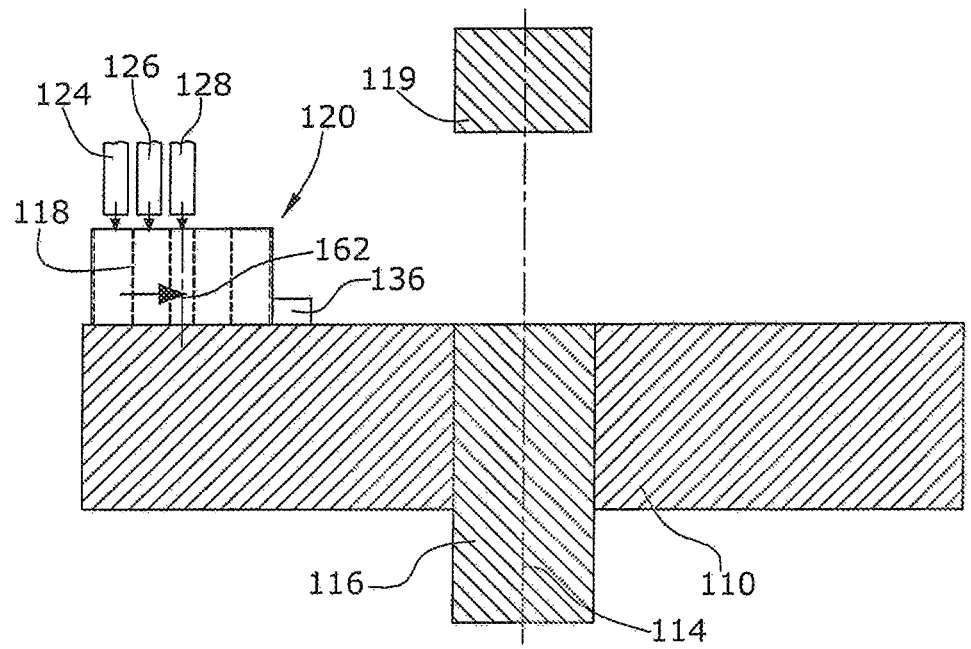

The rotary filler 118 is shown in FIG. 55 in its filling position, in which, in this working example, three free-flowing materials (e.g. powder materials) 124, 126, 128 are introduced into three separate chambers 130, 132, 134 of the rotary filler 118. Alternatively, it is also possible that the rotary filler 118 is filled during its movement and especially also during the release of material. For this purpose, the material feed conduits, in one configuration, are moved in a translational manner together with the rotary filler 118, in order to be able to replenish the rotary filler 118 during the release of material.

Figure 56:
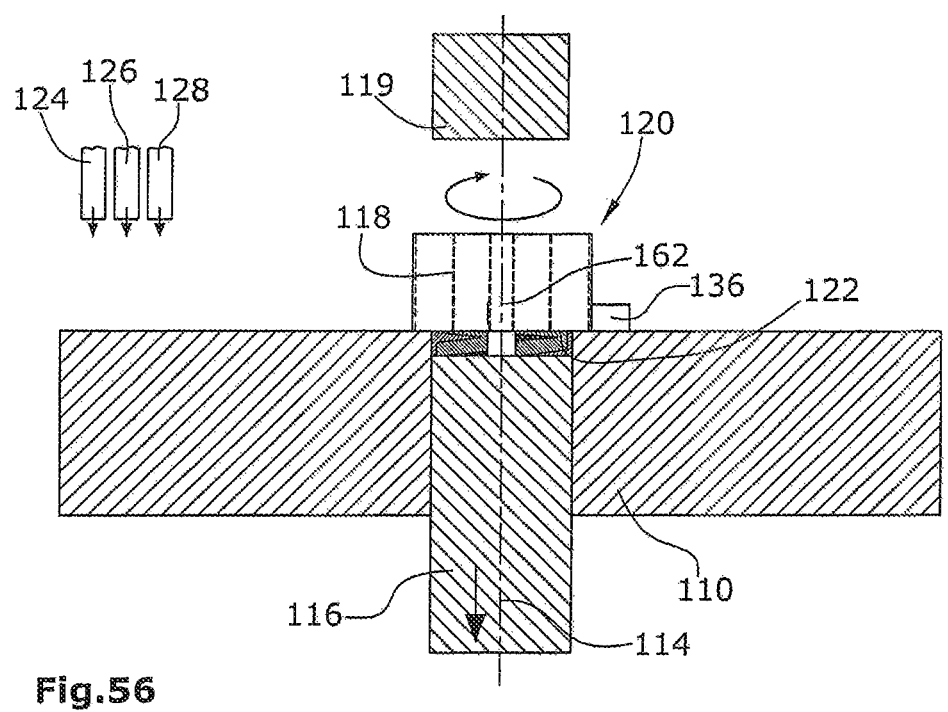

In FIG. 56, the rotary filler 118 is above the cavity 112 (filling position) and introduces the three powder materials into the latter with rotation. At the same time, the lower ram 116 is at first in its uppermost position. The lower ram 116 is then moved correspondingly downward by the volume of the material introduced per unit time, such that it frees up exactly the portion of the cavity volume per unit time which is to be introduced into the cavity 112 by powder material from the rotary filler 118.

Figure 57:
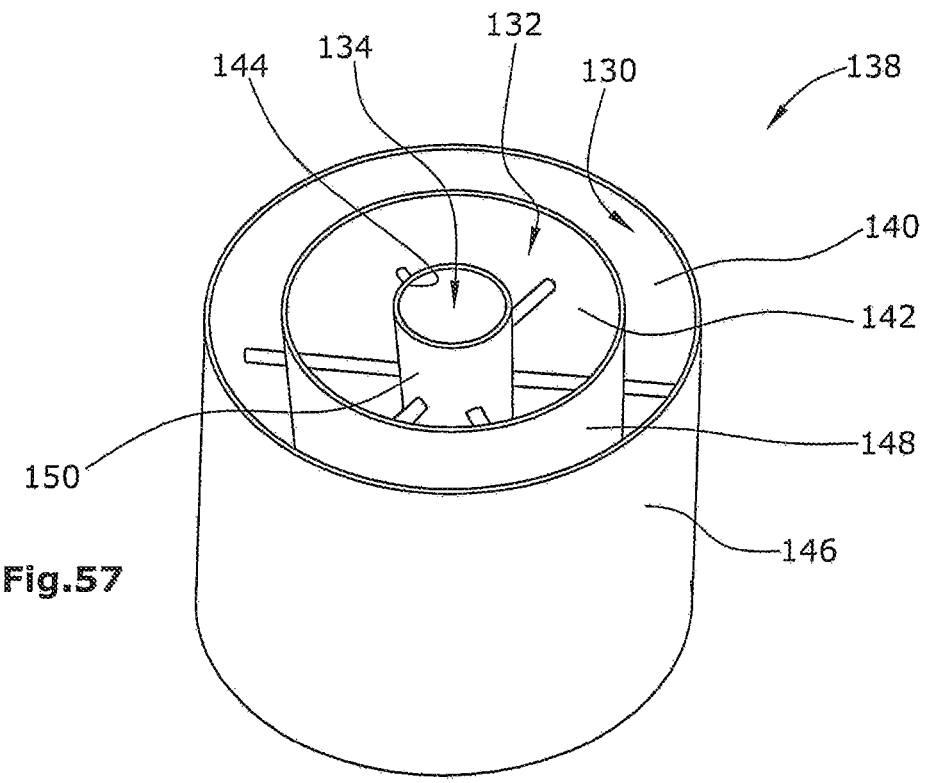
Figure 58:
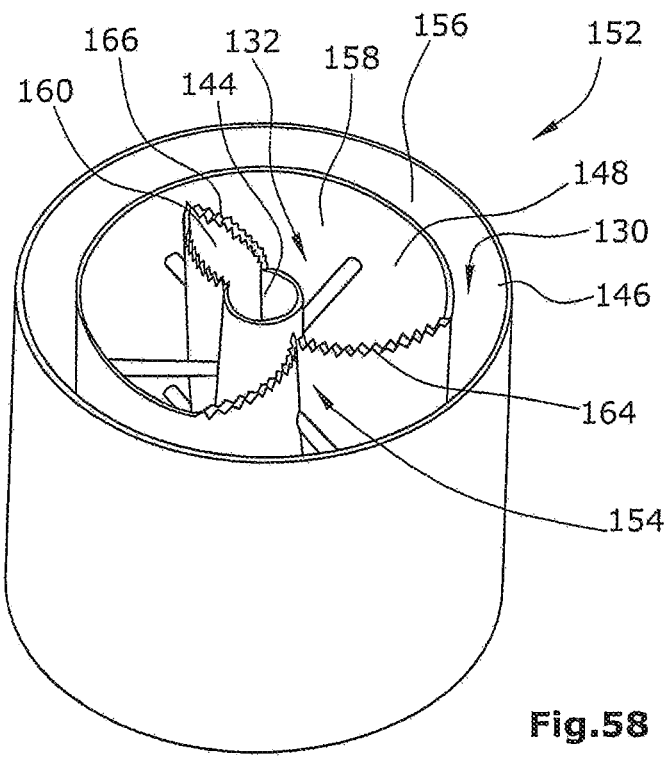
Figure 59:
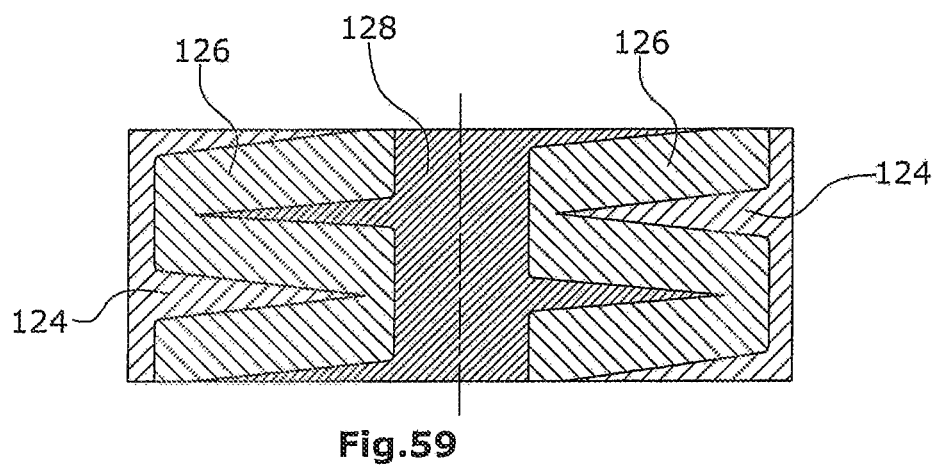

The detailed construction of the working example of the rotary filler 118 described here is shown in FIGS. 57 and 58. According to FIG. 57, the rotary filler 118 which is driven with rotation by a drive 136 has an essentially cylindrical outward shape, similar to that of a sleeve or a tube. At its upper end facing away from the cavity 112, the filler 118 has an inlet orifice arrangement 138 with, in this working example, three concentric inlet orifices 140, 142, 144. The central orifice 144 is penetrated by the axis of rotation and is concentric thereto. The two orifices 140 and 142 each run in rings around one another and are accordingly in a concentric arrangement. The three chambers 130, 132, 134 are delimited from one another and bounded on the outside by chamber walls 146, 148, 150, these three chamber walls 146, 148, 150 forming concentric rings in the region of the inlet orifice arrangement 138.

The inner chamber walls 148, 150 are formed to give the lower end of the outlet facing the cavity 112, so as to give, in this working example, the outlet orifice arrangement 152 according to FIG. d at the lower end of the rotary filler 118. The outer chamber wall 146 is essentially cylindrical over its entire axial length, while the next chamber wall 148 on the inside has a constriction 154 (similarly to a heart shape) at the end of the outlet of the rotary filler 118. The V-shaped constriction 154 points toward the center of the rotary filler 118 and hence toward the innermost chamber wall 134 which has, at the end of the outlet of the rotary filler 118, a shape that extends radially. Between the outer chamber wall 146 and the next chamber wall 148 on the inside, an outlet orifice 156 of the chamber 130 is formed, while the next chamber 132 on the inside has an outlet orifice 158 formed by the chamber wall 148 with constriction 154 on the one hand and by the chamber wall 134 with its radially elongated shape. Finally, the third, innermost chamber 134 has an outlet orifice 160 which is aligned radially outward and extends partly around the center axis 162 of the filler 118.

As can be seen particularly from FIG. 58, the chamber walls have zigzags or comb structures 164, 166. These comb structures 164, 166 serve for variation of the powder materials that exit from the chambers at their respective interfaces.

With the configuration shown in FIGS. 57 and 58, it is possible to use the rotary filler 118 in order to lay down three powder materials into the cavity 112 which form three intermeshed partial or full helical arrangements. The powder material 126 exiting from the middle chamber 132 is present as the middle helix 168 in the blank or in the cavity 112 (see FIG. 59). The powder material 124 exiting from the outer chamber 130 forms a cylindrical shape with a helical line running on the inside of the cylinder wall. The powder material 128 exiting from the inner chamber 134 is within the core of the blank as a solid cylinder with an external helical projection. The situation is shown for a subsection of the blank in FIG. 59.

Figure 60:
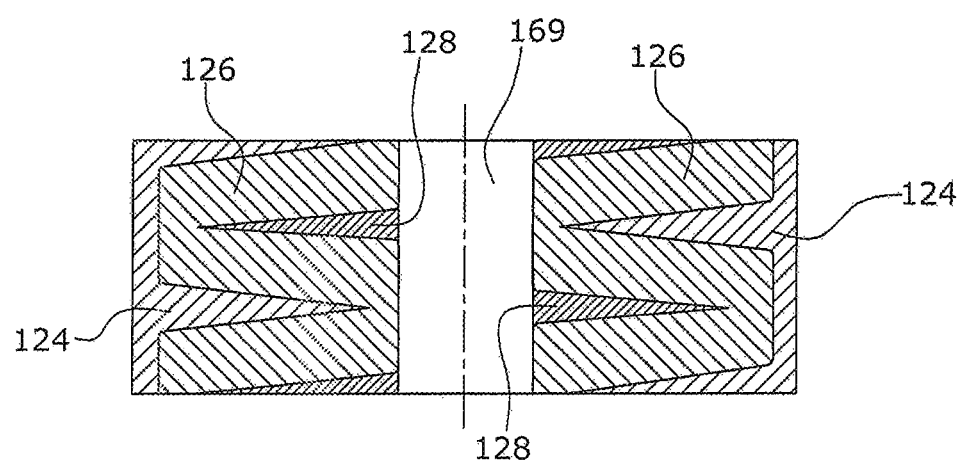

FIG. 60 shows the situation when, on rotation of the filler 118, a spike (not shown) serves as a spacer in the inner chamber 134 thereof and keeps the center 169 of the blank free of powder material. Such an arrangement is advantageous, for example, in order to provide the blank with a channel for gas supply.

As already mentioned above, the rotary filler can be used especially for production of a blank for use as a hydrogen-storing component or a hydrogen-storing assembly. In this case, for example, the material 126 fed in via the middle chamber 132 and inserted into the cavity 112 is hydrogenatable, while the material 124 which passes through the outer chamber 130 of the rotary filler 118 into the cavity 112 has heat-conducting properties. In the interior of the blank, in that case, there is gas-permeable material 128. The inner material of the blank thus assures the supply and hence the porosity of the blank, such that hydrogen can be introduced into the latter and then binds the hydrogenatable material. The heat that arises is removed to the outside via the material 124. On the outside around the hydrogen storage component (blank) is a (pressure) vessel which is in thermal contact with the hydrogen-storing component.

In quite general terms, it should be pointed out in connection with the invention that, as well as bonding of the particles of the pulverulent materials with one another by compression (optionally additionally with the action of heat), it is additionally also possible to work by additive methods, for example laser melting. For this purpose, for example, one or more laser beam bundles are introduced through hollow walls of the filler, which are deflected by means of prisms and enter the powder material that has just been dispensed via transparent orifices in the hollow walls of the filler, where there is local melting of the powder.

Figure 61:
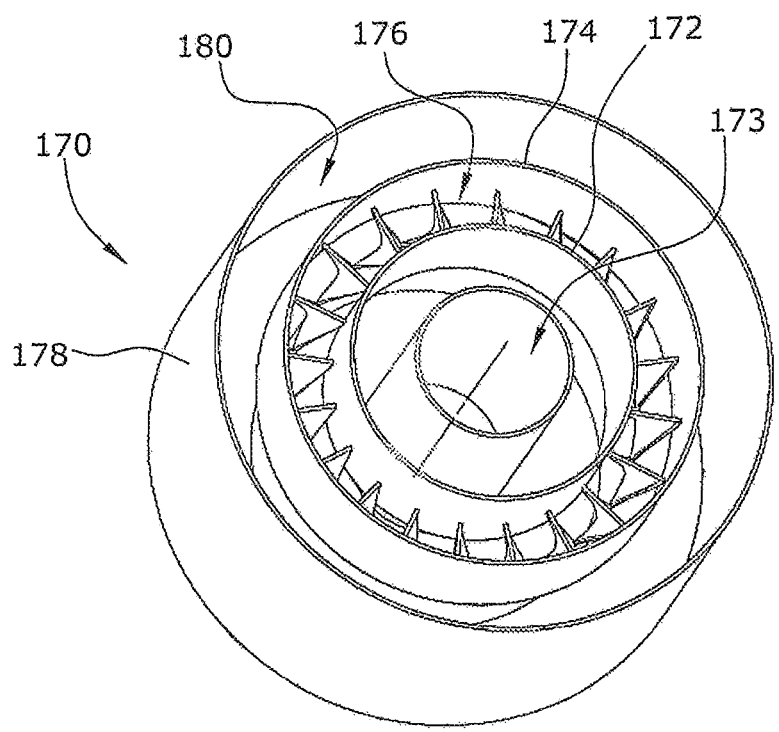
Figure 62:
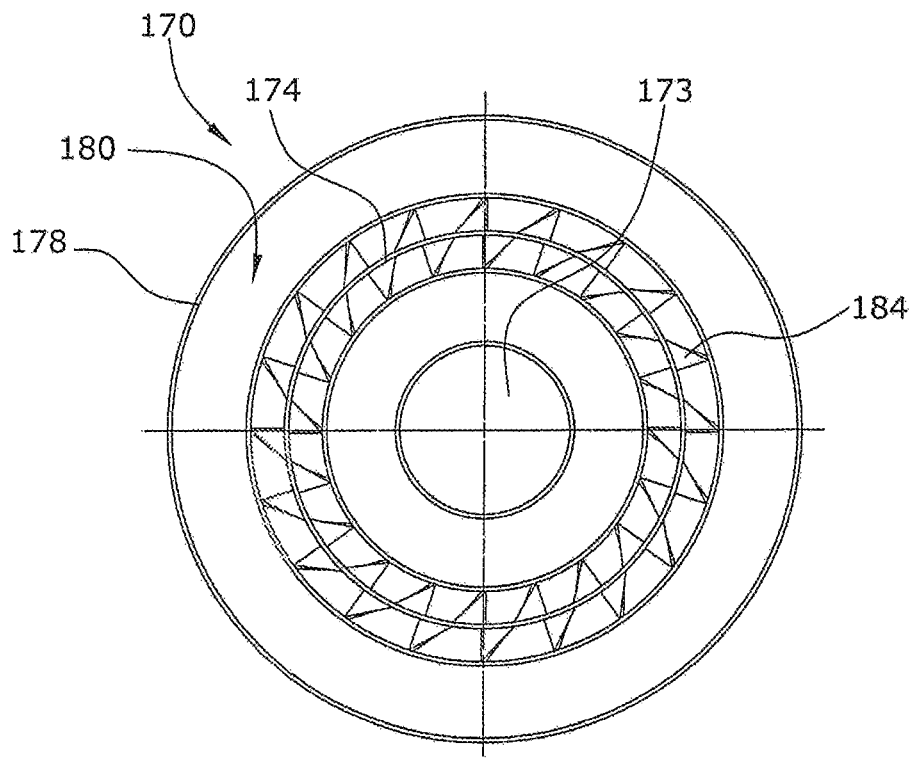
Figure 63:
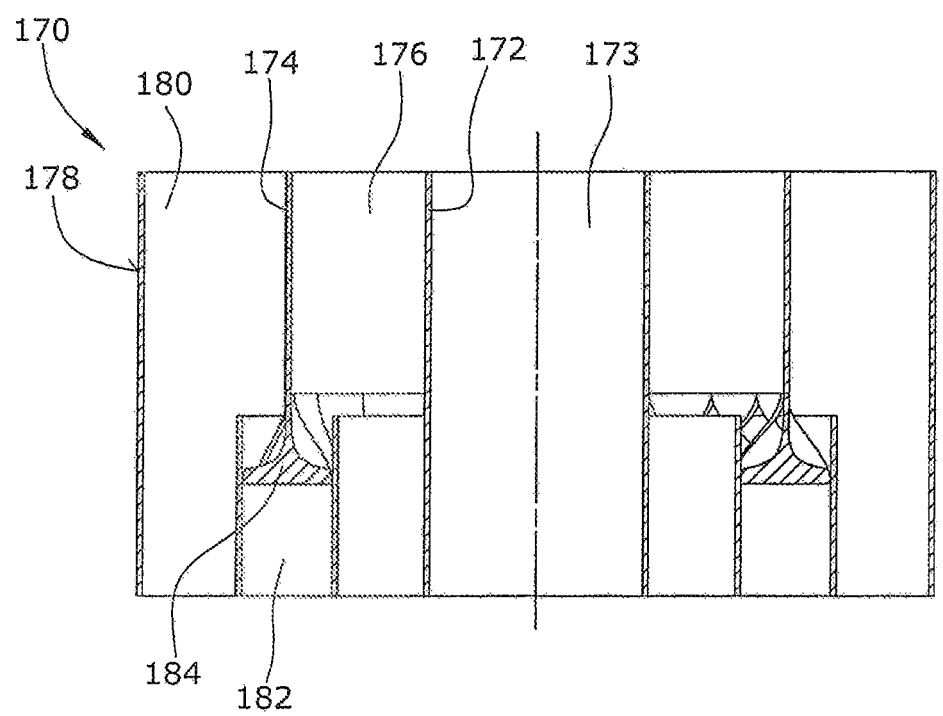

FIG. 61 shows a perspective view and FIG. 62 a top view of a further working example of a rotary filler 170. As in the case of the working example of FIGS. 55 to 60, the rotary filler 170 has three ring chambers which, however, by contrast with FIGS. 55 to 60, have an essentially concentric arrangement throughout. An inner dividing wall 172 delimits an inner chamber 173, while a further cylindrical wall 174 arranged in the middle delimits a second chamber 176. On the outside, there is a third cylindrical wall 178 which defines the outer chamber 180. What is special about the rotary filler 170 is that, on the outlet side, it forms a further chamber 182 into which material trickling close to the wall passes on either side of the middle chamber wall 174. At the flow inlet of the chamber 182, there are deflecting elements 184 which ensure local mixing of the two material streams close to the wall.

The features of individual configurations of the invention are specified once again in groups hereinafter by way of example, it being possible to combine the features of individual groups with one another and also with features of the working examples, configurations and variants of the invention described further up, specifically by addition or omission of individual features.

1. A device, preferably press, comprising
   a cavity to be filled,
   at least one first material feed of a first material and a second material feed of a second material, the first and second material feeds being arranged separately from one another,
   comprising a feed device for feeding the first and second materials into the cavity to be filled,
   wherein the feed device has an opening cross section with at least one first region of the opening cross section for the first material and with a separate second region of the opening cross section for the second material for preferably parallel, locally separate filling of the cavity.
2. The device according to point 1, wherein the cavity to be filled is preferably round and, preferably, a contact element with a contact face for interaction with the material in the cavity, especially in the form of a comb, a smooth or contoured bar or a roller is provided, which can be run at least onto a surface of the at least first and/or second material introduced into the cavity and can be moved along the latter, more preferably can be run into the at least one first and/or second material and can be moved therein.
3. The device according to point 1 or 2, wherein the first region at least partly, preferably fully, adjoins the second region.
4. The device according to any of the preceding points, wherein the device has a drive, by means of which at least a controlled relative movement between the cavity to be filled and the feed device is enabled.
5. The device according to any of the preceding points, wherein this device has an axis of rotation about which the feed device is arranged so as to be rotatable and/or in that the cavity is arranged so as to be rotatable.
6. The device according to any of the preceding points, wherein the cavity to be filled is a die cavity and the feed device is a filler and the device comprises a press device for compaction of the at least first and second materials in the die cavity.
7. The device according to any of the preceding points, wherein a contact face, preferably in the form of a comb, a smooth or else contoured bar or a roller is provided, which can be moved by means of a moving device to such an extent that it comes into contact with the material introduced into the cavity, and a moving device moves the contact face within the material.
8. The device according to point 7, wherein the contact face is movable at least into the material and along the material.
9. A feed device for a device, especially a press, preferably according to any of points 1 to 6, for feeding of at least one first and one second material, having an opening cross section of the feed device having at least one first region and a separate second region for parallel separate feeding of the first and second materials.
10. The feed device according to point 9, wherein the feed device has a movable contact face, preferably a comb, a smooth or else contoured bar or a roller, preferably according to point 7 or 8, preferably for controlled orientation of nonspherical particles such as elongated platelet-shaped particles or fiber pieces and/or generation of a distribution gradient for particles and/or fiber pieces.
11. The feed device according to point 9 or 10, wherein this feed device has a material feed for the first material and a separate material feed for the second material, wherein a mixed zone feed is present, along which the first and second materials are miscible and can be fed in.
12. The feed device according to point 9, 10 or 11, wherein an additional ribbon feed is present, by means of which a material ribbon can be conducted into the opening cross section.
13. A method of producing a blank, preferably with a device according to any of points 1 to 8, by means of at least one first material and by means of a second material, wherein a first material feed for the first material is effected via a first region of a feed device and a second material feed of the second material, parallel to the first material feed, via a second region of the feed device, wherein the at least first and second materials fed in in parallel and in separate regions are filled into a cavity and used to form the blank therefrom.
14. The method according to point 13, wherein the feed device and the cavity move relative to one another in the course of filling.
15. The method according to point 13 or 14, wherein the feed device is rotated, wherein the first and second materials exit from the feed device in parallel.
16. The method according to point 15, wherein a nonplanar, preferably helical or wave-shaped geometry is formed in the blank.
17. The method according to any of the preceding points, wherein the first and second materials form a porous structure, preferably with production of one or more channels in the composite material by means of one or more spikes or spacers and/or material to be removed.
18. The method according to any of the preceding points, wherein the first and second materials are arranged at least partly at separate locations and form separate layers.
19. The method according to any of the preceding points, wherein the first and second materials are filled into a cavity, wherein the first and second materials are compressed in the cavity, preferably by means of movement of an upper ram and lower ram in the cavity.
20. The method according to any of the preceding points 11 to 18, wherein isostatic pressing of the composite material of the hydrogen storage means is effected.
21. The method according to any of the preceding points, wherein a movable contact face, preferably a comb, a smooth or else contoured bar or a roller, is run into the material filled into the cavity and moved within the material.
22. A blank comprising at least one first and one second material, preferably according to any of the preceding points, wherein the first and second materials are arranged separately at least in one region and form separate layers.
23. The blank according to point 22, wherein the green body has a material distribution at least of the first material which is helical.
24. The blank according to point 22 or 23, wherein at least a third material is provided.

LIST OF REFERENCE NUMERALS 1 powder material
2 powder material
3 powder material
4 powder material
5 chamber
6 chamber
7 chamber
8 chamber
9 compact
10 lower ram
12 part of filling space
12' part of filling space
12" part of filling space
14 die cavity
16 material
18 filler
18' rotary filler
20 top end of die
22 material
24 filler
26 upper ram
28 die
30 longitudinal machine axis
32 compact
34 chamber
36 chamber
100 press
110 die 112 cavity
114 center axis
116 lower ram
118 rotary filler
119 upper ram
120 filling unit
122 orifice
124 powder material
126 powder material
128 powder material
130 chamber
132 chamber
134 chamber
136 drive
138 inlet arrangement
140 inlet orifice
142 inlet orifice
144 inlet orifice
146 chamber wall
148 chamber wall
150 chamber wall
152 outlet orifice arrangement
154 constriction
156 outlet orifice
158 outlet orifice
160 outlet orifice
162 center axis
164 comb structure
166 comb structure
168 helix
169 center
170 rotary filler
172 dividing wall
173 chamber
174 chamber wall
176 chamber wall
178 chamber wall
180 outer chamber
182 chamber
184 deflecting element

The invention claimed is:

1. A press device having a device for filling of a mold of the press device with at least two different materials, comprising
a cavity to be filled with the at least two materials and
a filling unit for discharging the at least two materials for the purpose of introducing these materials into different regions of the cavity,
wherein the filling unit has at least two separate chambers or at least two chamber regions of a common chamber for simultaneous feeding of the at least two materials, directly adjoining one another or in separate locations, for introduction thereof into the cavity as at least partly distinguishable layers, and
comprising a relative rotary motion between the filling unit and the cavity, during a filling operation; wherein the cavity and/or a base of the cavity are movable in a translational manner horizontally relative to the filling unit during the filling operation.

2. The press device as claimed in claim 1, wherein a first chamber extends at least partly around a center axis and wherein at least a second chamber likewise extends at least partly around the center axis.

3. The press device as claimed in claim 1, wherein the filling unit has an outlet orifice arrangement which faces the cavity and is provided with at least one outlet orifice for each chamber.

4. The press device as claimed in claim 3, wherein the filling unit, for feeding of at least one first and one second material, has been provided with an opening cross section of the filling unit having at least one first region and a separate second region for parallel, separate feeding of the first and second materials considered in the direction of rotation and/or radial direction, such that the outlet orifices, in the case of relative rotation between the filling unit and the cavity, cover at least partly identical regions.

5. The press device as claimed in claim 2, wherein the outlet orifice of the first chamber extends in a transverse direction relative to the alignment of the center axis, and is arranged to one side of the center axis and within the outlet orifice of the second chamber which itself extends around the center axis.

6. The press device as claimed in claim 1, wherein the filling unit has a third chamber, the third chamber extending around the outside of the second chamber and having an outlet orifice which extends around an outlet orifice of the second chamber, the outlet orifice of the second chamber having an essentially V-shaped constriction pointing in the direction of a center axis.

7. The press device as claimed in claim 6, wherein the position of the constriction is essentially diametrically opposite the position of an outlet orifice of a first chamber, based on the center axis.

8. The press device as claimed in claim 1, wherein the filling unit has filling orifices for the individual chambers, and wherein a center axis runs through a first inlet orifice assigned to the first chamber and a second inlet orifice assigned to the second chamber extends in a ring shape around the first inlet orifice.

9. The press device as claimed in claim 8, wherein the inlet orifice of a third chamber extends in a ring shape around the outside of the second inlet orifice.

10. The press device as claimed in claim 1, wherein the individual chambers are separated from one another by a wall in each case, and wherein the walls have, in their edge regions within the outlet orifices, at least one edge cutout or an edge projection.

11. The press device as claimed in claim 1, wherein the filling unit dispenses at least one free-flowing material present in powder form.

12. The press device as claimed in claim 1, wherein the filling unit has an additional strip feed, by means of which a material in strand, strip or ribbon form can be introduced into the cavity.

13. The press device as claimed in claim 1, wherein at least two materials that are to be introduced into the cavity arrive at separate time.

14. The press device as claimed in claim 1, wherein the filling unit has a contact element for interaction with at least one material introduced into the cavity, for interaction for the purpose of alignment of at least one nonspherical material and/or a nonspherical constituent of this material and/or for influencing the distribution of the at least one material and/or a constituent of this material for generation of a distribution gradient.

15. The press device as claimed in claim 1, wherein the different regions of the cavity to be filled with the materials at least partly or fully adjoin one another.

16. The press device as claimed in claim 1, wherein the filling unit has a mixing zone for mixing of the at least two materials.

17. The press device as claimed in claim 1, wherein the filling unit and the cavity, in the case of positioning of the filling unit with an outlet arrangement of the filling unit above or within the cavity, execute a defined superimposed rotational and translational movement with respect to one another along which the filling unit can be moved in a rotational manner in one direction or can be moved back and forth in a rotational manner relative to the cavity.

18. The press device as claimed in claim 1, wherein at least one of the materials is porous or forms a porous structure and/or in that at least one element introduced into the cavity forms a structure permeated by at least one channel.

19. The press device as claimed in claim 1, wherein the cavity and/or a base of the cavity being movable in a translational manner horizontally relative to the filling unit during the filling operation involves the cavity and/or a base of the cavity being movable perpendicularly to a central axis of the cavity and a pressing direction of the pressing device relative to the filling unit during the filling operation.

20. The press device as claimed in claim 1, wherein the filling unit has a lower surface and the cavity is formed in a die having an upper surface and wherein the lower surface of the filling unit contacts and is translationally movable along the upper surface of the die during the filling operation.

21. A press device for production of a compact comprising:
   a device designed with the features of claim 1 for filling of the mold for the compact with at least two different materials and
   a compaction unit for compaction of material within the cavity.

22. The press device as claimed in claim 21, wherein the compaction unit has at least one ram that can be immersed into the cavity.

23. The press device as claimed in claim 21, wherein the cavity is formed from a passage orifice in a die and a first ram which seals the passage orifice on one side, and in that a second ram is provided, at least the second ram being movable in the direction of the first ram into the cavity or within the cavity.

24. A filling device for a press device as claimed in claim 1, for feeding of at least one first and one second material, comprising: an opening cross section claim 1, for feeding of at least one first and one second material, with an opening cross section of the filling device having at least one first region and a separate second region for parallel, separate feeding of the first and second materials into a cavity, the filling device having an axis of rotation about which the filling device can be rotated during the feeding and wherein the cavity and/or a base of the cavity can be moved in a translational manner horizontally relative to the filling unit during the filling operation.

25. A method of filling a mold of a press device with at least two different materials with a device as claimed in claim 1, wherein, in the method,
   at least two different materials are dispensed for filling of a cavity and are introduced into the cavity,
   wherein the at least two materials are dispensed from a filling unit in different regions of the filling unit with relative rotation of filling unit and cavity and are introduced into various regions of the cavity and wherein the cavity and/or a base of the cavity are movable in a translational manner horizontally relative to the filling unit during the filling operation.

26. The method as claimed in claim 25, wherein the materials emerge simultaneously as material streams running alongside one another in an intermittent or continuous manner, and wherein the material streams are introduced into the cavity with rotation about an axis that runs through the arrangement of the material streams and in the direction of the flow direction of the material streams to form a helical and/or wave-shaped structure of at least one of the materials.

27. The method as claimed in claim 25, wherein at least one of the materials which is supplied is free-flowing and a powder material.

28. The method as claimed in claim 25, wherein, as well as free-flowing materials, one or more materials having intrinsically dimensionally stable structure are also introduced into the cavity.

29. A method of compacting material, wherein
   a cavity is filled with material by means of a method as claimed in claim 25 and
   the material within the cavity is compacted.

30. The method as claimed in claim 29, wherein the compaction is effected by means of at least one ram, or in that isostatic compaction is effected.

31. The method as claimed in claim 25, further comprising producing a hydrogen storage element in the form of a composite material in the form of a sheet, a block, tablets, pellets or the like which is dimensionally stable when used as hydrogen storage means.

32. The press device as claimed in claim 1, wherein, during the filling operation, the filling unit is movable translationally while the cavity and/or the base of the cavity are horizontally stationary.

33. The method as claimed in claim 25, wherein, during the filling operation, the filling unit is movable translationally while the cavity and/or the base of the cavity are horizontally stationary.

34. The filling device as claimed in claim 24, wherein, during the filling operation, the filling unit is movable translationally while the cavity and/or the base of the cavity are horizontally stationary.

* * * * *

UNITED STATES PATENT AND TRADEMARK OFFICE
CERTIFICATE OF CORRECTION

PATENT NO. : 10,919,250 B2  
APPLICATION NO. : 15/308896  
DATED : February 16, 2021  
INVENTOR(S) : Antonio Casellas et al.

Page 1 of 1

It is certified that error appears in the above-identified patent and that said Letters Patent is hereby corrected as shown below:

In the Claims

Column 31, Claim 24, Lines 43-45, "section claim 1, for feeding of at least one first and one second material, with an opening cross section of" should be --section of--.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*